United States Patent
Pattikonda et al.

(10) Patent No.: US 11,385,481 B1
(45) Date of Patent: Jul. 12, 2022

(54) ADVANCED DYNAMIC FOCUS EYEWEAR

(71) Applicants: Ram Pattikonda, Plano, TX (US); Shariq Hamid, Plano, TX (US); Arshadev Pravas Vasudevan, Trivandrum (IN)

(72) Inventors: Ram Pattikonda, Plano, TX (US); Shariq Hamid, Plano, TX (US); Arshadev Pravas Vasudevan, Trivandrum (IN)

(*) Notice: Subject to any disclaimer, the term of this patent is extended or adjusted under 35 U.S.C. 154(b) by 47 days.

(21) Appl. No.: 16/572,661

(22) Filed: Sep. 17, 2019

Related U.S. Application Data

(63) Continuation-in-part of application No. 15/884,823, filed on Jan. 31, 2018, now Pat. No. 10,423,009.

(60) Provisional application No. 62/856,219, filed on Jun. 3, 2019, provisional application No. 62/807,864, filed on Feb. 20, 2019, provisional application No. 62/788,446, filed on Jan. 4, 2019, provisional application No. 62/733,577, filed on Sep. 19, 2018, provisional application No. 62/453,108, filed on Feb. 1, 2017.

(51) Int. Cl.
| | |
|---|---|
| G02C 7/08 | (2006.01) |
| G06F 3/01 | (2006.01) |
| G01C 3/08 | (2006.01) |
| G02C 5/12 | (2006.01) |
| G02C 7/04 | (2006.01) |

(52) U.S. Cl.
CPC ............... *G02C 7/085* (2013.01); *G01C 3/08* (2013.01); *G02C 5/12* (2013.01); *G02C 7/04* (2013.01); *G06F 3/012* (2013.01); *G06F 3/013* (2013.01)

(58) Field of Classification Search
CPC .. G02C 7/085; G02C 7/04; G02C 5/12; G06F 3/012; G06F 3/013; G01C 3/08
USPC ........................................... 351/41, 55
See application file for complete search history.

(56) References Cited

U.S. PATENT DOCUMENTS

| | | |
|---|---|---|
| 4,190,330 A | 2/1980 | Berreman |
| 4,663,495 A | 5/1987 | Berman et al. |
| 5,108,169 A | 4/1992 | Mandell |
| 5,138,494 A | 8/1992 | Kurtin |
| 5,359,444 A * | 10/1994 | Piosenka ............ G02B 7/32 349/13 |
| 6,120,461 A | 9/2000 | Smyth |
| 6,619,799 B1 | 9/2003 | Blum et al. |
| 8,919,953 B1 * | 12/2014 | Ho ............ G02C 7/049 351/159.03 |
| 9,185,352 B1 | 11/2015 | Jacques |
| 9,193,816 B2 | 11/2015 | Jiang et al. |
| 2012/0140167 A1 | 6/2012 | Blum |
| 2013/0329183 A1 * | 12/2013 | Blum ............ G06F 3/011 351/158 |
| 2014/0130864 A1 | 5/2014 | Lunt et al. |
| 2015/0185503 A1 * | 7/2015 | Tate ............ G02C 7/083 351/158 |

(Continued)

FOREIGN PATENT DOCUMENTS

CA      2439925      9/2002

*Primary Examiner* — Tuyen Tra
(74) *Attorney, Agent, or Firm* — Michael Diaz

(57) ABSTRACT

Eyewear providing dynamic focus. The eyewear includes two lenses, a mechanism for detecting a near object viewed by a user of the eyewear and a mechanism for dynamically changing a focus of the lenses. The lenses change focus to a near focus when a near object is detected. The eyewear may be eyeglasses or contact lenses.

34 Claims, 48 Drawing Sheets

(56) References Cited

U.S. PATENT DOCUMENTS

2020/0331219 A1* 10/2020 Van Heugten ......... G02C 11/10

* cited by examiner

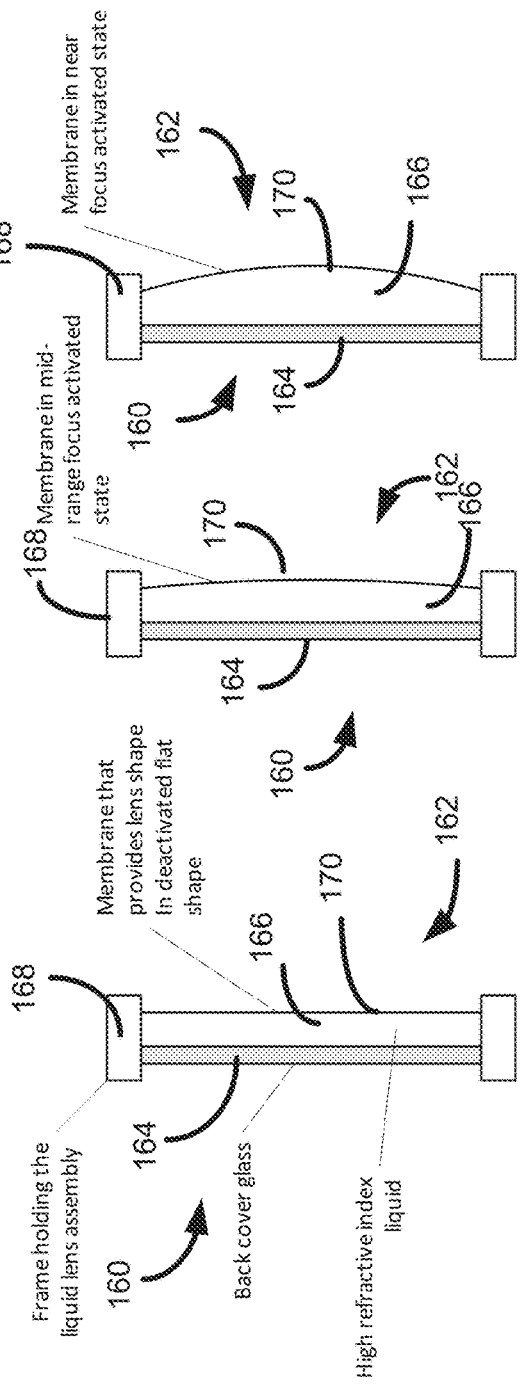

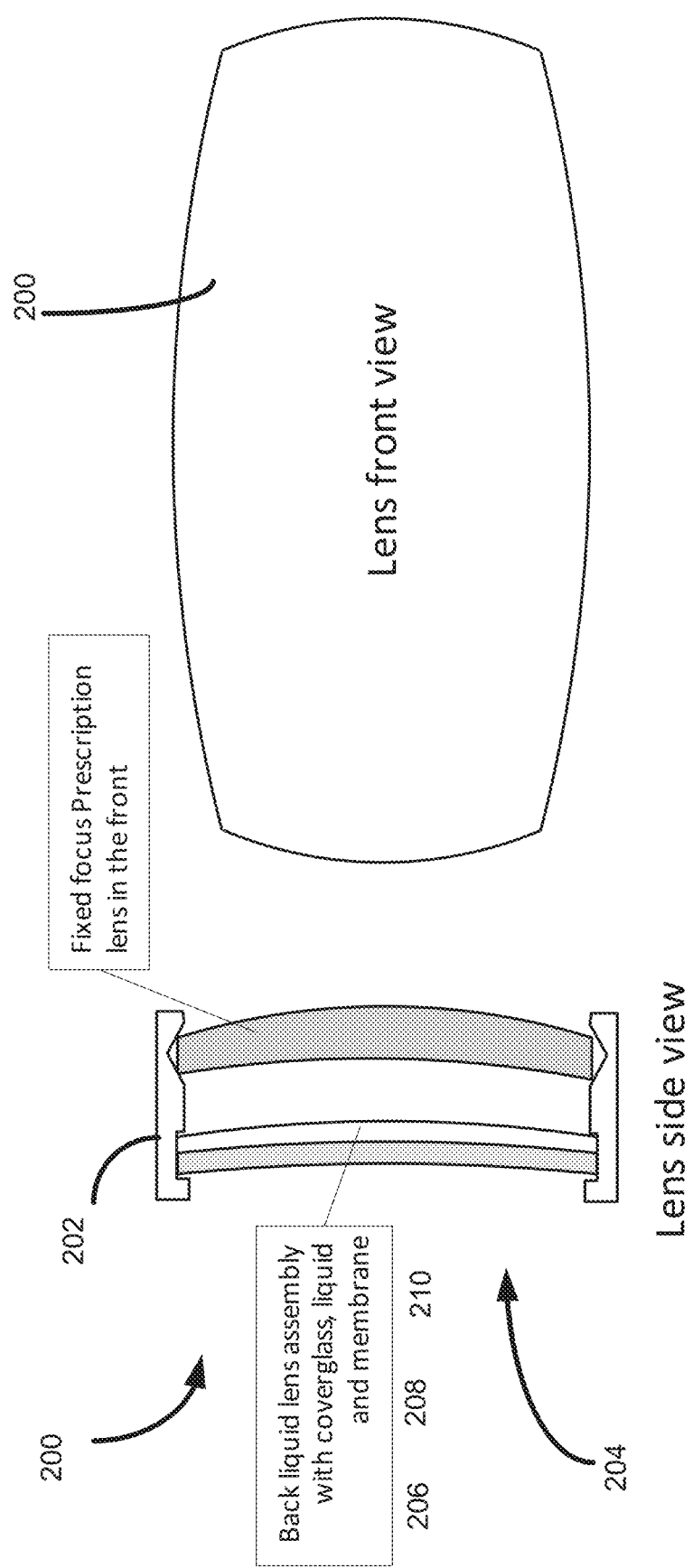

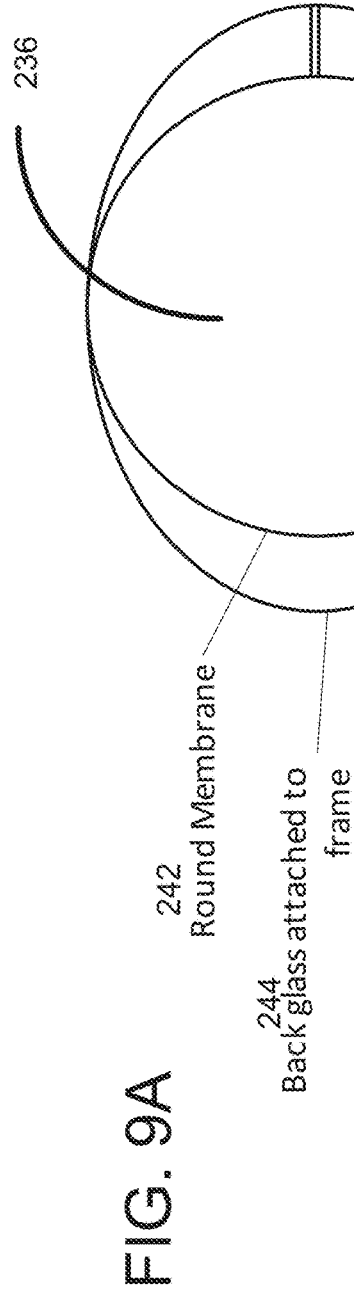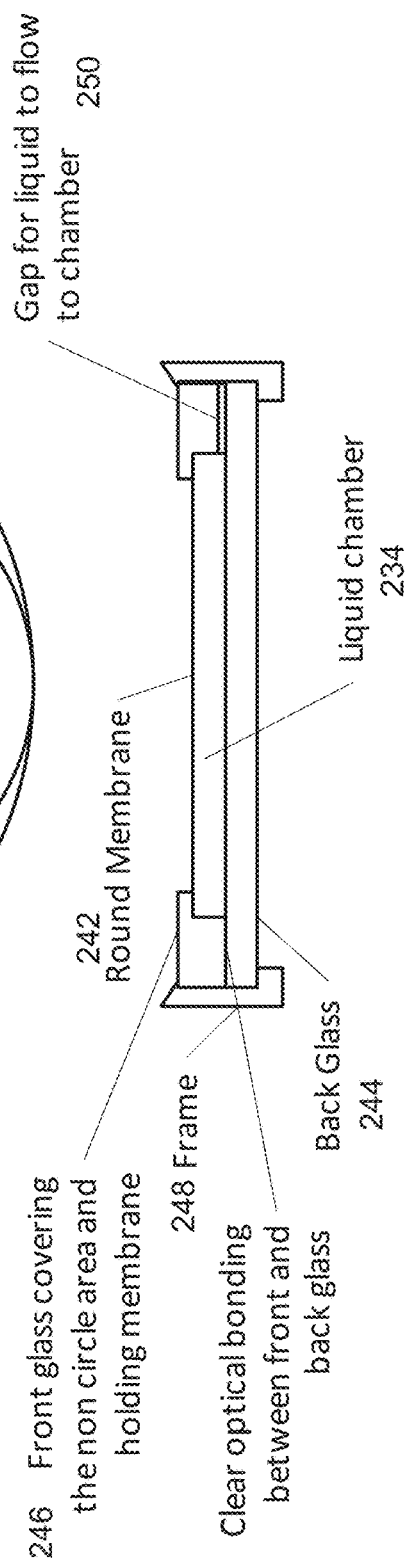
FIG. 9A
FIG. 9B

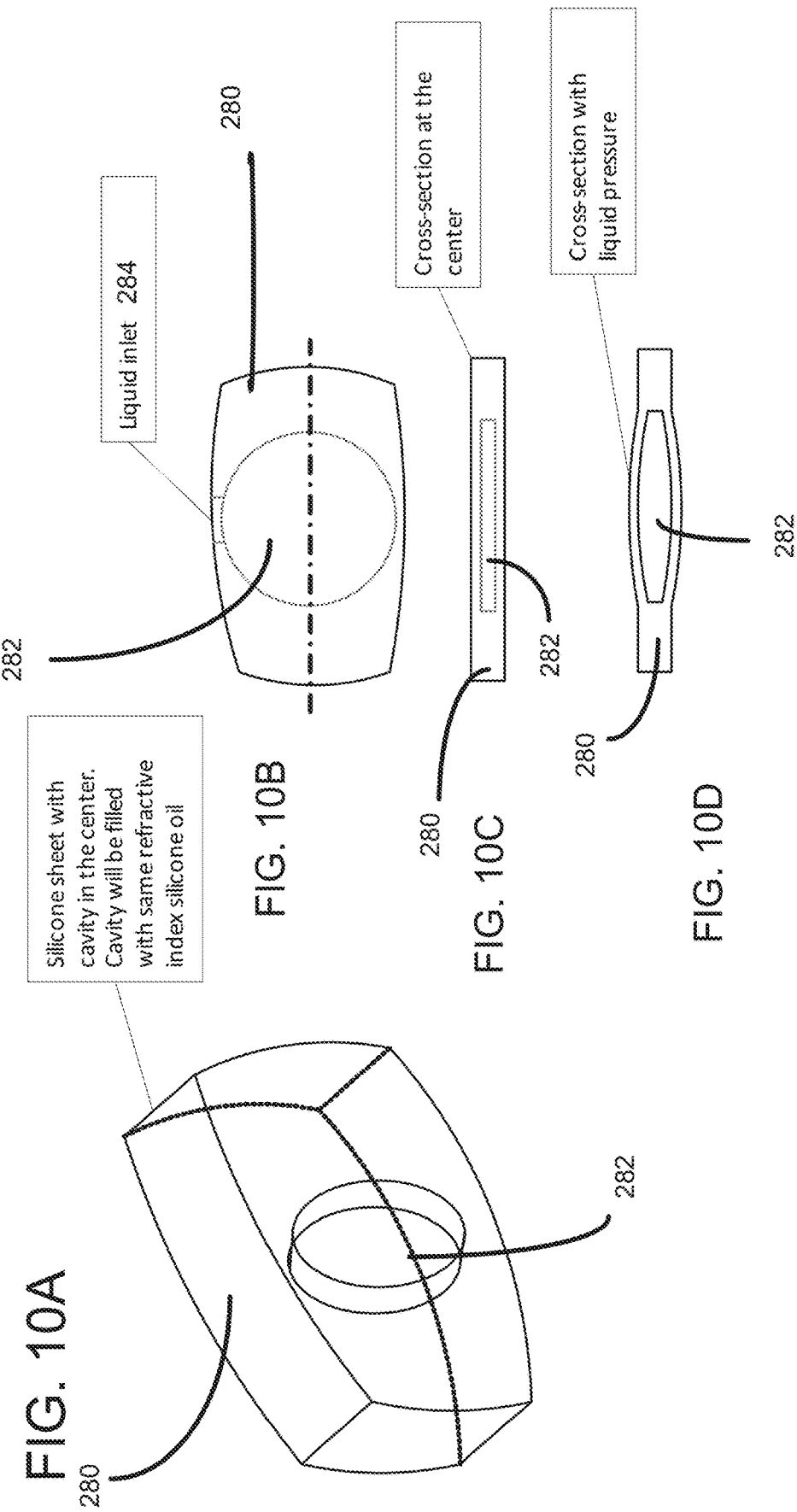

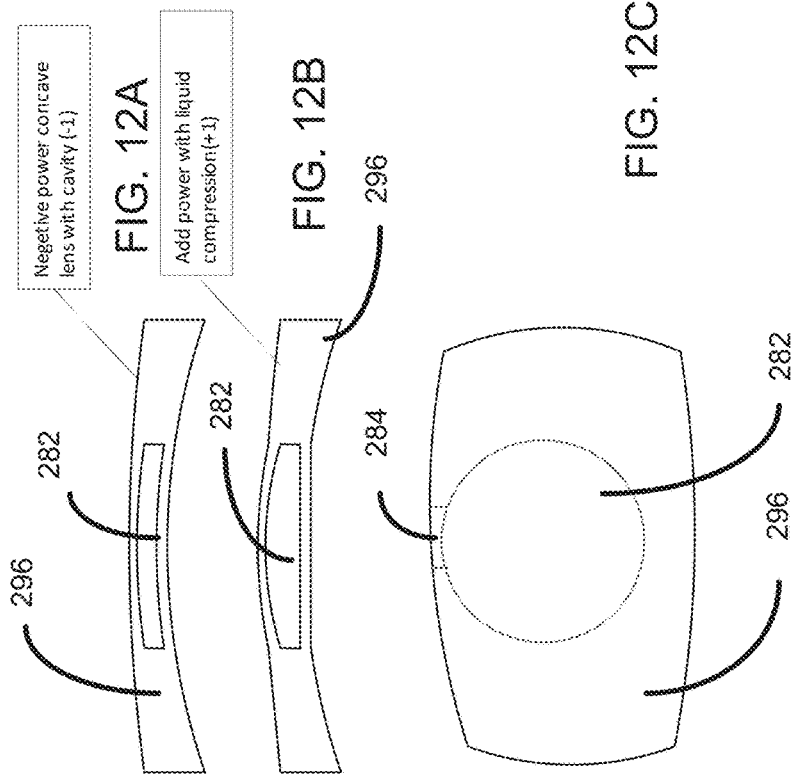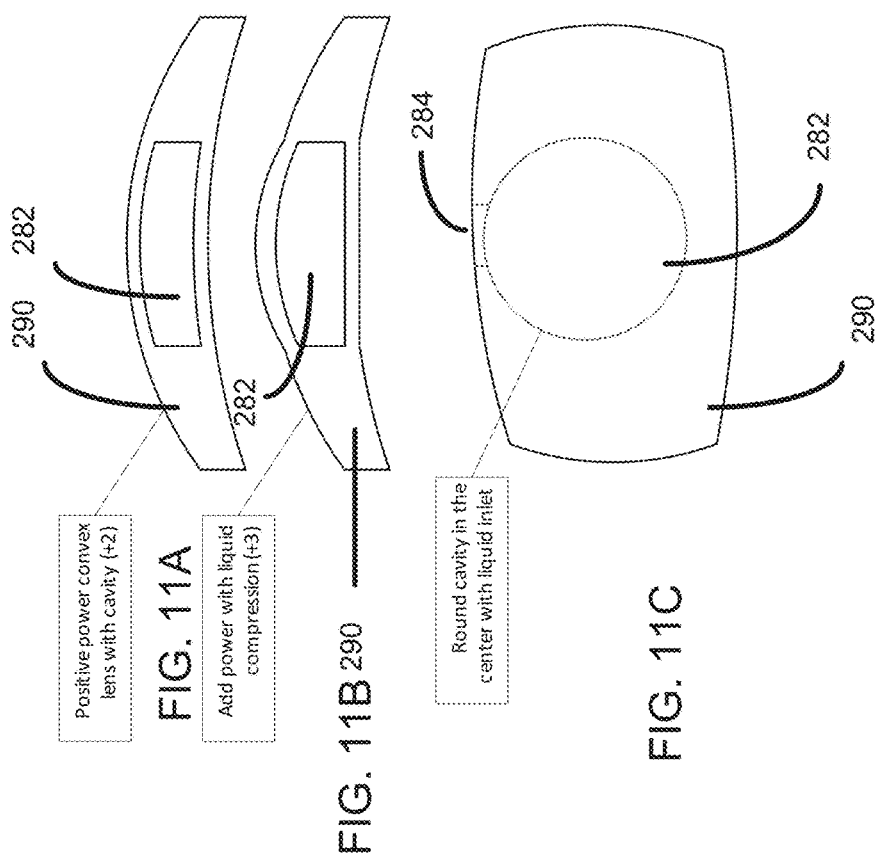

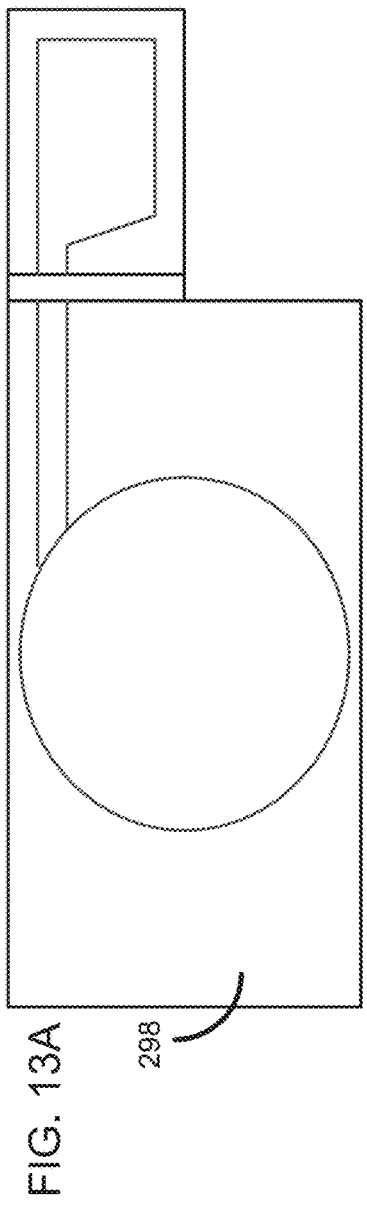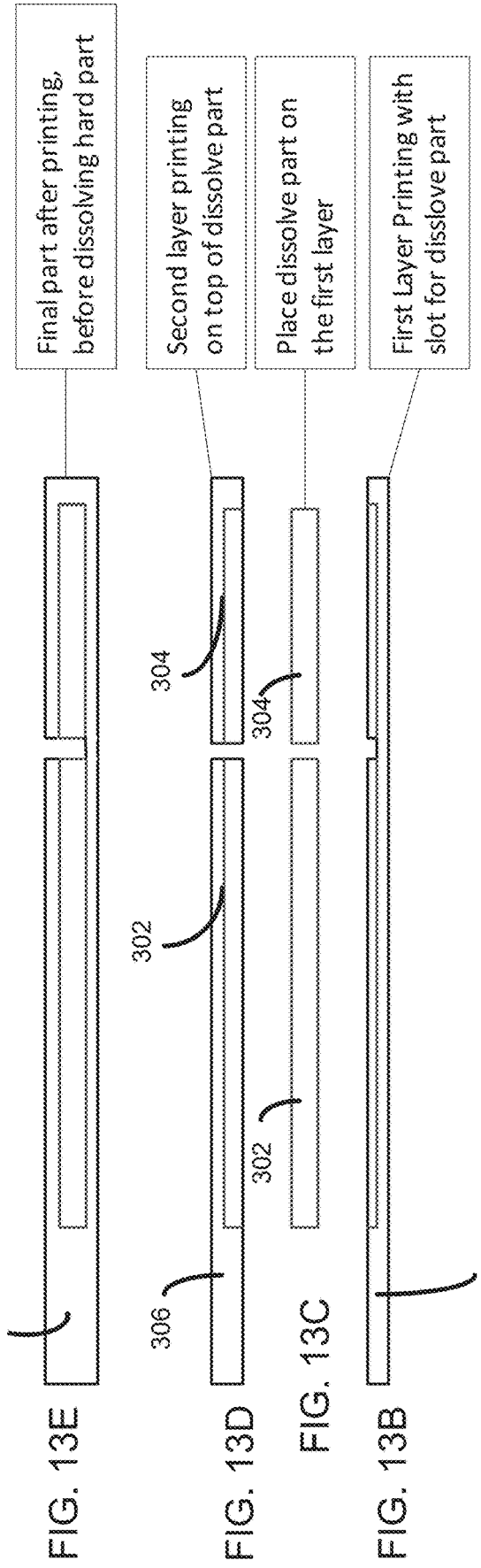

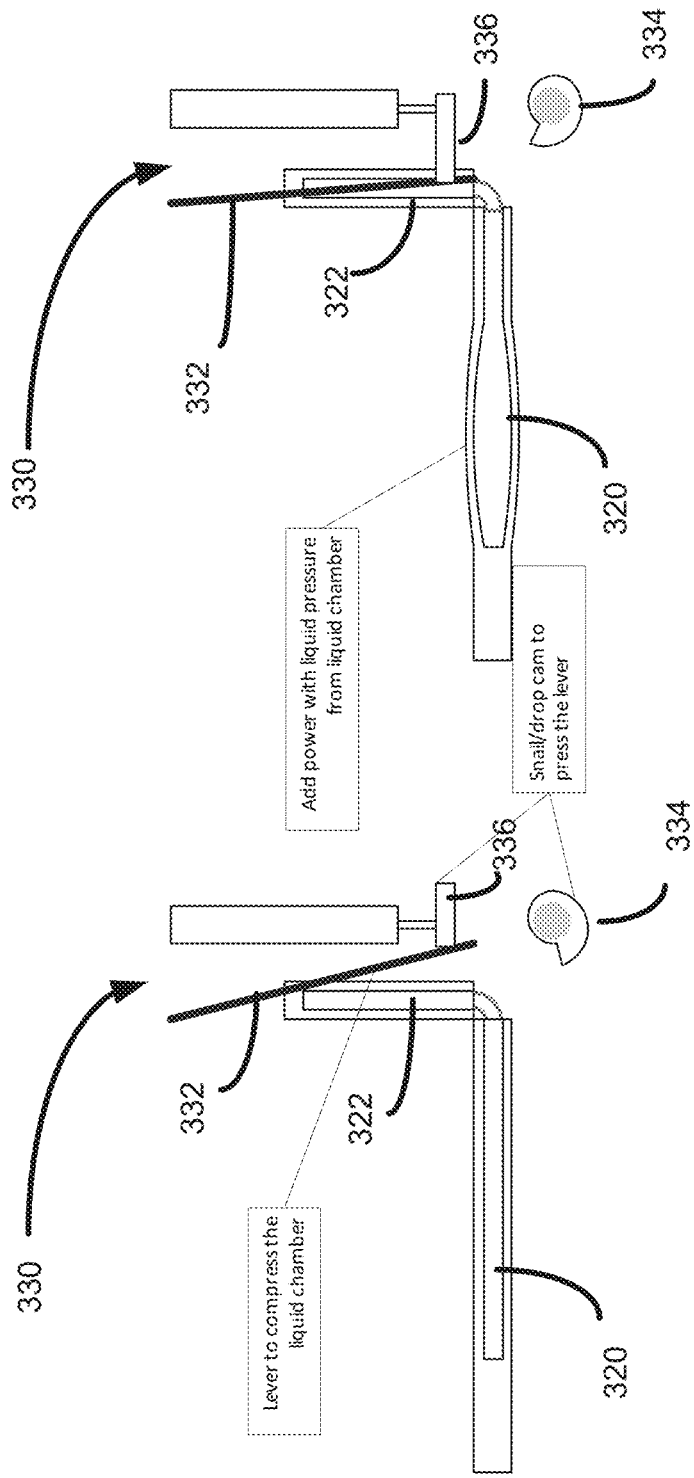

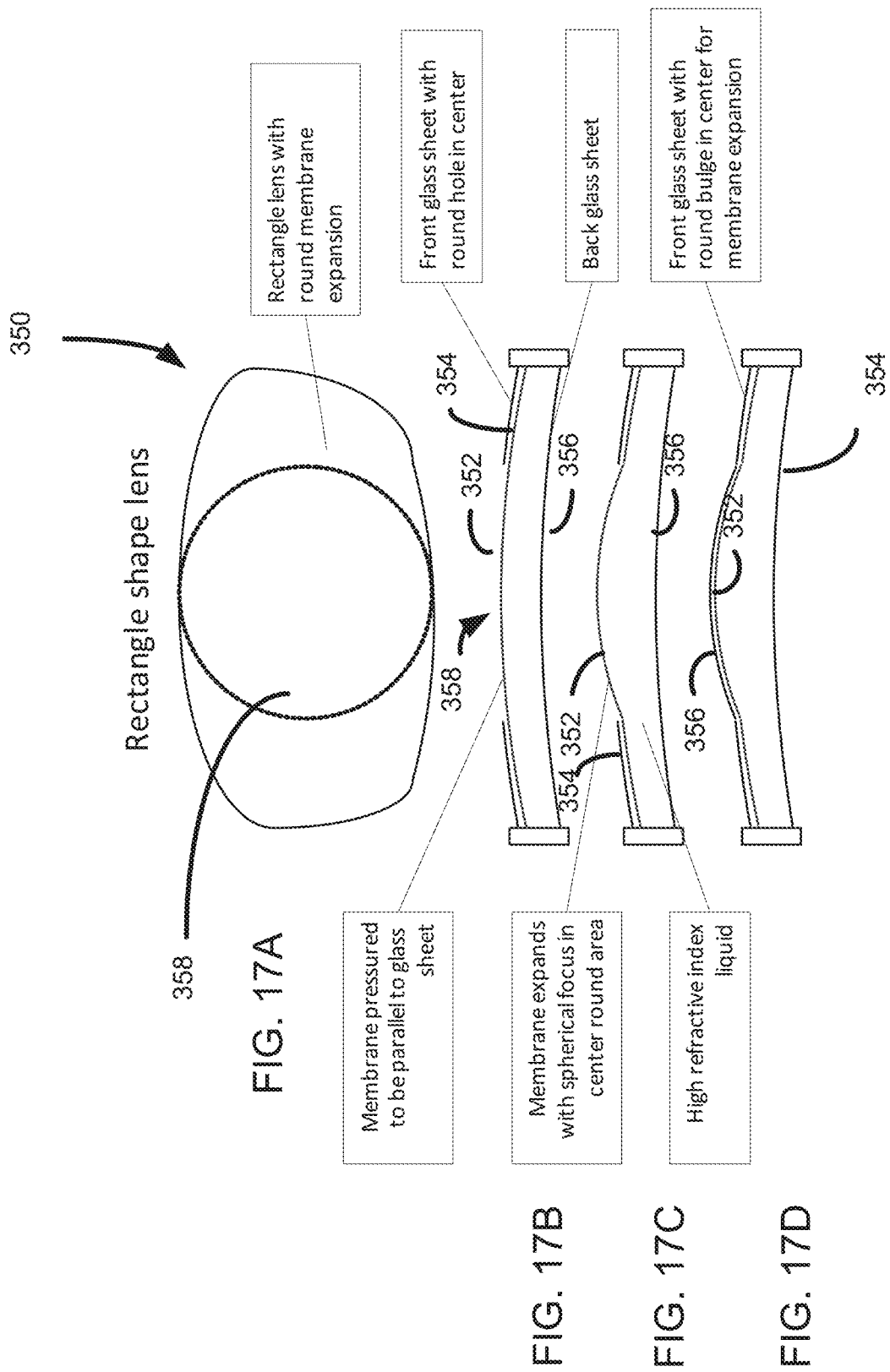

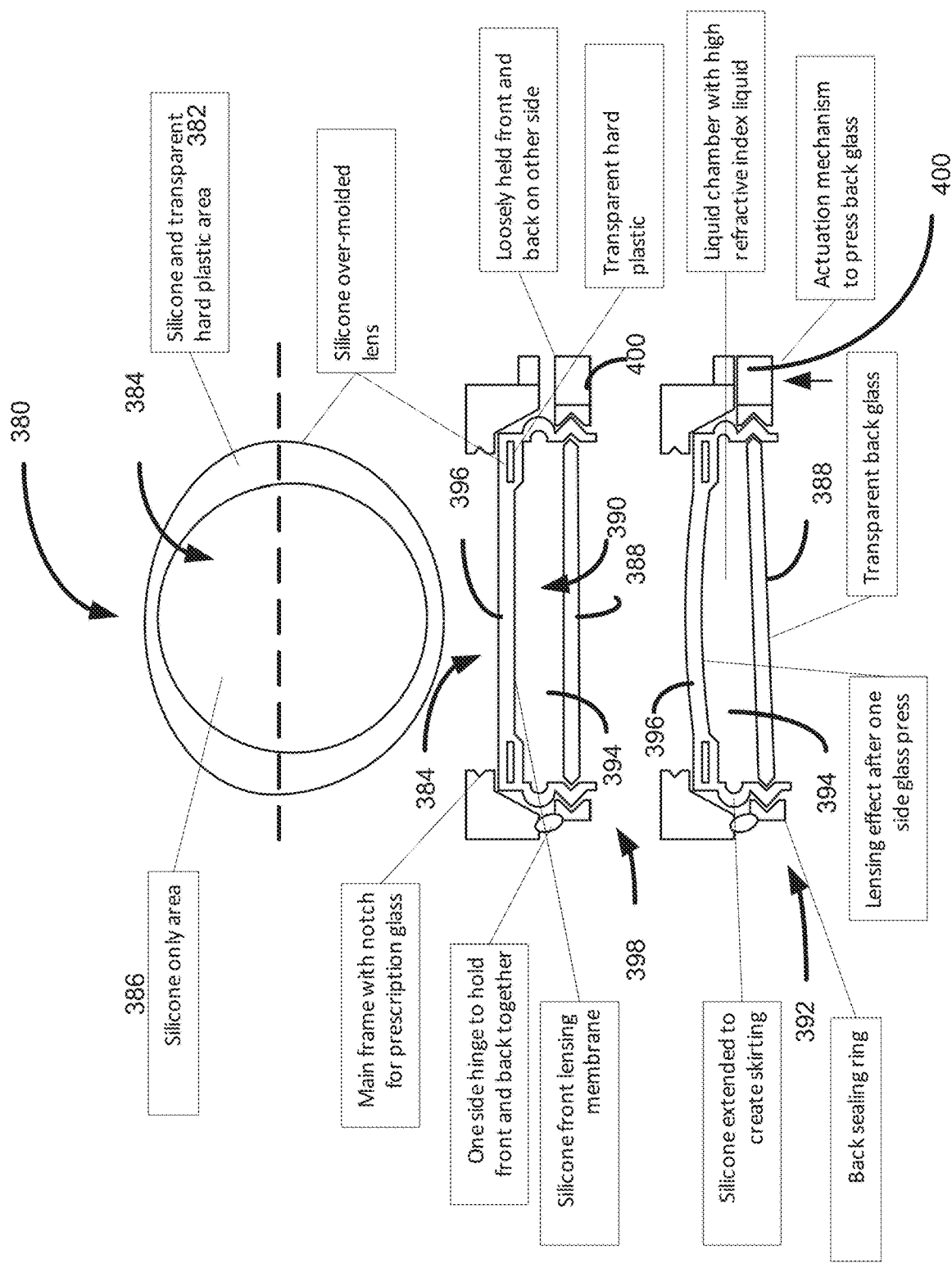

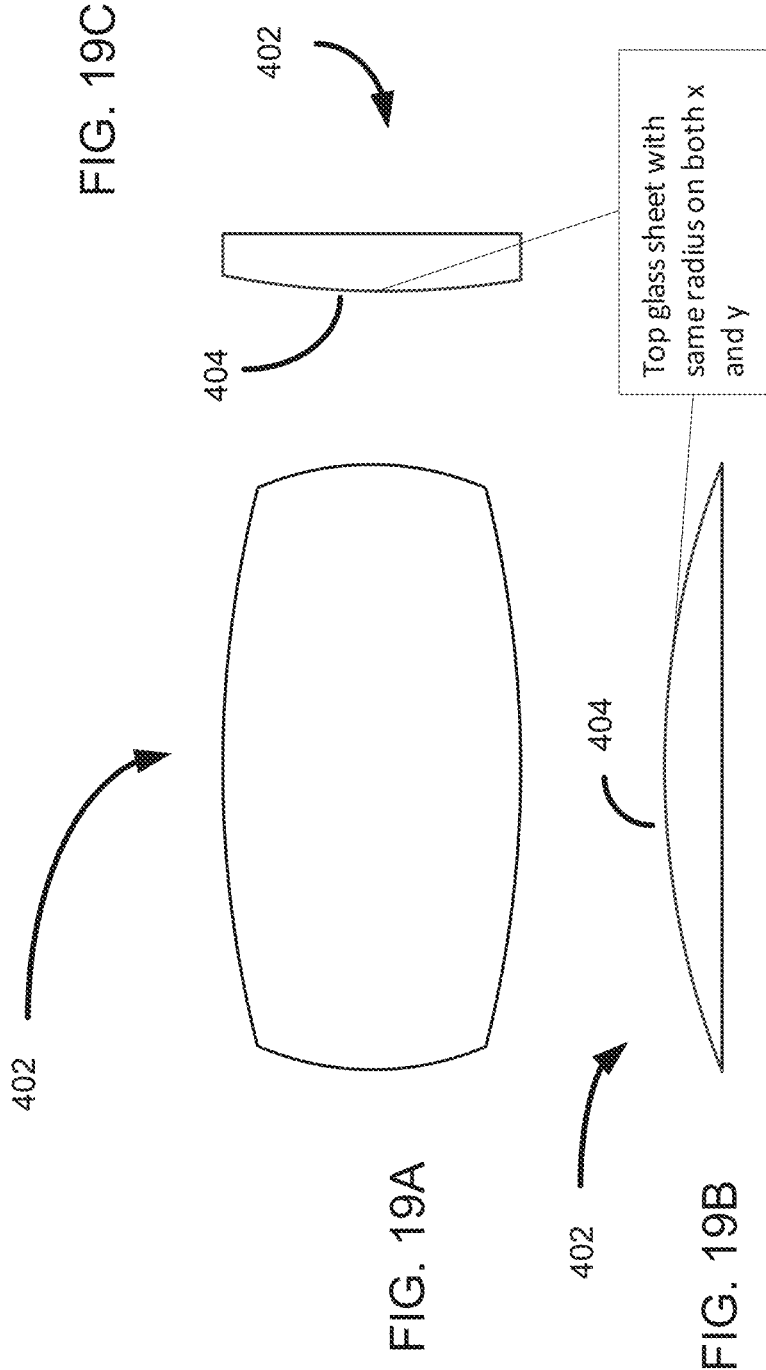

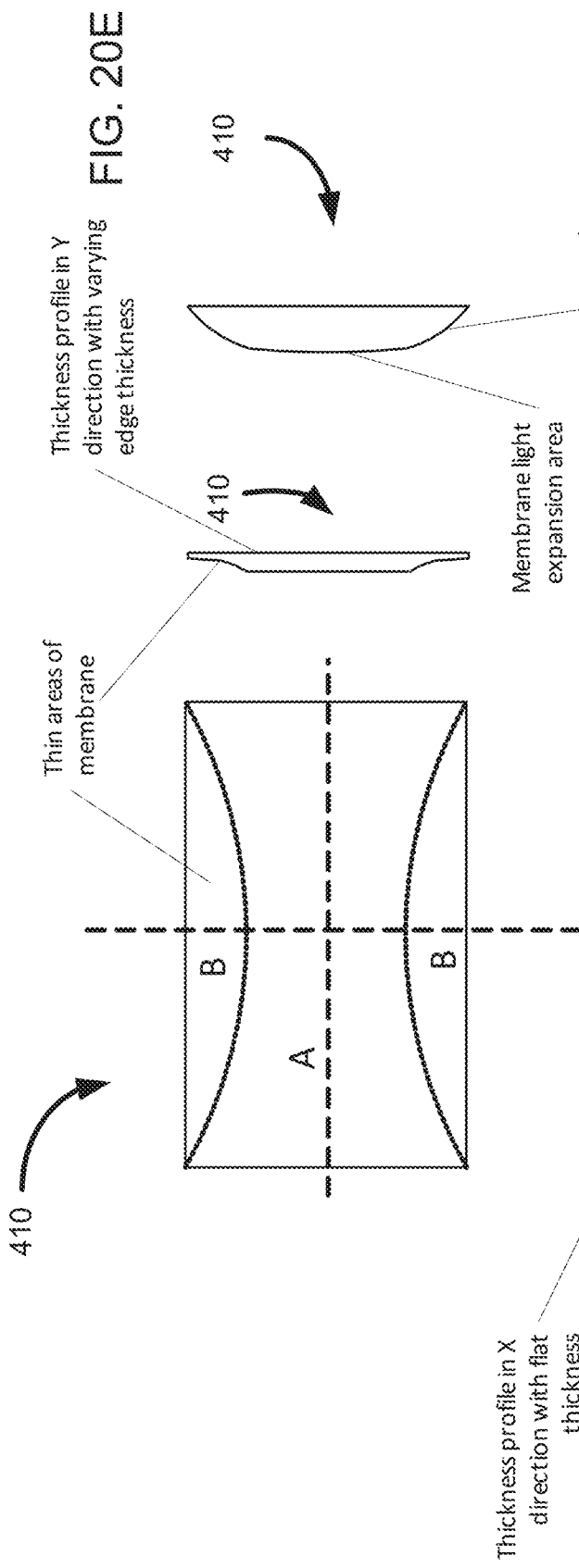

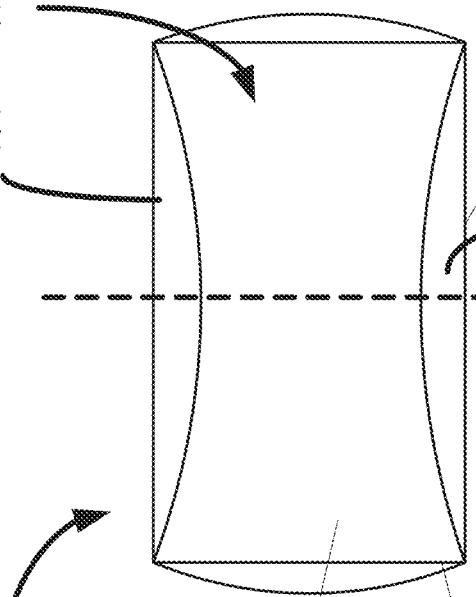

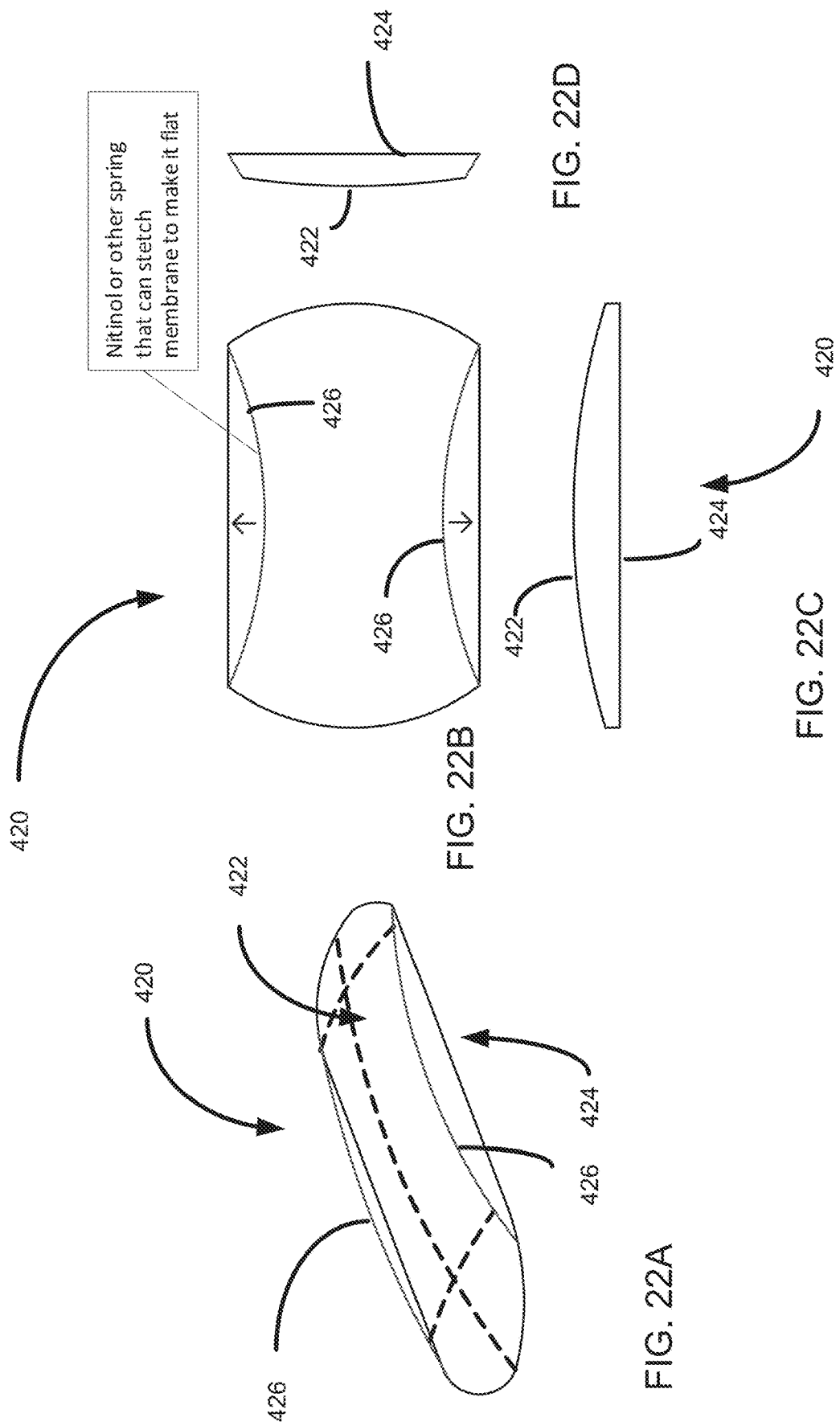

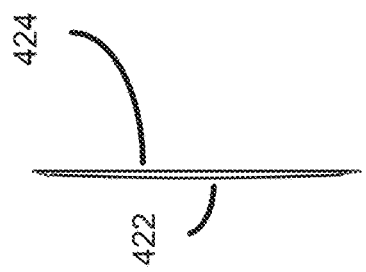
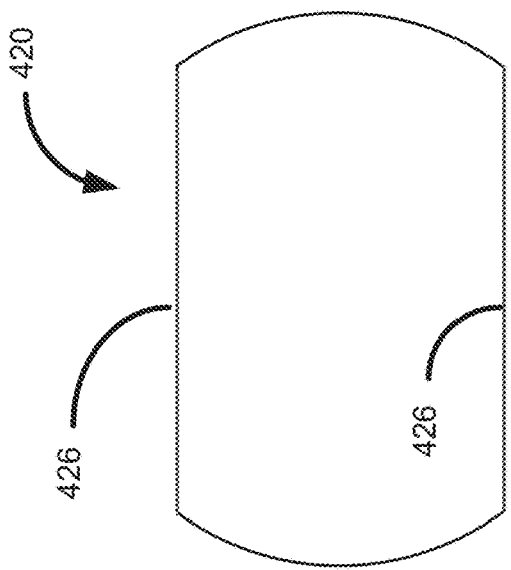
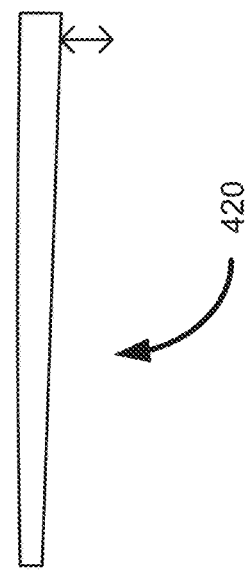
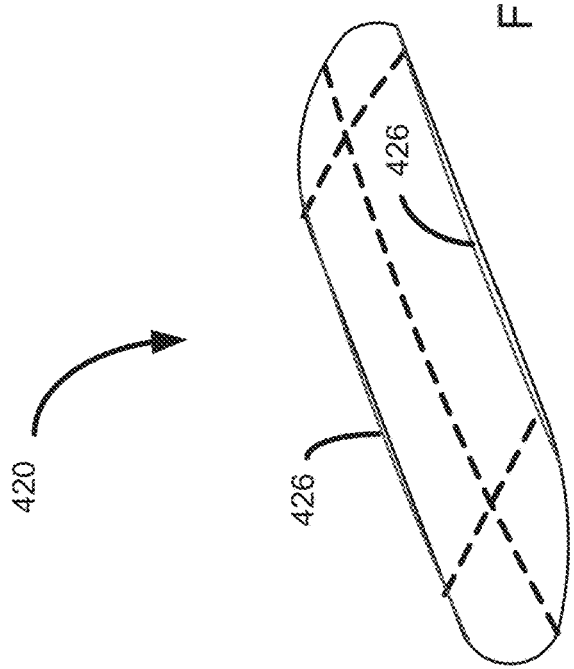
FIG. 23D
FIG. 23C
FIG. 23B
FIG. 23A

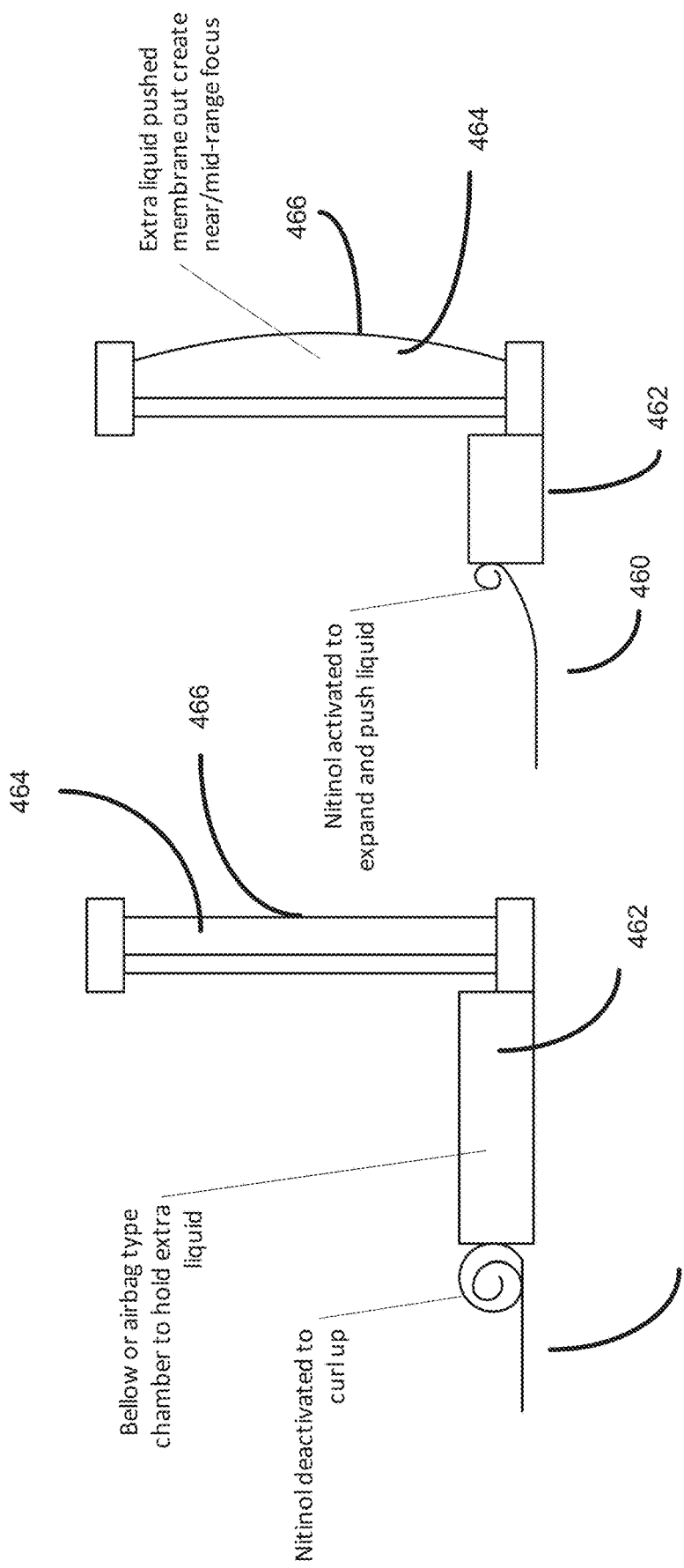

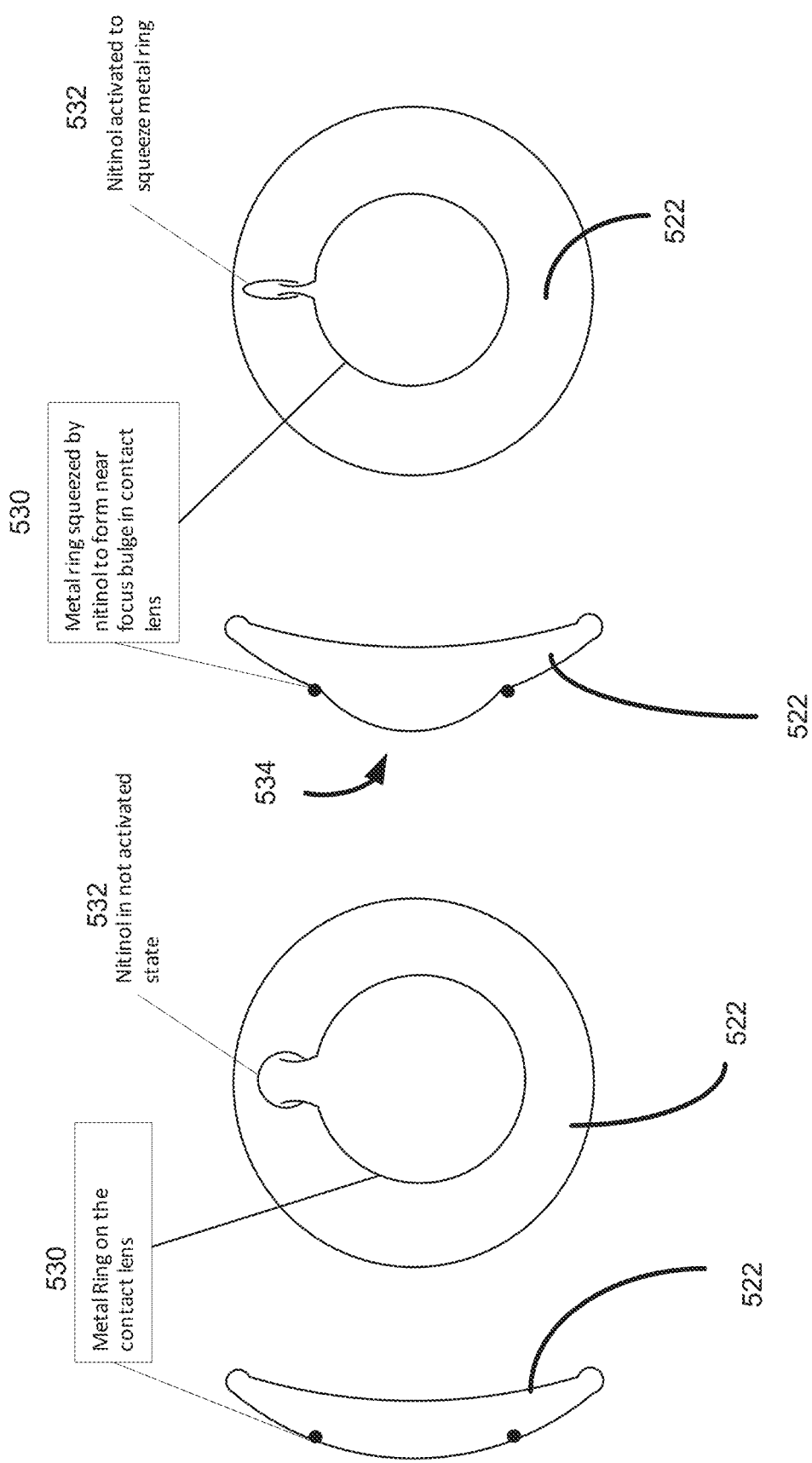

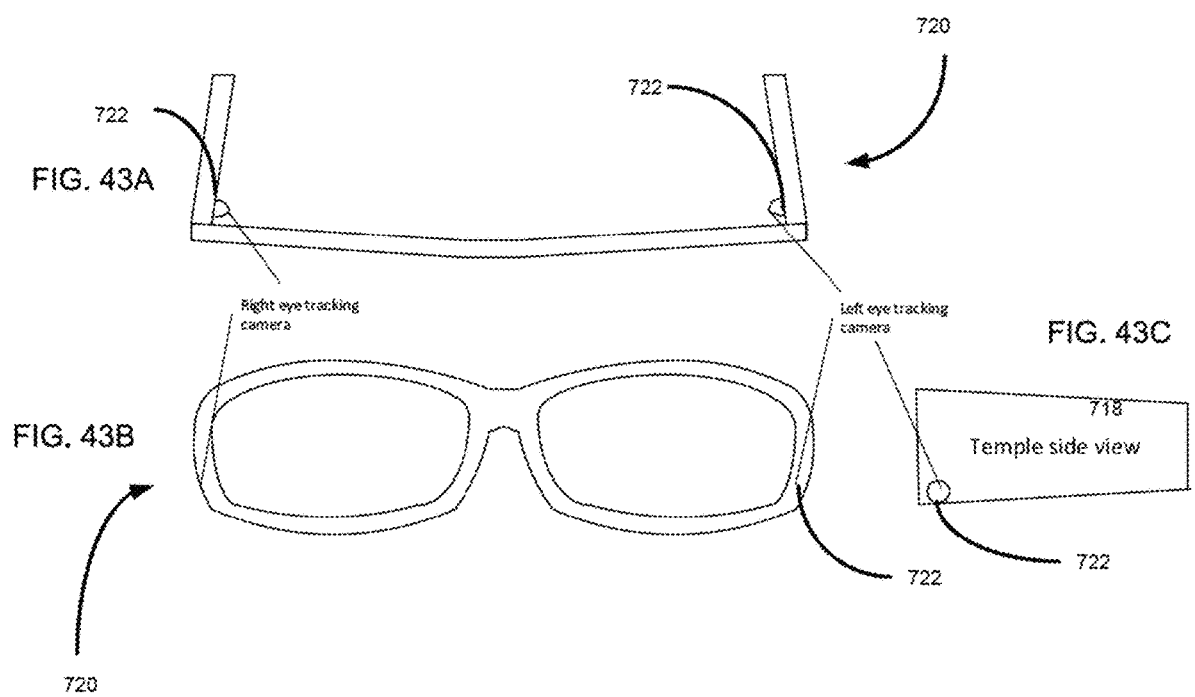

ADVANCED DYNAMIC FOCUS EYEWEAR

RELATED APPLICATIONS

This utility application is a continuation-in-part of U.S. patent application Ser. No. 15/884,823 filed on Jan. 31, 2018 by Ram Pattikonda, Shariq Hamid, and which claims the benefits of U.S. Provisional Patent Application Serial No. claims the benefit of U.S. Provisional Patent Application Ser. No. 62/453,108 by Ram Pattikonda and Shariq Hamid filed Feb. 1, 2017 is hereby incorporated by reference. In addition, this application claims the benefit of U.S. Provisional Patent Application Ser. No. 62/733,577 by Ram Pattikonda and Shariq Hamid filed Sep. 19, 2018 is hereby incorporated by reference. Additionally, this application claims the benefit of U.S. Provisional Patent Application Ser. No. 62/788,446 by Ram Pattikonda and Shariq Hamid filed Jan. 4, 2019 is hereby incorporated by reference. In addition, this application claims the benefit of U.S. Provisional Patent Application Ser. No. 62/807,864 by Ram Pattikonda and Shariq Hamid filed Feb. 20, 2019 is hereby incorporated by reference. Additionally, this application claims the benefit of U.S. Provisional Patent Application Ser. No. 62/856,219 by Ram Pattikonda and Shariq Hamid filed Jun. 3, 2019 is hereby incorporated by reference

BACKGROUND OF THE INVENTION

Field of the Invention

This invention relates to wearable eyewear. Specifically, and not by way of limitation, the present invention relates to wearable eyewear providing automatic near and far focus.

Description of the Related Art

As humans age, it is typical to experience blurred near vision when reading, sewing or working at the computer. This problem, called Presbyopia, is caused by the stiffening of the eye lens muscles as people age. Currently, people suffering from this problem utilize reading glasses, which requires the user to wear the glasses while looking at near objects and take off while looking at far objects. Other alternative solutions are to use bi-focal or progressive lenses. These lenses also suffer from several disadvantages. The user must look down to observe close in objects, such as when reading, and while looking down, far objects will not be clear. They also have blurry areas in the border of different focus areas which can be annoying for viewing. There are some newer technologies having a dynamic focus on a single lens that can adjust focus based on the user's view. One such solution uses two lenses that can be rotated with each other to change focus. Another solution uses electric field on liquid crystal layer to change focus dynamically. These solutions suffer from various complexities and are currently not commercially viable. Additionally, these newer techniques suffer from the reliability of electro-optical function or mechanical and size complexities or high cost or optical clarity. Due to these limitations, currently there is no feasible solution to address the user's presbyopia problem.

It would be advantageous to have eyewear utilizing various technologies that have a slim form factor, appealing looking, wearable, proving conservative power usage with battery operation, compact electronics that can fit in glass temples and provide automatic or manual focus change. It is an object of the present invention to provide such an apparatus.

SUMMARY OF THE INVENTION

In one aspect, the present invention is directed to eyewear providing dynamic focus. The eyewear includes two lenses, a mechanism for detecting a near object viewed by a user of the eyewear and a mechanism for dynamically changing a focus of the lenses. The lenses change focus to a near focus when a near object is detected. The eyewear may be eyeglasses or contact lenses.

BRIEF DESCRIPTION OF THE DRAWINGS

FIG. 5A illustrates a side view of a membrane assembly having a flat glass 162 in a deactivated flat shape;

FIG. 5B illustrates the membrane assembly of FIG. 5A in a midrange focus activated state;

FIG. 5C illustrates the membrane assembly in a near focus activated state;

FIG. 6A illustrates a side view of a membrane assembly having a curve glass in a deactivated flat shape;

FIG. 6B illustrates the membrane assembly of FIG. 6A in a midrange focus activated state;

FIG. 6C illustrates the membrane assembly in a near focus activated state;

FIG. 7A illustrates a side view stack-up of a lens inside a rim lens holder;

FIG. 7B is a front view of the lens of FIG. 7A;

FIG. 9A illustrates a front view of the round lens of FIG. 8;

FIG. 9B is a top view of the round lens;

FIG. 10A is a front perspective view of the silicone sheet;

FIG. 10B is a front view of silicone sheet of FIG. 10A;

FIG. 10C is a cross sectional view of the silicone sheet of FIG. 10A without liquid pressure;

FIG. 10D is a cross section view of the silicone sheet of FIG. 10A with liquid pressure;

FIG. 11A illustrates a top view of a positive power convex lens;

FIG. 11B illustrates the add power of the lens with a liquid compression;

FIG. 11C is a front view of the cavity in the center with the liquid inlet;

FIG. 12A is a top view of a negative power concave lens:

FIG. 12B is a top view of the lens with the add power with a liquid compression;

FIG. 12C is a front view of the lens;

FIG. 13A is a top view of the finish power lens;

FIG. 13B illustrates a first layer with a slot for a dissolved part;

FIG. 13C illustrates the dissolved parts;

FIG. 13D illustrates a second layer printing on top of the dissolved parts;

FIG. 13E illustrates the final step of constructing the lens after printing;

FIG. 15A illustrates a plunger system having a plunger for squeezing the liquid chamber with a lever in an open position in an auto mode;

FIG. 15B illustrates the plunger system with the lever compressing the storage chamber;

FIG. 17A illustrates a front view of a rectangular shaped lens;

FIG. 17B illustrates the front glass sheet within the opening where the membrane is not expanded;

FIG. 17C illustrates the membrane expanding in the opening with higher pressure and providing a spherical focus addition;

FIG. 17D illustrates the front glass sheet bulged to make room for the spherical expansion of the membrane;

FIG. 18A is a front view of an integrated press type liquid lens in another embodiment of the present invention;

FIG. 18B illustrates a side view of the lens with a pivotable back glass in a flat position;

FIG. 18C illustrates a side view of the lens with the back glass pivoted up against a liquid chamber;

FIG. 19A is a front view of a non-round liquid lens with a top lens radius;

FIG. 19B is a side view of the lens;

FIG. 19C illustrates a second side view of the lens of FIG. 19A;

FIG. 20A is a front view of the membrane;

FIG. 20B is a side view of the membrane showing the x direction thickness;

FIG. 20C is a side view of the membrane in expansion;

FIG. 20D is a side view illustrating the membrane showing the y direction thickness;

FIG. 20E is a side view illustrating the membrane when expanded;

FIG. 21A is a front view of the membrane;

FIG. 21B is a first side view of the membrane of FIG. 21A;

FIG. 21C is a second side view of the membrane of FIG. 21A;

FIG. 22A is a front perspective view of the pre-formed membrane;

FIG. 22B is a top view of the pre-formed membrane of FIG. 22A;

FIG. 22C is a first side view of the pre-formed membrane of FIG. 22A;

FIG. 22D is a second side view of the pre-formed membrane of FIG. 22A;

FIG. 23A is a front perspective view of the pre-formed membrane;

FIG. 23B is a top view of the pre-formed membrane of FIG. 23A;

FIG. 23C is a first side view of the pre-formed membrane of FIG. 23A;

FIG. 23D is a second side view of the pre-formed membrane of FIG. 23A;

FIG. 26A is a side view of a Nitinol spring used to compress the bellow;

FIG. 26B is a side view of the Nitinol spring expanding the bellow;

FIG. 32A illustrates a front and side view of the lens and metal ring with a Nitinol strip in an inactive state;

FIG. 32B illustrates a front and side view of the lens and metal ring with the Nitinol strip in an active state;

FIG. 43A is a top view of eyeglasses having cameras;

FIG. 43B is a front view of the eyeglasses of FIG. 43A;

FIG. 43C is a temple side view of the camera placement of eyeglasses;

DESCRIPTION OF THE INVENTION

Figure 1:
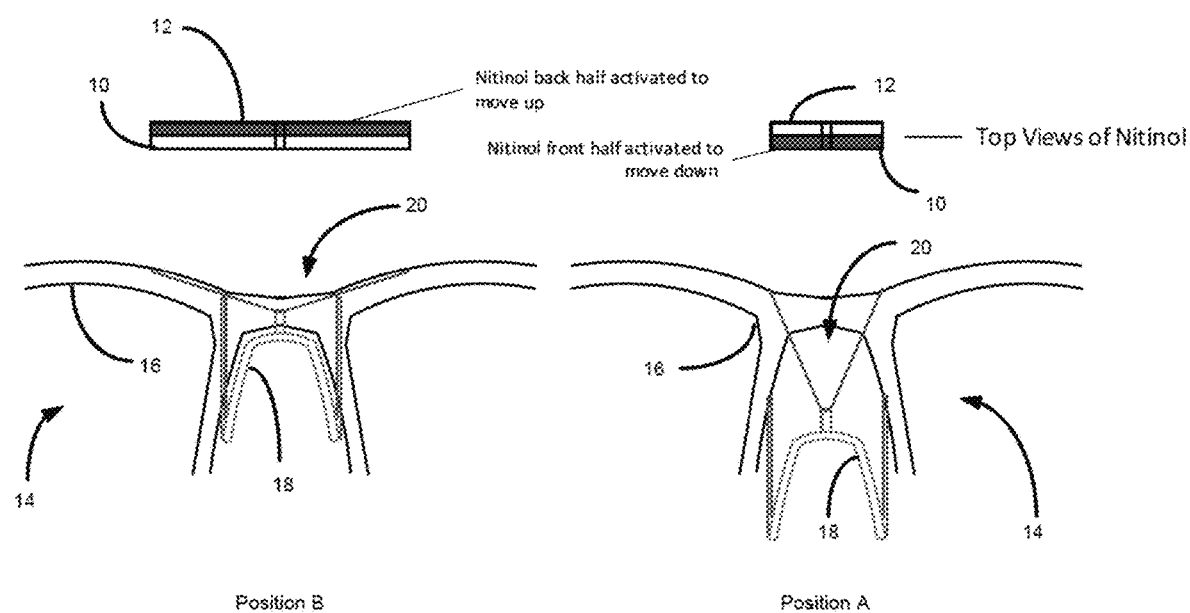
FIG. 1 illustrates a front and top view of Nitinol metal pieces 10 and 12 for use on eyeglasses 14 having a frame.

The present invention is wearable eyewear providing automatic near and far focus. In one aspect of the present invention, a mechanism may be utilized for moving a nose pad on eyeglass frames. Various technologies, such as pneumatic and micro motor for moving the nose-pad in the frame and lifting the progressive lens frame may be used in order for the user to see near focus while looking straight. In another embodiment, nose-pad movement may be accomplished in a very compact form factor utilizing shaped memory alloys. One such alloy is Nitinol, which was invented in 1959. Nitinol takes a pre-formed shape at certain activation temperature. Below this activation temperature it can be flexed. Raising the metal to this set temperature reverts the metal back to a pre-set shape. The set-temperature of the metal can be adjusted based on the alloy composition. In one embodiment of the present invention, shaped memory of an alloy is used to move the nose pad of the eyeglasses and further achieve dynamic focus for the user. FIG. 1 illustrates a front and top view of Nitinol metal pieces 10 and 12 for use on eyeglasses 14 having a frame 16. In this embodiment, two sets of Nitinol metal pieces are used for moving the nose-pad 18 of the eyeglasses 14. The first Nitinol metal piece 10 pushes the nose pad 16 down to position A when heated to its transformation temperature. The second Nitinol metal piece 12 pulls the nose-pad 18 up to position B when heated to its transformation temperature. Optionally a snap is provided in the plastic to hold the nose pad down when pushed down, to prevent collapse due to gravity. Battery power may be used to heat this alloy metal to the desired temperature in order to cause the Nitinol metal piece to react. A pulse coded modulation (PCM) voltage may be used to control the temperature rise of the metal. Nitinol, with its internal resistance, heats up with this applied voltage.

As depicted in FIG. 1, Nitinol shaped memory (Nitinol metal pieces 10 and 12) are used to move the nose-pad of the eyewear frames. Preferably, the nose-pad is guided in the frame with a target movement of approximately 10 millimeters. In its normal position, the nose-pad 18 is in the upper position (position B). In the pushed down position (position A), the nose-pad lifts the frame 16 up. Optionally, a mechanical snap is provided in the up position to prevent the frame 16 from dropping down. The Nitinol pieces provides the motion between these two positions. The Nitinol pieces overcomes the gravity to lift the frame up. Nitinol also overcomes the resistance of a snap mechanism (not shown in FIG. 1) to bring the frame down. Referring again to FIG. 1, the two Nitinol pieces 10 and 12 are secured together to form a two-position actuator 20. The first Nitinol metal piece 10 takes a flat shape (or shallow V shape) at transformation temperature. The second part of the Nitinol piece 12 takes a steep V-shape at transformation temperature (see position A). To move the frame to a normal position, the first part of the Nitinol piece 10 is heated to transformation temperature. To move the frame to the lifted position, the second Nitinol piece is heated to the transformation temperature (see position B).

Figure 2:
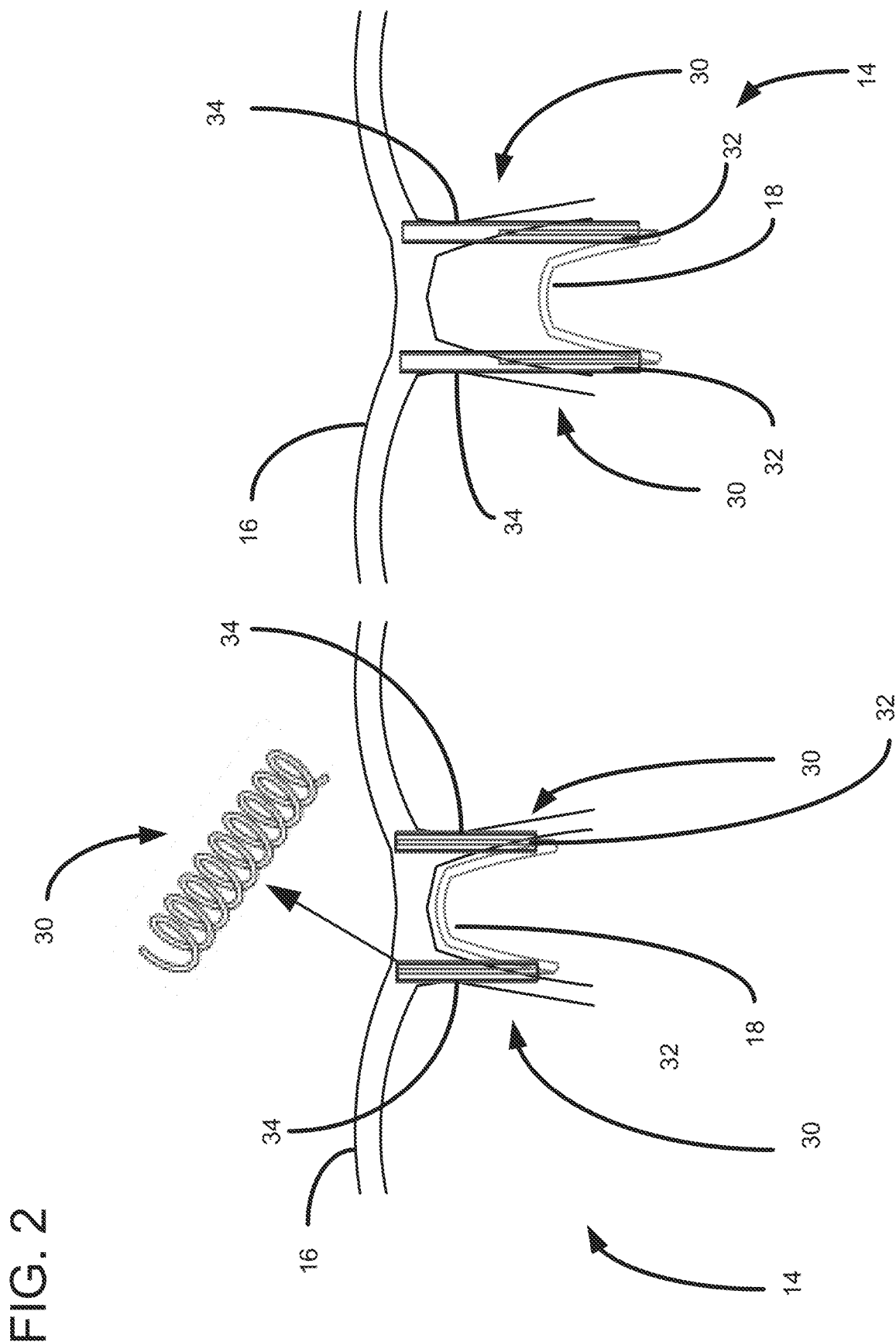
FIG. 2 is a front view of Nitinol coil springs used in another embodiment of the present invention.

FIG. 2 is a front view of Nitinol coil springs used in another embodiment of the present invention. In this embodiment, a two-layer Nitinol coil spring assembly 30 having an inner coil spring 32 and an outer coil spring 34 (one inside another) is utilized. The coil spring assemblies 30 may be position on opposing sides of the nose-pad 18. Nose-pad movement is achieved by heating one of the two coils. The outer coil 34 is preset to an expanded position while the inner coil 32 is preset to compressed position. When the outer coil 34 is heated, the coil 34 pushes the nose-pad 18 down (position A), while heating the inner coil 32 pulls the nose-pad up (position B).

In another embodiment of the present invention, an automatic tunable liquid membrane lens eyewear may be utilized. In this embodiment, liquid lens membrane technology with an electro-mechanical closed loop is used to achieve focus change. It provides dynamic focus to the user to work on near view objects. The device detects users near object view, measures the distance to the object and adjusts the liquid lens to a desired focus automatically or manually. This embodiment provides a solution that is elegant, slim, cost effective and commercially feasible. The user is able to see both far objects and near objects clearly just by looking at that object. Liquid membrane lens has been invented in the early $20^{th}$ century, disclosed and used for various imaging and optical applications. For example, in U.S. Pat. No. 5,138,494 Kurtin (Kurtin) it discloses the use of liquid lens for eyeglasses. However, this patent Kurtin utilizes manual screw adjustments to achieve a desired focus. Kurtin suffers from the disadvantage that it does not automatically adjust the focus nor provide a non-round lens solution. Kurtin also uses a round lens for his liquid lens, which suffers from limited appeal for eyewear. The present invention uses a novel approach of automating liquid lens operation while still providing a slim and presentable look for the eyeglasses. This embodiment achieves this using novel ways of near view detection, smart ways of liquid lens implementation and innovative use of materials and distribution of components to front and side of the eyewear frame.

Figure 3:
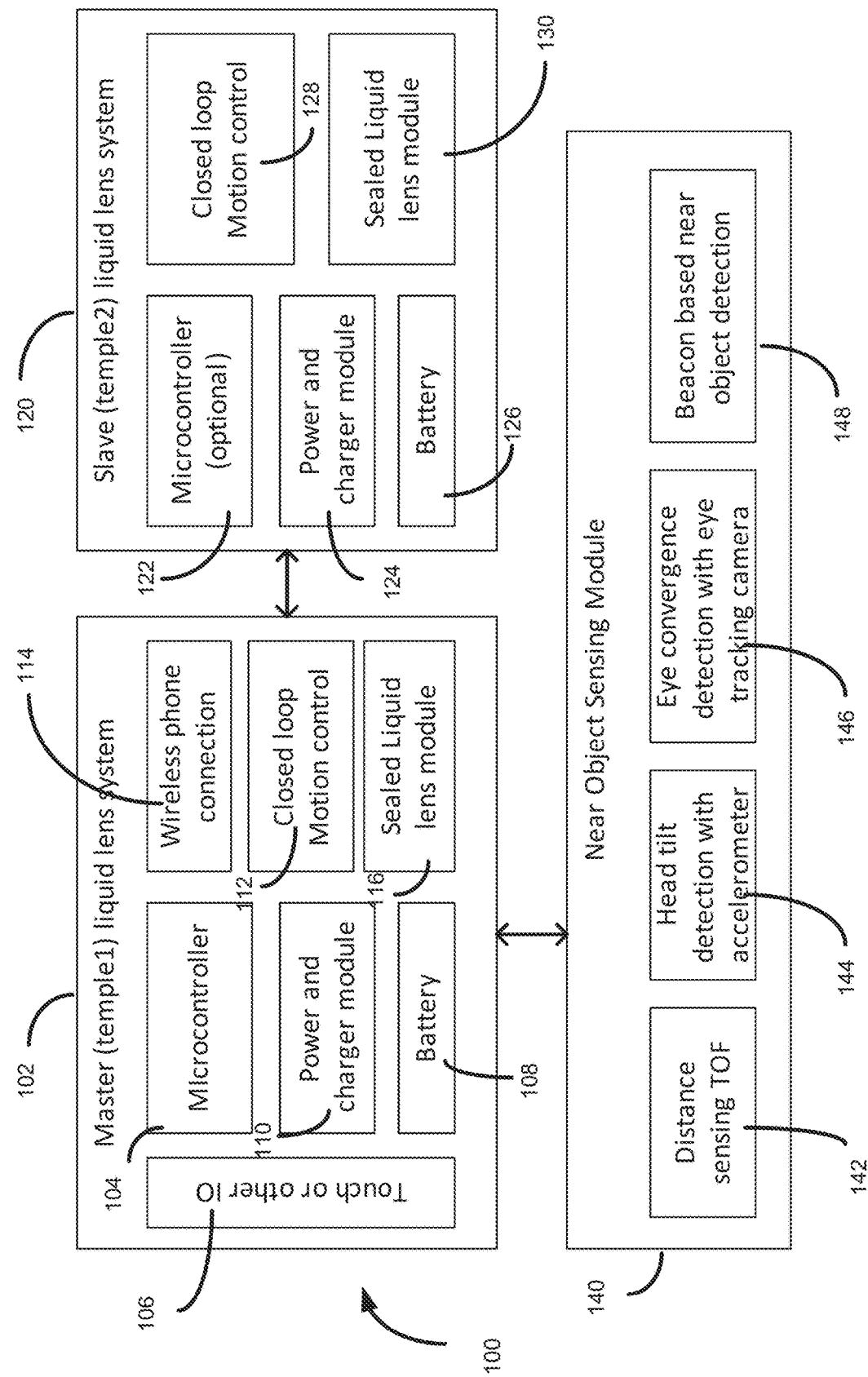
FIG. 3 is a simplified block diagram illustrating the main components of a liquid lens eyewear frame system 100 in one embodiment of the present invention.

FIG. 3 is a simplified block diagram illustrating the main components of a liquid lens eyewear frame system 100 in one embodiment of the present invention. The system utilizes liquid lenses for the left and right eyes of a user with a near object sensing module. The system 100 includes a master system 102, which is located in one temple of the frames 16. The master system 102 may include a microcontroller 104, a touch input interface 106, a battery 108, a power management system (power and charger module) 110, a motion control 112, an optional wireless module (wireless connection) 114 and a liquid lens module 116. The slave system 120 (located in the second temple of the frames 16) includes similar components without the touch input and wireless module. Specifically, the slave system 120 may include an optional microcontroller 122, a power and charger module 124, a battery 126, a closed loop motion control system 128 and a sealed liquid lens module 130. The system 100 may include a near object sensing module 140, located in the frame 16's rim (or front of the temple), uses combination of distance sensing module using time of flight (TOF) 142, head tilt detection and accelerometer 144, an eye tracking module 146, and a beacon detection module 146 to detect user looking at near object. The microcontroller provides control of the system 100 with the distance sensing module 142 and motion control system 128, which is used to drive the liquid lens. The system 100 detects the user looking at a near object with inputs from the near object sensing module 142. Once detected, the system 100 activates the lens motion control system 128 to change the focus of the liquid lens to a desired value. It does this focus change with activating both the right eye and left eye lens motion control units. The microcontroller 104 also manages the battery charging and power management module 124 to drive the motion control. The microcontroller 104 interfaces to the touch input interface 106 (or buttons or any other input) to take user input actions. The microcontroller 104 also interfaces to a mobile phone with wireless technologies, such as Bluetooth to provide status data or pedometer data to the user or for user to change settings of the eyewear.

Figure 4:
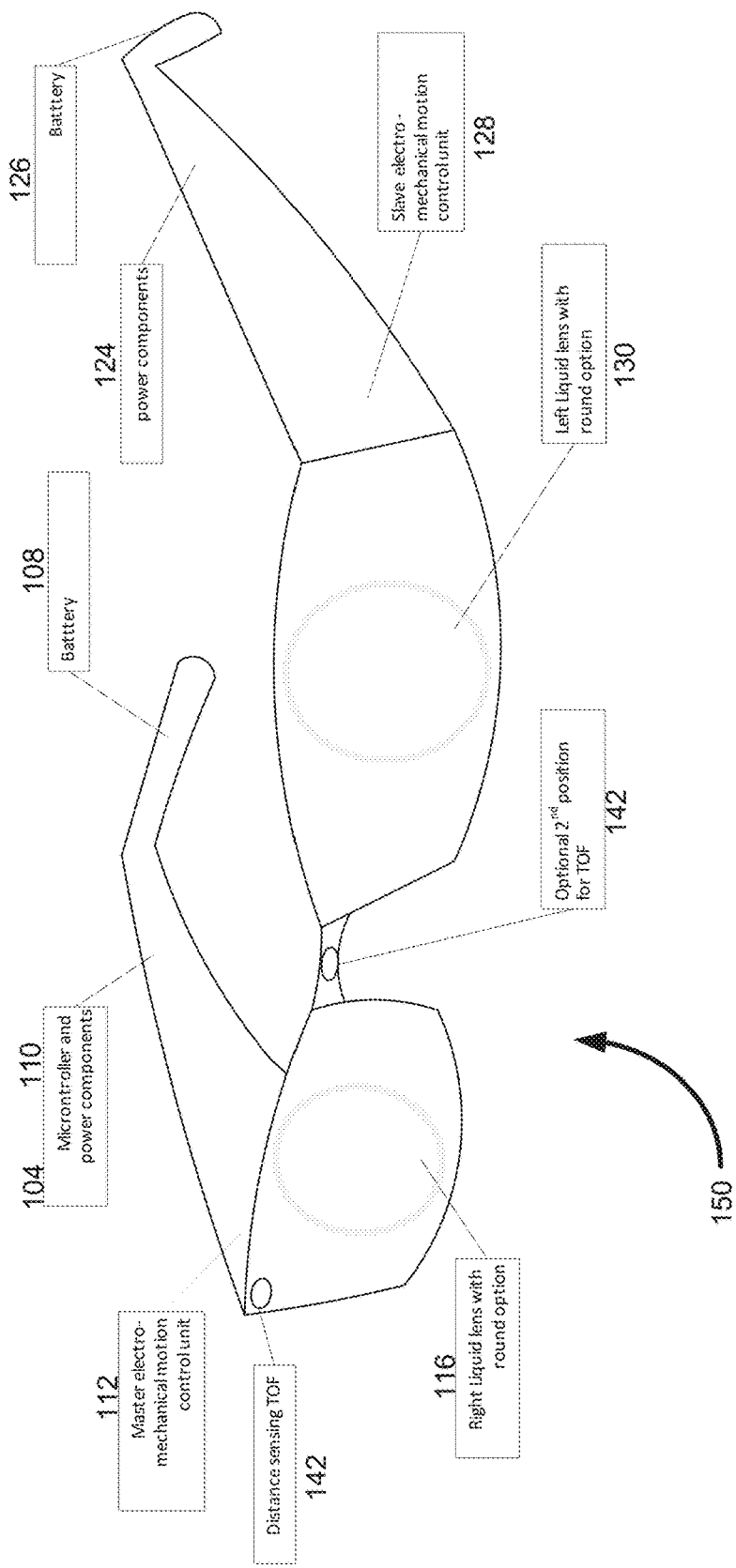
FIG. 4 is a front perspective view of an eyewear frame.

FIG. 4 is a front perspective view of an eyewear frame 150 having a slim and elegant look. Most of the electronic and mechanical components are distributed in a wider design temple. Only the liquid lens optical portion and optionally time of flight (TOF) chips are positioned in the front rim. The rim is designed to be normal looking with minimal technology components. The microcontroller, battery, power management and motion control units are distributed on left and right temples FIG. 5A illustrates a side view of a membrane assembly 160 having a flat glass 162 in a deactivated flat shape. The membrane assembly 160 includes a back-cover glass 164, a high refractive index liquid 166 contained within a frame assembly 168 holding the membrane assembly 160 and a membrane 170 providing a lens shape. FIG. 5B illustrates the membrane assembly 160 of FIG. 5A in a midrange focus activated state. FIG. 5C illustrates the membrane assembly 160 in a near focus activated state. FIG. 6A illustrates a side view of a membrane assembly 180 having a curve glass 182 in a deactivated flat shape. The membrane assembly 180 includes a back-cover glass 184, a high refractive index liquid 186 contained within a frame assembly 188 holding the membrane assembly 180 and a membrane 190 providing a lens shape. FIG. 6B illustrates the membrane assembly 180 of FIG. 6A in a midrange focus activated state. FIG. 6C illustrates the membrane assembly 190 in a near focus activated state.

In the embodiments illustrated in FIGS. 5A-5C and 6A-6C, the users left and right eyes have separate liquid lenses for dynamic focus control. The liquid lens can be simple round shape design or non-round shape design with additional complexity. In both designs the lens includes liquid contained within a membrane designed to expand evenly to provide spherical focus for add focus power. The liquid lens changes optical focus with use of optically clear high refractive index liquid and an optically clear membrane. When pressurized, the liquid inside the chamber makes the membrane bulge spherically to provide change in focus. The back-cover glass and its corresponding membrane are parallel to each other in inactive zero focus state. When activated, in a focus power state, the pumped liquid expands the membrane spherically with a bulge relative to the back-cover glass. This non-symmetric shape of the liquid in the back and front of the membrane assembly provides a lens with a high refractive index.

FIG. 7A illustrates a side view stack-up of a lens 200 inside a rim lens holder 202. FIG. 7B is a front view of the lens 200 of FIG. 7A. The back of the rim has a liquid lens assembly 204 whose focus adds power typically ranging from 0 to 3 (or any other range). This provides a dynamic spherical focus feature. This liquid lens includes the back cover-glass 206, liquid chamber 208 and membrane 210. The front of the rim may include a prescription lens 210 with fixed power that can have combination of spherical power and astigmatism (non-spherical cylindrical power). Alternately a custom liquid lens with the users base power of spherical and astigmatism may be made without the need for a fixed power prescription lens.

Figure 8:
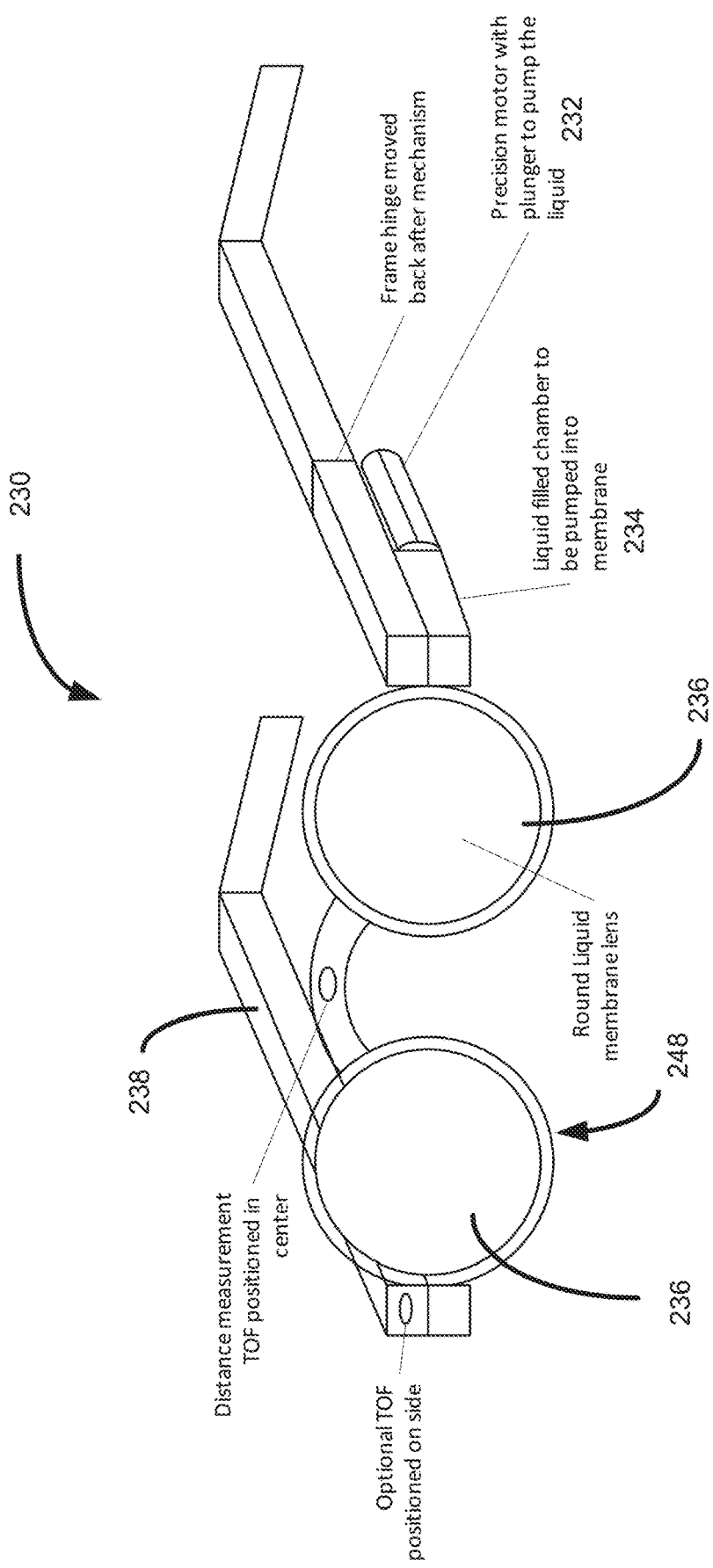
FIG. 8 is a front perspective view of auto focus liquid lens eyeglasses.

FIG. 8 is a front perspective view of auto focus liquid lens eyeglasses 230. The eyeglasses 230 are configured in a round lens frame 238 which uses a feedback loop between a motor 232, a liquid storage chamber 234 (plunger or bellow) and a liquid inside the lens to activate the lens to a desired shape/focus and deactivate to a normal zero focus state. This automated solution detects the user's near object view and activates the liquid membrane lens 236 by turning the precision motor 232, which further pushes the plunger inside the liquid storage chamber 234. This further pushes the liquid into the liquid lens 236 which pushing the membrane of the liquid lens to the desired shape. The change in shape of the membrane changes the focus of the eyeglasses. FIG. 8 illustrates the components using a round lens frame. The liquid in the storage chamber 234 is connected to the lens liquid and fully sealed in a plunger tube or bellow. The plunger pushes this bellow to push the liquid inside the lens. The liquid flows back and forth between the liquid chamber and the lens liquid area to create a zero focus and add power in the lens. In an automatic mode, any object viewed closer than near view, e.g., 3 feet, is focus compensated by the liquid lens. The compensation can be in steps or in continuous mode. In step mode, focus is changed to near focus or intermediate add focus powers. In a continuous mode, the focus is varied based on the distance of the object viewed. This is similar to the way the human eye lens works. In manual mode, the user can adjust the add focus power using a sliding touch or turning knob to his required focus.

FIG. 9A illustrates a front view of the round lens 236 of FIG. 8. The round lens 236 includes a round membrane 242 and a back glass 244 attached to the frame of the eyeglasses 230. FIG. 9B is a top view of the round lens 236. A front glass 246 covers the no circle portion of the lens and holds the round membrane 242 in place in the frame 248 of the lens 236. The round lens uses clear optical bonding between the front and back glass. Additionally, a gap 250 is provided for liquid to flow into the chamber 234.

Preferably, the liquid lens requires its shape to be round. This allows the membrane to expand evenly in all directions including horizontal and vertical to achieve a spherical focus. However, the round lens shape is often not considered fashionable for eyewear frames. The present invention may utilize different options to achieve an appealing lens shape for eyewear frames while making the membrane expand evenly in all directions to achieve a spherical focus.

In another embodiment, a non-round silicone sheet 280 may be used with a round cavity 282 in its middle. FIG. 10A is a front perspective view of the silicone sheet 280. FIG. 10B is a front view of silicone sheet of FIG. 10A. FIG. 10C is a cross sectional view of the silicone sheet of FIG. 10A without liquid pressure. FIG. 10D is a cross section view of the silicone sheet of FIG. 10A with liquid pressure. In this embodiment, a rectangular or any other non-round shaped silicone lens is made with the round cavity 282 in the center of the silicone sheet 280. The cavity creates thin membranes in front and back of it. The cavity is connected to an external liquid chamber with a small inlet 284. The lens is stretched and held firmly with the frame rim. When liquid is pumped into the cavity, the front and back membranes of the cavity will bulge spherically and change focus. Focus can be adjusted dynamically by the amount of fluid pumped into the cavity. A silicone oil or any other optical fluid that matches the refractive index of the silicone sheet is used to conceal the cavity and its internal surfaces. When cavity membranes are flat, the lens has zero focus power. The lens is held peripherally with frame with proper stretch to prevent distortion during focus change. Optically clear silicone materials such as Polydimethylsiloxane (PDMS) may be used. In addition, materials, such as ultra-thin stretchy glass with high elasticity, may be used for the molding of the cavity lens. This ensures that the liquid is held under pressure during expansion to prevent gravity effect and other turbulences during liquid flow. This embodiment produces a silicone lens with zero focus power in the off state. Any additional spherical and cylindrical base power for the user's prescription needs to be achieved with an additional lens in front of the liquid lens. In a modified design, the silicone lens may have custom prescription power in off state. The lens can be made with custom tooling or with silicone Three-dimensional (3D) printing. The 3D printing allows each lens to be custom printed as per the user's prescription spherical and cylindrical power. A cavity in the middle of the lens is provided during the manufacture of the lens. When the pressure of the liquid in the cavity is increased, the cavity membranes in front and back bulge spherically to give add power to the lens.

In one embodiment, the positive power lens may add additional add power, while the negative power lens negates the negative power with add power. FIG. 11A illustrates a top view of a positive power (+2) convex lens 290 with the cavity 282. FIG. 11B illustrates the add power of the lens with a liquid compression (+3). FIG. 11C is a front view of the cavity in the center with the liquid inlet 284. FIG. 12A is a top view of a negative power concave lens 296 with a cavity (−1). FIG. 12B is a top view of the lens with the add power with a liquid compression (+1). FIG. 12C is a front view of the lens 296.

The silicone sheet 280 with the cavity 282 in the middle may be molded in various ways. In one embodiment, a soluble hard material is placed in the center of the mold during molding process. After the mold is complete, the soluble material is dissolved and taken out from the liquid inlet hole. Alternately, a powdered clay type material may be used which is crushed and poured out of the liquid inlet after the mold is complete. Material such as water soluble PVA or D-Limonene soluble HIPA is used for the dissolve the solid part. Low melting point materials, such as wax, also could be used for core material. In another process, top half and bottom half sheets with cavity slots are bonded together to form a cavity in the middle. A three-step 3D printing technique may also be used to create cavity lens with custom prescription power. A silicone or any other transparent elastic material 3D printing may be used for this process. In one embodiment, a first layer is printed with slots to place the dissolvable parts (FIG. 13B). Solid dissolvable parts are made and placed in the slots of the first printed layer (FIG. 13C). The printing is continued on top of the first layer and the dissolvable part (FIG. 13D). At the end of printing, the dissolvable part is sealed in the silicone with small exposure. This finished part is placed in a dissolvable solution to dissolve the solid part (FIG. 13E). The silicone is left with cavity in the dissolve area. FIGS. 13A-13E illustrates the steps of 3D printing of a custom focus power lens 298. FIG. 13A is a top view of the finish power lens 298. FIG. 13B illustrates a first layer 300 with a slot for a dissolved part. FIG. 13C illustrates the dissolved parts 302 and 304. FIG. 13D illustrates a second layer 306 printing on top of the dissolved parts. FIG. 13E illustrates the final step of constructing the lens 298 after printing. In other embodiments, curved lens may also be printed in similar process.

Figures 14A, 14B:
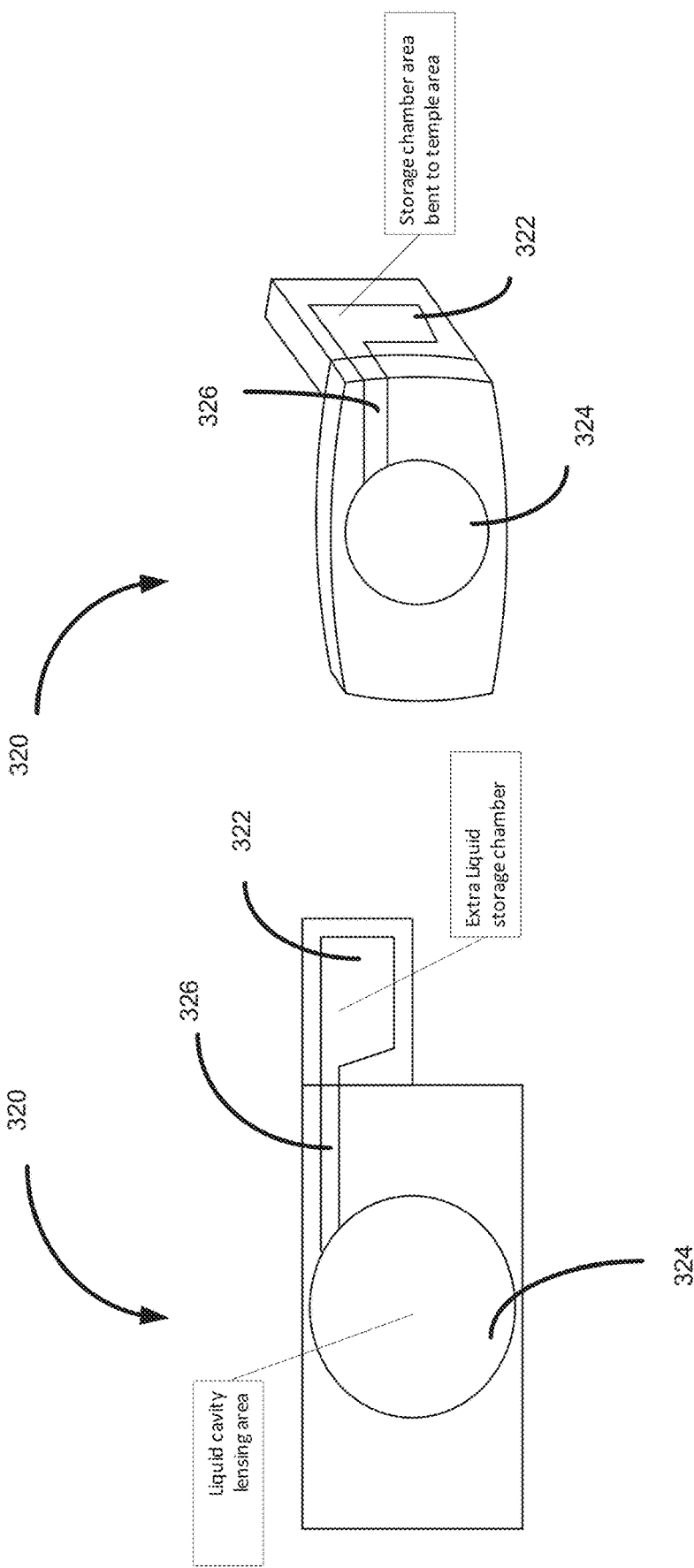
FIG. 14A is a front view of the integrated lens.
FIG. 14B is a front perspective view of the integrated lens of FIG. 14A.

In one embodiment, the present invention utilizes an integrated lens 320 having a liquid cavity and liquid pumping chamber 322. FIG. 14A is a front view of the integrated lens 320. FIG. 14B is a front perspective view of the integrated lens of FIG. 14A. The lens 320 includes a central cavity 324 having the built-in liquid chamber 322. The chamber 322 and the central cavity 324 are connected with an internal channel 326 for liquid to flow back and forth. When add power is needed, the storage chamber 322 is squeezed. This pushes liquid into the main cavity 324 area making the silicone bulge for add focus power. When the storage chamber 322 is released, the liquid flows back from the cavity 324 area to the liquid chamber 322 due to pressure in the cavity area. The squeezing of the storage chamber 322 is achieved automatically with motors actuating a plunger or manually with a turn knob pushing the plunger (not shown in FIGS. 14A and 14B).

In one embodiment, the liquid pumping is accomplished with an auto mode. A motor is driven with electronics to squeeze the storage chamber. FIG. 15A illustrates a plunger system 330 having a plunger 336 for squeezing the liquid chamber with a lever 332 in an open position in an auto mode. FIG. 15B illustrates the plunger system 330 with the lever 332 compressing the storage chamber 322. The motor rotates a snail/drop cam 334 which further pushes or releases the plunger lever 332. As shown in FIG. 15б, the plunger when pushed, squeezes the liquid chamber and this further pushes the liquid into the cavity area, producing add power in the center area of the lens.

Figures 16A, 16B:
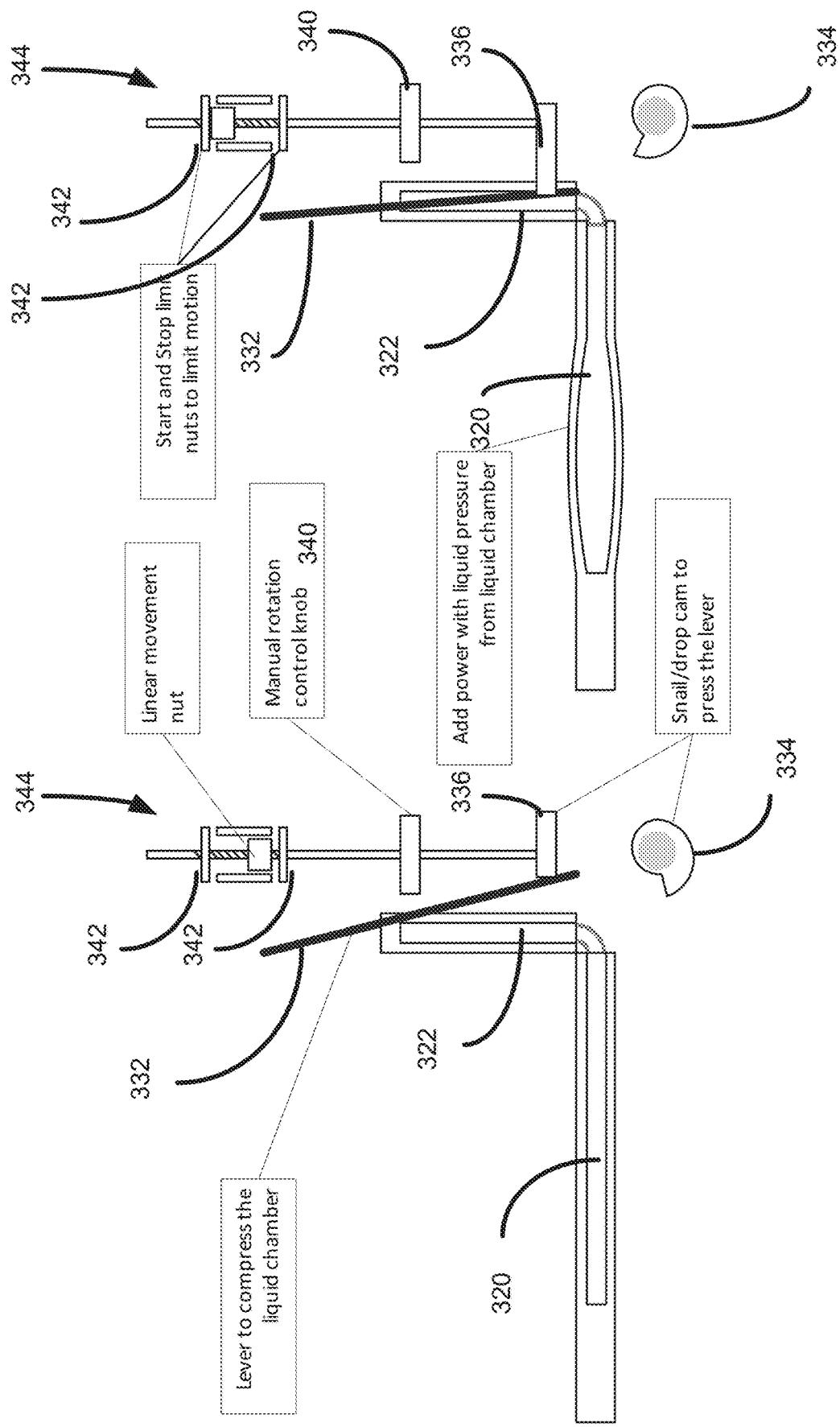
FIG. 16A illustrates the lever in an open position in a manual mode.
FIG. 16B illustrates the lever compressing the storage chamber in the manual mode

In another embodiment, liquid can be pumped to the integrated lens in a manual mode. FIG. 16A illustrates the lever 332 in an open position in a manual mode. FIG. 16B illustrates the lever 332 compressing the storage chamber 322 in the manual mode. In manual mode, rotation of a control knob 340 rotates the snail/drop cam 334 which further pushes plunger lever 332 to push the liquid from the storage area 322 into the lens cavity of the integrated lens 320. The manual mode also provides customizable lower (for zero power) and higher limiter 342 (for users read power) for the rotation of control knob. This allows the user to move easily in his focus range. This is achieved with extending a shaft with a screw and linear nut mechanism 344. As the user turns the control knob, the linear nut moves back and forth. Two limiters 342 are provided for the user to adjust his movement limits. The rotation of the knob is then limited to linear movement of the start and stop limiters 342.

In one embodiment, the lens and the liquid lens membrane are in non-round shapes, where the membrane is allowed to expand only in the round area of the lens. This round area enables the membrane expanding equally in x and y providing spherical focus. The non-round area has a transparent hard material to hold the membrane down. This hard material may have a similar refractive index as the round area to make the edge between them least visible. FIG. 17A illustrates a front view of a rectangular shaped lens 350. Although a rectangular shaped lens is depicted, the present invention may be embodied in any shape, such as an oval shape lens. The lens 350 includes a membrane 352 sandwiched between two hard non-flexible glass sheets, a front glass sheet 354 and a back-glass sheet 356. The back sheet 356 provides the base to store the liquid. The front glass sheet 354 is located in front of the membrane 352. The front glass sheet 354 includes a round opening 358 where the membrane is centered and configured to expand in. Alternately, the front glass sheet 352 may have a bulged surface in the center round area for membrane to expand (see FIG. 17D). With higher pressure applied to the liquid, the membrane 352 expands in the opening 358 to provide the required focus. FIG. 17B illustrates the front glass sheet 354 within the opening 358 where the membrane is not expanded. FIG. 17C illustrates the membrane 352 expanding in the opening 358 with higher pressure and providing a spherical focus addition. FIG. 17D illustrates the front glass sheet 354 bulged to make room for the spherical expansion of the membrane 352. In this embodiment, vent holes are provided in key areas of the periphery of the top glass sheet for air to escape during membrane expansion. The pressure of the lens liquid can be increased either by pushing the liquid though a tube connecting to the external liquid storage chamber or by pushing the back cover the lens assembly to increase the pressure of the liquid.

In another embodiment, a back-cover lens assembly may be used for pressing the liquid in the lens assembly. In an integrated back push design, a silicone pack engulfs the back cover and liquid chamber fully sealing it. The back sheet is hinged on one side and moveable on the other side. The back sheet can be pushed back and forth with a motor by a cam or linear screw. When the back cover is pushed, it increases the pressure of the liquid, which makes the silicone membrane bulge, thereby providing additional focus power. When the back plate is pulled back, the pressure is decreased making the silicone membrane flat for zero focus power.

FIG. 18A is a front view of an Integrated press type liquid lens 380 in another embodiment of the present invention. As depicted in FIG. 18A, an oval transparent hard plastic sheet 382 with a round opening 384 in the center is over-molded with silicone 386. This fully transparent lens 380, while having a non-round shape, enables the lensing effect to occur only in the center opening 384 area. FIG. 18B illustrates a side view of the lens 380 with a pivotable back glass 388 in a flat position. FIG. 18C illustrates a side view of the lens 380 with the back glass pivoted up against a liquid chamber 390. In this embodiment, the over-molded silicone is extended behind the lens to create skirting 392 around the lens system. This skirting is sealed behind with a transparent back glass with another over-molding or clipping. A ring snaps around the silicone and back glass to create a fully sealed liquid chamber. High refractive index liquid 394 is filled in the liquid chamber 390 between a front membrane 396 and the back glass 388. The front membrane and back glass are held together at a hinge 398 on one side and actuated by an actuation mechanism 400, such as a motor on an opposing side. When the actuator mechanism 400 presses the back glass on one side, it creates pressure on the liquid chamber 390, thereby pressing the silicone front membrane in lens shape.

In another embodiment, the present invention may be implemented for a non-round frame with a front and back member container. FIG. 19A is a front view of a non-round liquid lens 402 with a top lens radius. FIG. 19B is a side view of the lens 402. FIG. 19C illustrates a second side view of the lens 402 of FIG. 19A. The lens 402 includes a front glass sheet 404 which is shaped in the surface radius (both in x and y directions) of the final desired shape of the membrane (not shown). Since the width of the vertical (y) axis is smaller than the horizontal (x) axis, the profile of the top glass is different in the x and y axis as shown in FIGS. 19A-19C. This allows the top glass sheet 404 to have a spherical focus shape. When the membrane expands, it initially expands in a non-spherical shape. With higher pressure of liquid, the membrane finally conforms to the surface of the top glass sheet providing a spherical focus addition. Vent holes are provided in the top glass sheet for air to escape during the membrane expansion. The limitation of this design is that the membrane can take either 0 focus shape or the desired final focus shape. In between these two shapes, the membrane has a spherical aberration and does not provide spherical focus.

In another embodiment, a non-uniform membrane 410 that expands to spherical shape may be utilized. FIG. 20A is a front view of the membrane 410. FIG. 20B is a side view of the membrane 410 showing the x direction thickness. FIG. 20C is a side view of the membrane in expansion. FIG. 20D is a side view illustrating the membrane showing the y direction thickness. FIG. 20E is a side view illustrating the membrane when expanded. The membrane 410 is designed with varying thickness so that it expands unevenly in vertical-horizontal axis, but evenly in the center area to achieve spherical focus in the center. As shown in the FIG. 20A, the 'A' areas of the membrane are fixed thickness and thicker. The 'B' areas of the membrane are thinner areas with transitioning to thicker. When pressured, the membrane first expands in the thin areas with steep radius. The 'A' area of the membrane expands with even radius in X and Y directions, thus achieving spherical focus addition in this area. The membrane maintains its spherical surface radius from 0 focus addition to max focus addition. Similar results may be achieved by stretching the membrane non-evenly in two axes. The axis with a stronger stretch has higher strength versus the axis with smaller stretch. By controlling the stretch in the longer and shorter axis, spherical curvature is achieved in the center. This can be further combined with varying thicknesses of the membrane to achieve spherical surface expansion using a non-round membrane.

In another embodiment, a membrane 410 may be pre-formed with a fixed side profile. FIG. 21A is a front view of the membrane 410. FIG. 21B is a first side view of the membrane 410 of FIG. 21A. FIG. 21C is a second side view of the membrane 410 of FIG. 21A. In this embodiment, the membrane is made from parts of stretchable material 412 and parts from not stretchable fabric 414. The stretchable material area is used to give the spherical shape in the fully expanded position. The non-stretchable material area guides the stretchable portion in order to maintain the same radius in x and y axis. As shown in FIG. 21A, the stretchable material 412 may be constructed of a PDMS silicone. The non-stretchable material may be constructed from such materials as metal mesh fabric. When the membrane is filled with liquid, the non-stretch material 414 expands first to its final position. At this position, the stretchable material 412 expands only with the same radius in x and y directions. Thus, the expanded membrane has a spherical radius and provides spherical focus addition (see FIG. 21C). Alternately, the non-stretch portion may be constructed of a metal mesh over-molded with silicone. The silicone sheet is made with metal mesh in non-stretch areas.

In another embodiment, a membrane 420 may be pre-formed with Nitinol or another spring. FIG. 22A is a front perspective view of the pre-formed membrane 420. FIG. 22B is a top view of the pre-formed membrane 420 of FIG. 22A. FIG. 22C is a first side view of the pre-formed membrane 420 of FIG. 22A. FIG. 22D is a second side view of the pre-formed membrane 420 of FIG. 22A. FIGS. 22A-22D illustrate the membrane 420 in an expanded state. FIG. 23A is a front perspective view of the pre-formed membrane 420. FIG. 23B is a top view of the pre-formed membrane 420 of FIG. 23A. FIG. 23C is a first side view of the pre-formed membrane 420 of FIG. 23A. FIG. 23D is a second side view of the pre-formed membrane 420 of FIG. 23A. FIGS. 23A-23D illustrate the membrane 420 in a zero-focus state. In this embodiment, the membrane 420, such as a silicone sheet, is formed in the final exterior shape of the expanded liquid lens. As seen in the FIG. 22A, the membrane 420 has a shape similar to rectangle lens of eyewear. The top surface 422 of the liquid lens conforms to the normal lens profile. The bottom of the lens has a bottom flat surface 424. When filled with liquid, this works like a normal spherical lens with add focus. When liquid is pulled out of the lens, the membrane is stretched to flat shape where the lens has zero add focus (FIGS. 23A-23D). The stretching of the membrane can be achieved by using spring loaded link or a Nitinol spring 426. In one of the embodiments, the Nitinol wire or spring 426 is embedded in the lens. To make the membrane 420 flat, the liquid is pumped back from the lens and the embedded Nitinol spring 426 is stretched flat by activating it and making it straight in the horizontal axis. The Nitinol spring 426 is heated to take its activated straight shape. When the Nitinol gets straight from its curved shape, it stretches the silicone to a flat shape. When activated, the Nitinol may be positioned to mechanically snap so that it does not need to be powered on. When the lens add focus is needed, the Nitinol is deactivated, and the liquid pumped back into the front portion. Nitinol takes free curved shape and lens expands with spherical surface. The liquid may be pumped back by either a bellow-based pump or by pushing the back plate of the lens system to the front. In the embodiments illustrated in FIGS. 22A-22D and 23A-23D, the back plate of the lens is moved back and front to push liquid front (for add focus) and back (for flat zero focus). This movement can be achieved with a linear motor or motor with linear screw or with two state activated Nitinol wires or springs.

Figures 24A, 24B:
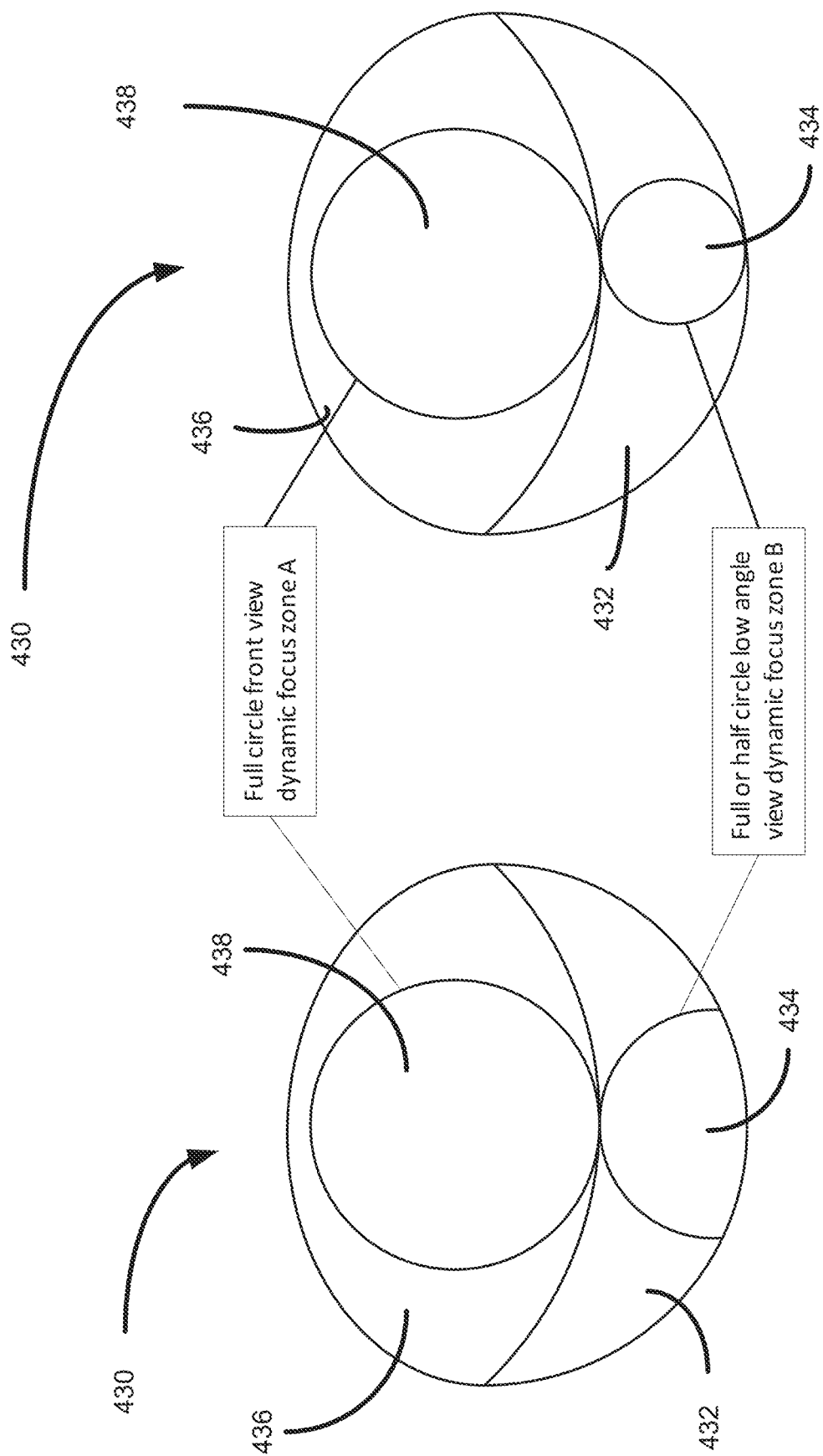
FIG. 24A illustrates the hybrid dynamic lens with a half circle view.
FIG. 24B illustrates the hybrid dynamic lens with a full circle view.

In another embodiment of the present invention, a hybrid dynamic lens 430 having two or more dynamic zones may be utilized. While the dynamic lens in the straight view of the user solves the focus needs of near and far objects, it can be a deterrent when a user is actively switching between near and far objects and the lens is changing focus frequently. In this scenario, a two-zone dynamic lens 430 may be beneficial where a lower portion 432 may be a full or half circle low angle view 434 that may be adjusted for near focus and center-upper portion 436 may include a full circle front view 438 for far focus. FIG. 24A illustrates the hybrid dynamic lens 430 with a half circle view 438. FIG. 24B illustrates the hybrid dynamic lens 430 with a full circle view 438. The proposed hybrid dual zone dynamic focus lens gives the user flexibility in setting near and far focus in two zones. The user may use dynamic focus independently in two or more zones, using near focus in bottom view 434 or in near focus in straight computer view. The front zone or view 438 may be fully automated with dynamic focus. The lower view or zone 434 may be manually adjusted to any fixed focus position. They may be mixed and matched with auto or manual control.

To determine lens activation mechanics, once the near object viewing is detected and distance to the viewed object is determined, the desired focus is calculated using the interpolation between the calibrated values or the user's near focus power and far focus power Desired focus F1=(F0−F2)*D/22
F0: Focus calibrated at 8"
F2: Focus calibrated at 30"
D: Distance to viewed object
Desired focus F1 (second method)=F0+(F2/(14−D))
F0: User's add power (measured at 14")
F2: Focus range default value for far focus, typically 0
D: Distance to viewed object From this desired focus, the amount of motion required to pump the desired amount of fluid into the liquid lens is calculated. This calculation is based either on theoretical calculation (based on liquid chamber size and liquid lens size) or using the calibrated motion required to achieve desired focus ranges.

Figure 25:
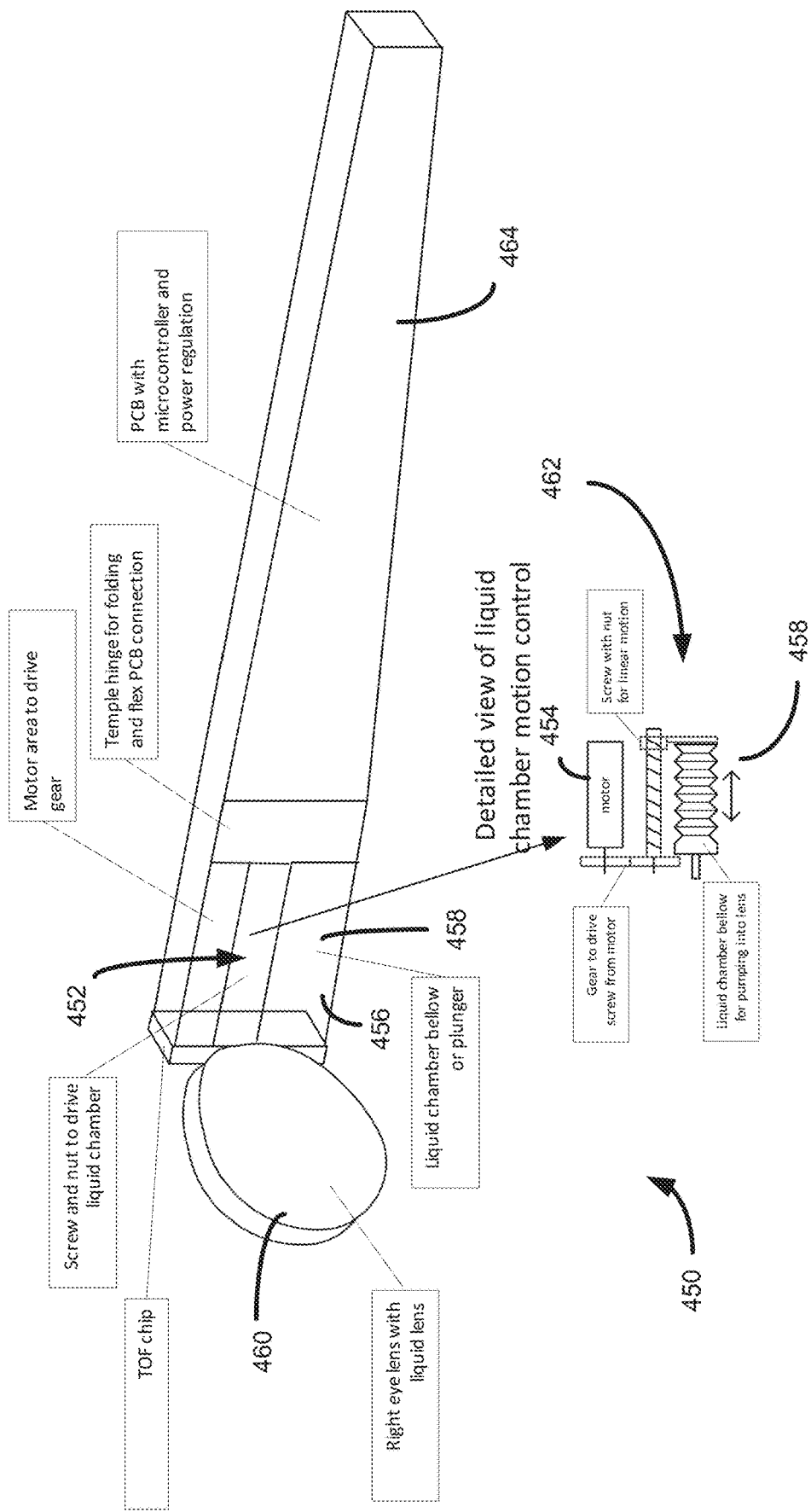
FIG. 25 is an enlarge side view of a right portion of eyewear frames having a right temple arm illustrating a motor drive in one embodiment of the present invention.

FIG. 25 is an enlarge side view of a right portion of eyewear frames 450 having a right temple arm 464 illustrating a motor drive 452 in one embodiment of the present invention. In a linear pumping motor design, a motor 454 is driven to a desired rotation which moves a nut and connected screw assembly 462 to desired position. The nut further drives the compressed position of a liquid storage chamber 456 contained in a bellow or plunger tube 458. The liquid storage chamber 456 is compressed to a desired position. The storage chamber is connected to a liquid lens 460 with a fully sealed channel. At a calculated position of the bellow, the liquid lens 460 has an expected bulge and thus estimated focus. The focus of the lens may be precisely controlled with rotation of the motor 454. The motor 454 may have an additional feedback encoder, such as magnetic or optical encoder, to get the precise position. Alternately, a stepper motor with home position may also give a feedback loop for position. As an alternate to a rotary motor, a linear motor may be used to compress the liquid storage chamber.

In another embodiment, a Nitinol spring 460 may be used to compress or expand a bellow 462. FIG. 26A is a side view of a Nitinol spring 460 used to compress the bellow 462. FIG. 26B is a side view of the Nitinol spring 460 expanding the bellow 462. This can result in two position control of the bellow that results in zero add focus or full add-focus power. The Nitinol memory spring 460 may be used to push the liquid 464 into the liquid membrane lens 466 for near/mid-range focus without using complicated a motor and plunger system (FIG. 26B). The Nitinol element is activated by heating one set of the Nitinol elements in the coil. This will push the liquid chamber and pump the liquid into the lens to deflect the lens membrane. During far viewing, the Nitinol is pulled back to deactivated state by heating the second set of Nitinol elements which will make it curl back (FIG. 26A). This will make the liquid come back from lens to chamber making the lens membrane flat.

Figure 27A:
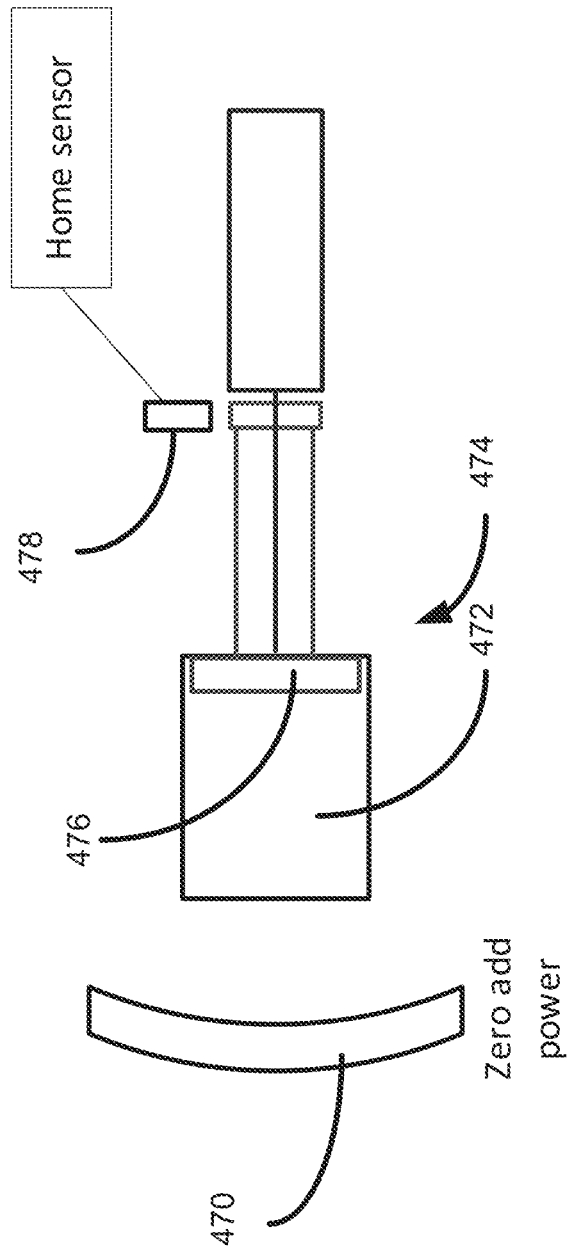
FIG. 27A illustrates the motor plunger actuator in the position calibrated for zero add power.
Figure 27B:
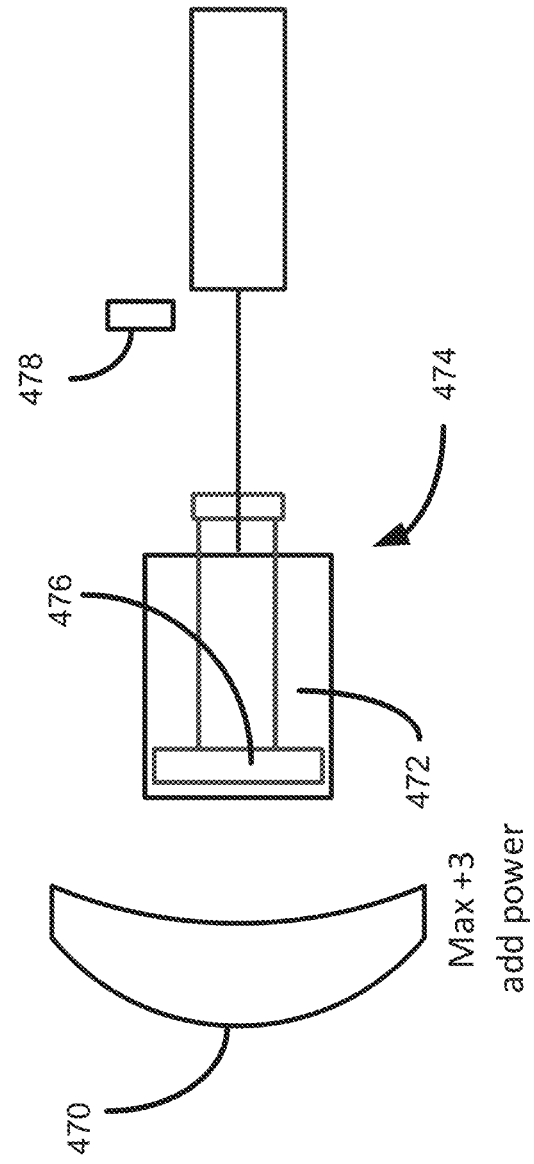
FIG. 27B illustrates the motor plunger actuator in the position for max +3 add power.

In reference to optical calibration, a liquid lens 470 and the attached actuation mechanism requires calibration for far vision with zero add focus power and for near vision with desired near focus power. This is done during the factory calibration procedure or user calibration procedure. The liquid flows from the liquid chamber 472 located in a plunger tube 474 or bellow to chamber in the liquid lens 404. A motor plunger actuator 476 has a home position sensor which is the reference point for the plunger. When the plunger is around this home position at home sensor 478 the liquid lens add power is closer to zero. FIG. 27A illustrates the motor plunger actuator in the position calibrated for zero add power. When the plunger is farthest from the home sensor, the liquid lens power is close to max add power of about +3. FIG. 27B illustrates the motor plunger actuator in the position for max +3 add power.

An instrument, such as a lensometer may be utilized during factory calibration to set the liquid lens zero power and maximum (+3) power. The liquid lens is placed in a lensometer and the plunger position is adjusted (using connected app user interface and motor motion) so that the power of lens is zero. This zero-power position of the motor is recorded in flash memory as F0. The above steps are repeated for add power +1, +2 and +3 (maximum). These motor positions are recorded as F1, F2 and F3 and stored in flash memory. When the lens needs to be adjusted to +2 power, the motor is moved to F2 position. If the lens needs adjustment between these powers, the motor position is interpolated between recorded positions. The user may set the user's reading power (tested at 14" distance) in the connected app. When the frame senses the user reading at 14" distance, the lens is activated at his reading power. If the user is looking at an object other than 14", the lens power is estimated at that specific distance and lens is activated at that power.

In reference to user calibration, the user may look at an object at a far distance (>36") and adjust the plunger position (using a connected app user interface and motor motion) so the user may see the object clearly (ideally at the user's zero power). This motor position is recorded as FO in flash memory. The user repeats this step by keeping the object at 8" (the user's closest reading position). The new motor position is recorded as Fmax. The user's FQ and Fmax positions are stored in flash as the user settings. When the user is looking at any object between 8-36" distance, the motor position, Fcur, for this object distance is calculated by interpolation.

Fcur=F0+(Fmax−Fo)*((Dmax−Dcur)/(Dmax−Do))
Dcur=Current measured distance
Dmax=36" (measured at max distance)
Do=8" (measured at closest distance)

Figure 28:
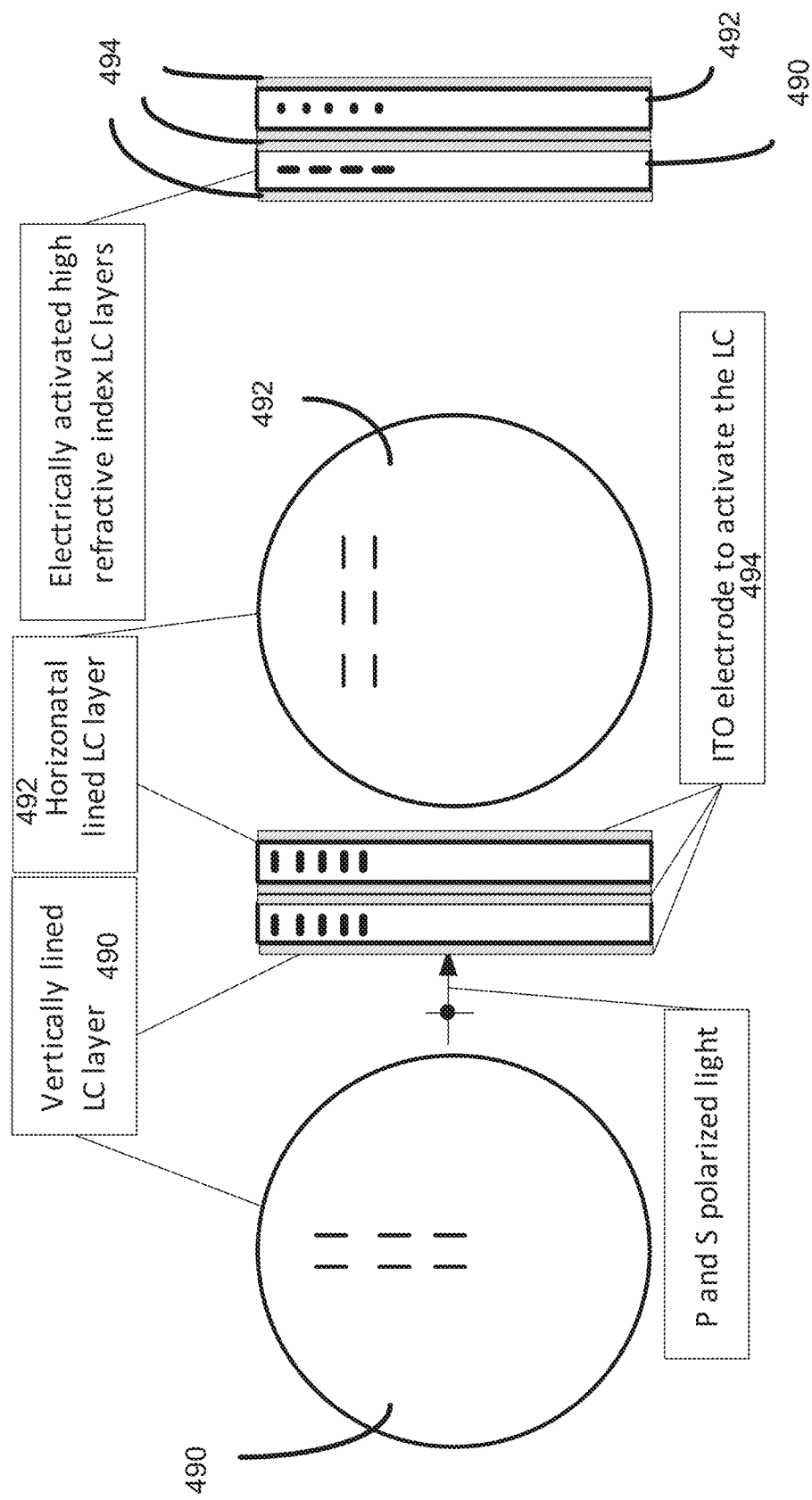
FIG. 28 is a front and side view of a vertically lined LC layer and a horizontal lined LC layer in another embodiment of the present invention.

In another embodiment, the present invention may utilize a liquid crystal (LC) layer. LC may be used as a tunable lens. U.S. Pat. No. 4,190,330 discusses about using a liquid crystal lens with electric field for various applications. In addition, U.S. Pat. No. 6,619,799 enhances the use of LC tunable lens for eyeglasses. The present invention implements the LC lens in a practical and cost-effective way for two step dynamic focus for the eyeglasses. In this embodiment, an LC layer is utilized in a single focus change, instead of a more complex controllable variable focus change. FIG. 28 is a front and side view of a vertically lined LC layer 490 and a horizontal lined LC layer 492 in another embodiment of the present invention. The LC layer is shaped for the required add focus power. LC is an anisotropic material with a birefringent property where light shows different a refractive index for differently polarized light. The two parts of the polarized light, ordinary ray which is parallel to the LC alignment, will have lower refractive index and extraordinary ray, which is perpendicular to the LC alignment, will have higher refractive index. By applying electrical voltage across the LC layer, the LC alignment and its refractive index can be changed. By sandwiching two LC layers 490 and 492 perpendicular to each other, refractive index of non-polarized light, which has two sets of polarized light orthogonal to each other, can be controlled. Both the layers of LC layers are controlled by Indium tin oxide (ITO) films 494 across them. Normally the LC layer requires polarized light parallel to its axis to change this refractive index. By combining two layers of LC as shown in FIG. 28, this refractive index control can be applied to all of the incident light.

Figure 29B:
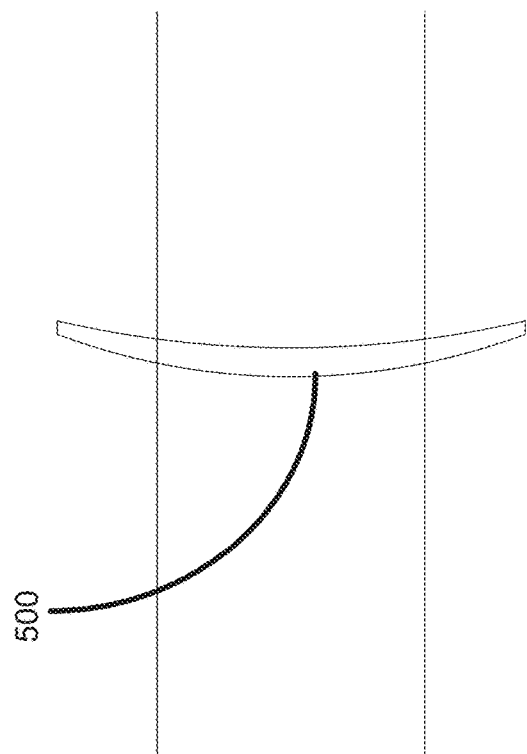
FIG. 29B illustrates the lens when activated through electrodes.
Figure 29A:
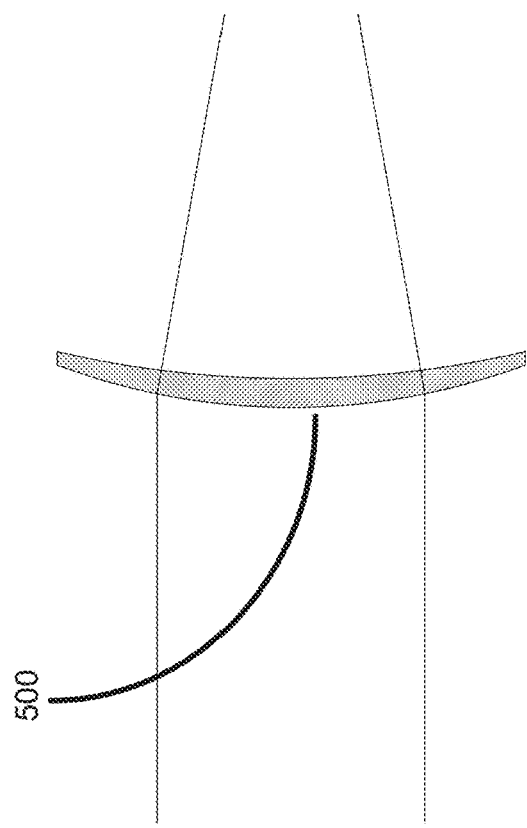
FIG. 29A illustrates a LC panel in the shape of a lens.
Figure 30:
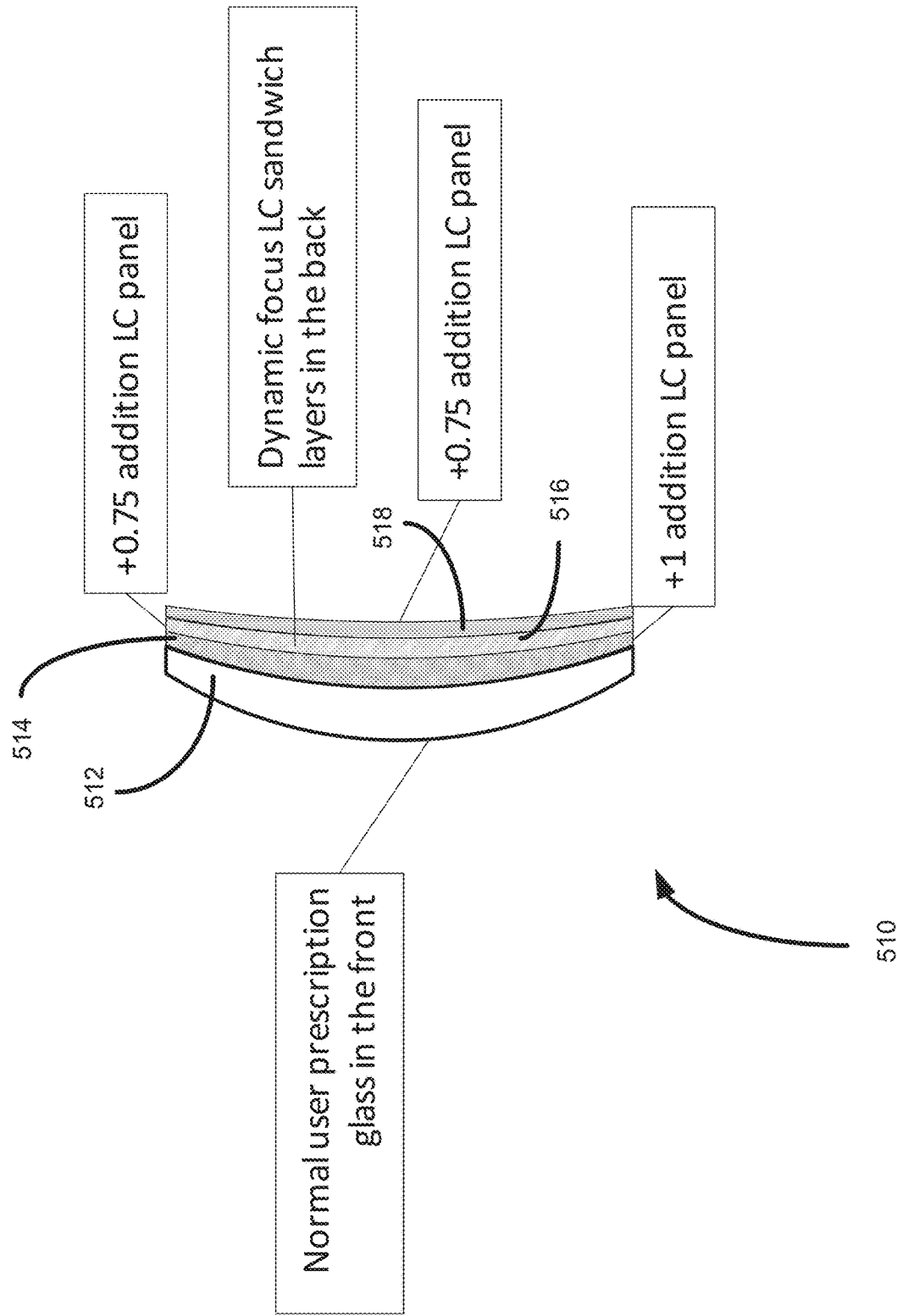
FIG. 30 illustrates a side view of eyewear having multiple layers.

By making the LC panel in the shape of the lens, the refractive index activation LC panel can convert this panel into switchable lens. FIG. 29A illustrates a LC panel in the shape of a lens 500. When the refractive index of the LC panel is low (close to 1 as in air) the lens passes the light without a change in magnification. FIG. 29B illustrates the lens 500 when activated through electrodes. In this case, the refractive index goes high making the shaped LC panel into a lens. This embodiment achieves a single focus power change, adding multiple layers of LC, each with the required focus add power and controlling each layer independently, multiple focus powers can be implemented. FIG. 30 illustrates a side view of eyewear 510 having multiple layers. The eyewear frame may have a user's prescription lens 512 in the front of the LC panels 514, 516, and 518. Independently controllable multiple LC layers with common focus powers such as 1, 1.5 and 2 are added behind the prescription lens. Each LC layer can be switched on to achieve that specific focus power.

Figure 31:
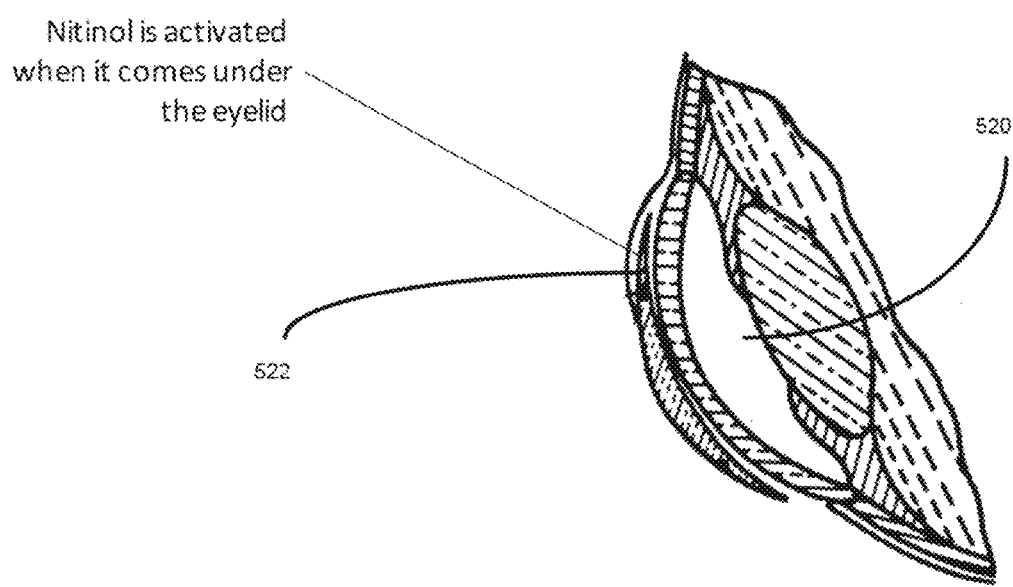
FIG. 31 is a side view of a user's eye with a contact lens having Nitinol.

In the previous embodiments, the dynamic focus eyewear frames address the issue of near and far focus for Presbyopia. However, these embodiments still require the wear of glasses. Wearing glasses is not preferred by a majority of the population. In another embodiment of the present invention, dynamic focus is achieved in contact lenses. Several contact lens solutions have been proposed for Presbyopia with dynamic focus for near and mid-range viewing. U.S. Pat. No. 5,108,169 discloses using heat from below the eye lid to heat a ring located on the lens and darken the far focus area of the lens. U.S. Patent Application No. 2012/014.0167 discloses using active electronics and an LC layer to change the focus dynamically when the user is viewing a near object. These contact lens solutions are either too complicated or too expensive to be commercially viable. None of these technologies are practical due to these limitations. Providing dynamic focus in contact lens is a challenge due to its small size. Typical electronic devices require the electronics, electro-mechanical parts and power storage, all of which take up space. In one embodiment of the present invention, a compact contact lens that changes focus is utilized. Nitinol memory alloy is used with liquid or gel lens to change focus of the lens dynamically. Nitinol is a shaped memory alloy that is nontoxic to the body and has a good biocompatibility. It is widely used in bio medical applications, such as heart stints and dental braces. In this embodiment, Nitinol is utilized in the contact lens for a novel way to provide dynamic focus to the user with presbyopia. This is achieved without using any electronics or external power. The body heat from under the eye lid (or external triggered heat) activates Nitinol which further activates the add lens power for user to view the near or mid-range object. FIG. 31 is a side view of a users eye 520 with a contact lens 522 having Nitinol. A user typically looks down while reading a near object. At this time, the eyelid moves down to cover the upper portion of cornea and upper area contact lens. The Nitinol spring is located in this portion of the contact lens and thus activated in this condition. For straight up viewing of near objects, such as computer operation, the user can do a narrowed eye expression to activate the Nitinol and the near focus lens. Alternately for this activity, an IR type emitter can project a heat beam to the eyes to activate the lens. This IR emitter device (not shown) may be located on the computer monitor pointing towards user's eyes. One limitation of this technology would be in hot conditions where external temperature gets too high to trigger the Nitinol. This can be overcome by using custom cooling eyeglasses worn by a user to keep the eye cooler. Additionally, this limitation can also be overcome by preventing Nitinol from getting heat from air.

Once activated, Nitinol can drive the center portion of the contact lens to activate the focus add power. In one embodiment of the present invention, this can be achieved with a metal ring 530 squeezing the gel portion of the contact lens 522. In another embodiment, Nitinol compresses a liquid chamber 532 to push liquid into a liquid lens provided in front of the contact lens. FIG. 32A illustrates a front and side view of the lens 522 and metal ring 530 with a Nitinol strip 532 in an inactive state. FIG. 32B illustrates a front and side view of the lens 522 and metal ring 530 with the Nitinol strip 532 in an active state. The Nitinol gets activated when it comes under the upper eyelid of the user for longer than a specified period of time (to avoid blink) or activated externally by an IR beam device. Once the Nitinol strip 532 is activated, it squeezes the metal ring 530 located on the contact lens. The squeezing of the metal ring creates a bulge 534 in the contact lens to add additional magnification for near focus.

Figures 33A, 33B:
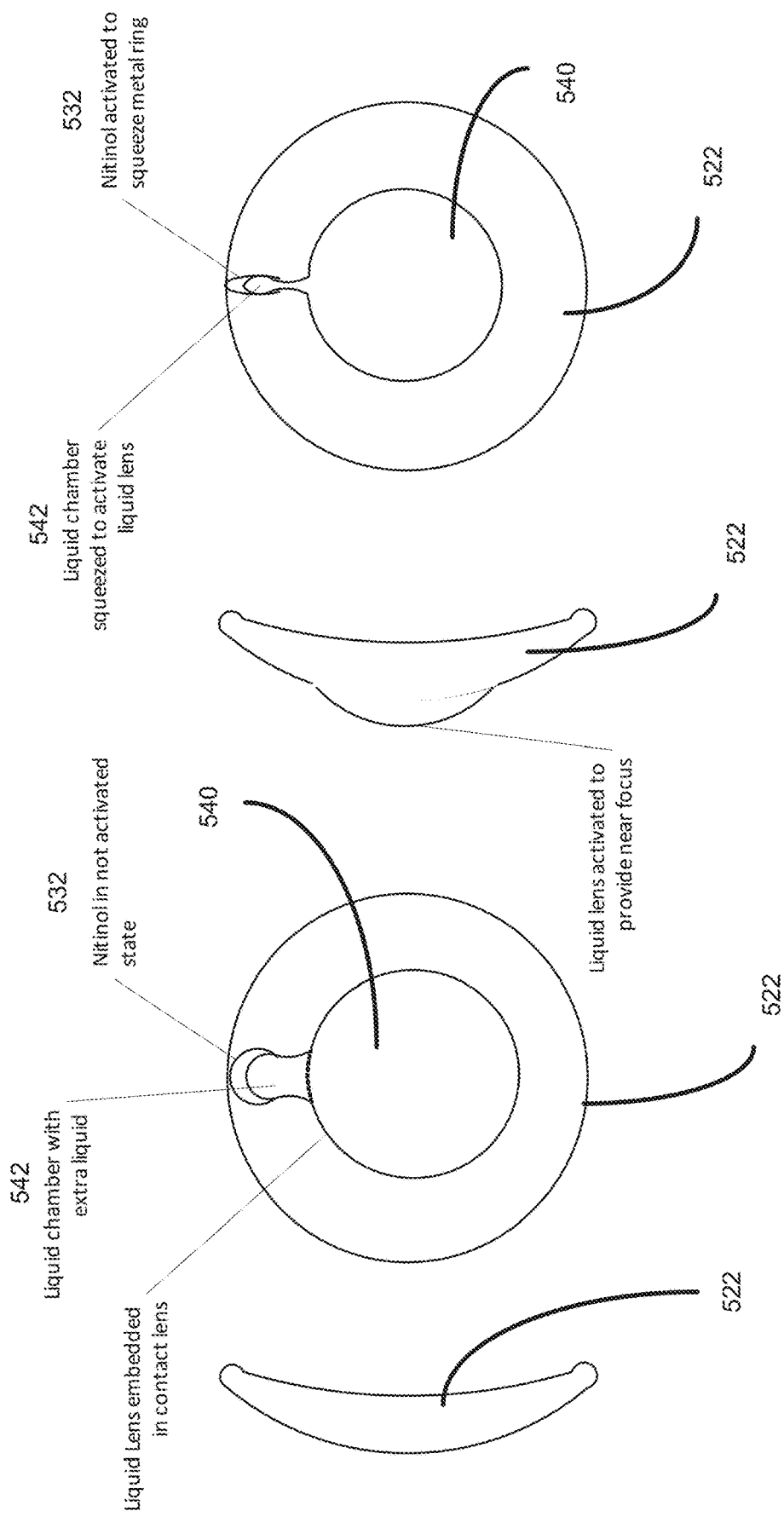
FIG. 33A illustrates the lens with liquid lens and the Nitinol strip in an inactive state.
FIG. 33B illustrates the lens with liquid lens and the Nitinol strip in an active state.

In another embodiment of the present invention, the contact lens 522 may include an embedded liquid lens 540 with an extra liquid chamber 542. FIG. 33A illustrates the lens 522 with liquid lens 540 and the Nitinol strip 532 in an inactive state. FIG. 33B illustrates the lens 522 with liquid lens 540 and the Nitinol strip 532 in an active state. The Nitinol strip, when activated, squeezes the extra liquid chamber to push extra liquid into the main portion of the liquid lens to activate near focus by bulging it as seen in FIG. 33B. When deactivated the Nitinol loses its strength and the extra liquid flows back into extra liquid chamber due to pressure from the liquid lens, as seen in FIG. 33A.

Figure 34:
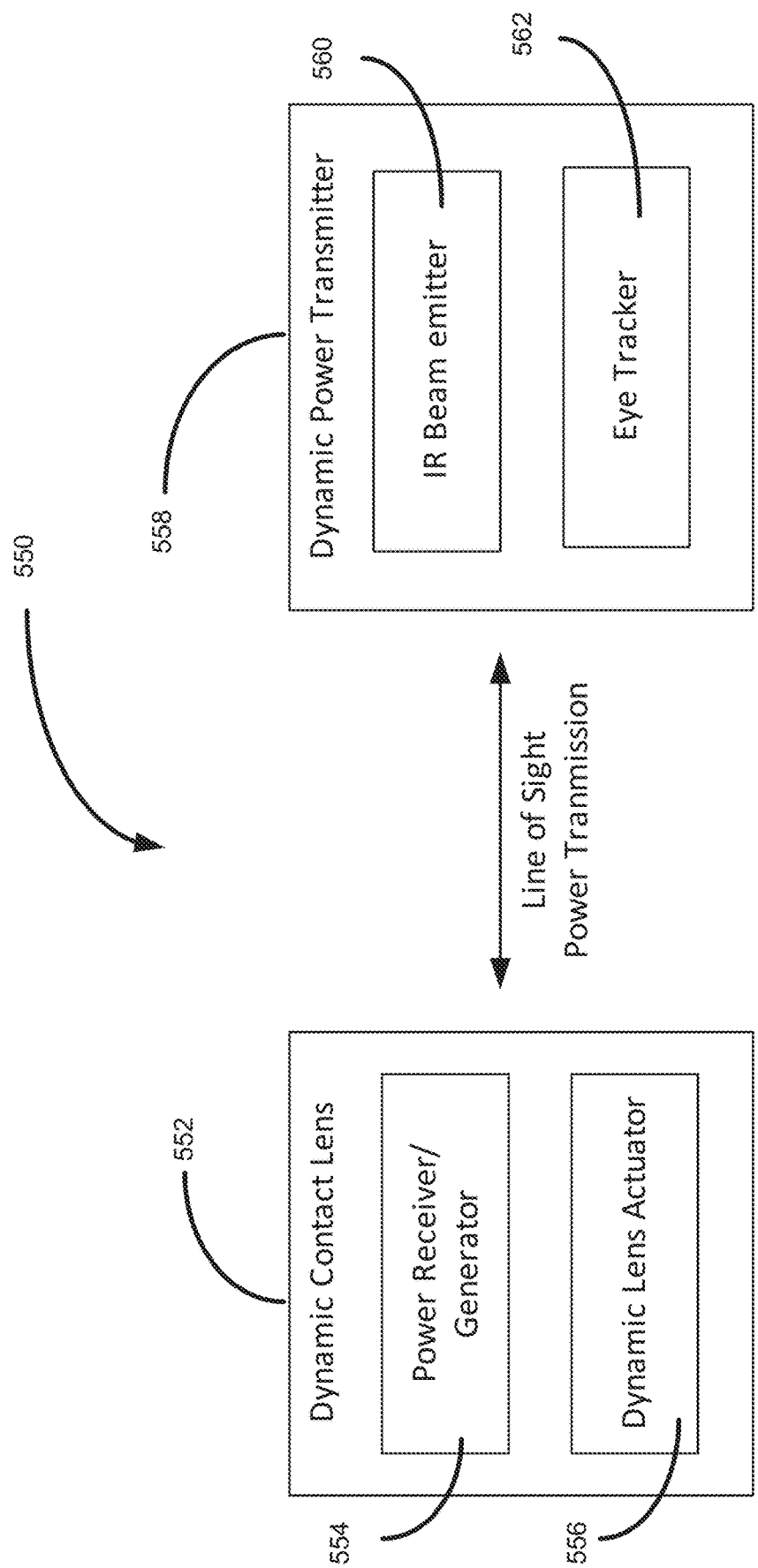
FIG. 34 is a simplified block diagram of the key components of the system.

In still another embodiment, the present invention is a system 550 of a simple dynamic contact lens with minimal electronics and electro-mechanical components with no power storage. FIG. 34 is a simplified block diagram of the key components of the system 550. The system includes dynamic contact lens 552 having a power receiver/generator 554 and a dynamic lens actuator 556. In addition, the system includes a dynamic power transmitter 558 which may have an infrared (IR) beam emitter 560 and an eye tracker 562 located in front of the user's eye and provides the power to the contact lens wirelessly. When the contact lens 552 and the power transmitter 670 come in front of each other, the contact lens gets activated to provide near focus. The power transmitter is positioned on the devices viewed by the user (e.g., computer monitor, mobile phone). When the user views the displays on these devices, the user's near focus gets activated for viewing with proper focus. For other viewed objects such as printed paper, the user may wear a band with a power transmitter located at the bottom of the wrist. When the user faces the bottom of the user's wrist towards the user's eyes, the contact lens is activated for near focus. The power may be transmitted wirelessly typically using RF power transfer or line of sight power transfer through light. Typical RF power transfer has very low efficiency and is further less effective when the receiver is on an organic material, such as living tissue. The line of sight power is achieved by shining light beam (visible or non-visible light) and the receiver converts the light energy into electrical energy using photovoltaic cells. In this embodiment, IR light is used to transfer energy to the contact lens. This avoids interference to users view in the visible light spectrum.

The contact lenses 552 has visible markers enabling the transmitter to track them. The dynamic power transmitter first detects the presence of the dynamic contact lens 552 worn eyes using a camera. The camera locates and tracks the visible markers located on the contact lens. Once detected, it directs a beam of IR light to the contact lens. The photovoltaic cells on the surface of the contact lens convert the light energy into electrical energy. The user of the IR light instead of visible light ensures that the user and the user's eyes are not disturbed with a beam of visible light. An IR filter in the pupil area of the lens may be utilized to prevent IR light reaching the inside of the eyes. The IR beam may be normal IR light or a laser beam.

Figure 35:
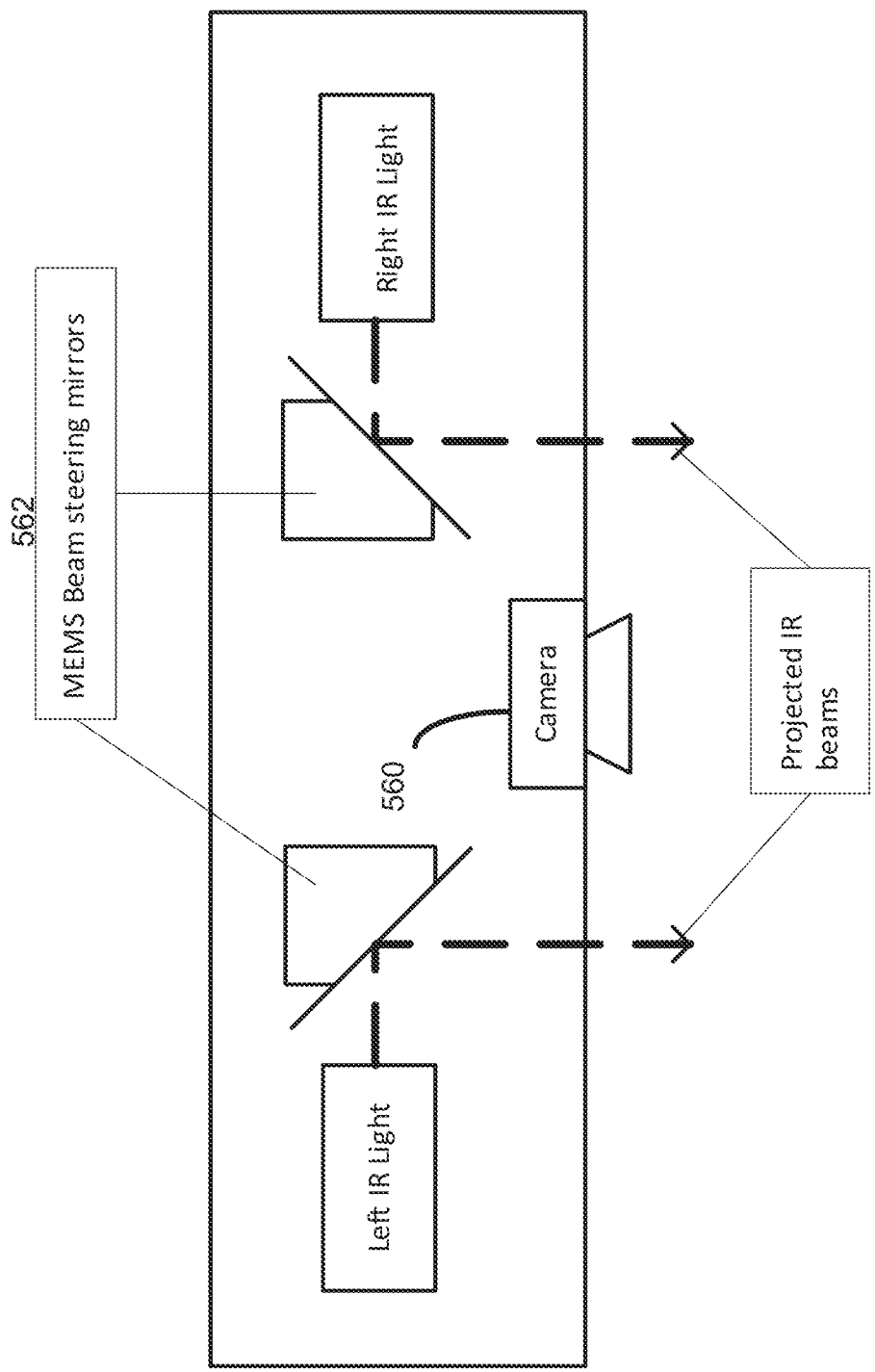
FIG. 35 is a simplified block diagram illustrating the use of IR light for the dynamic contact lens.
Figure 36:
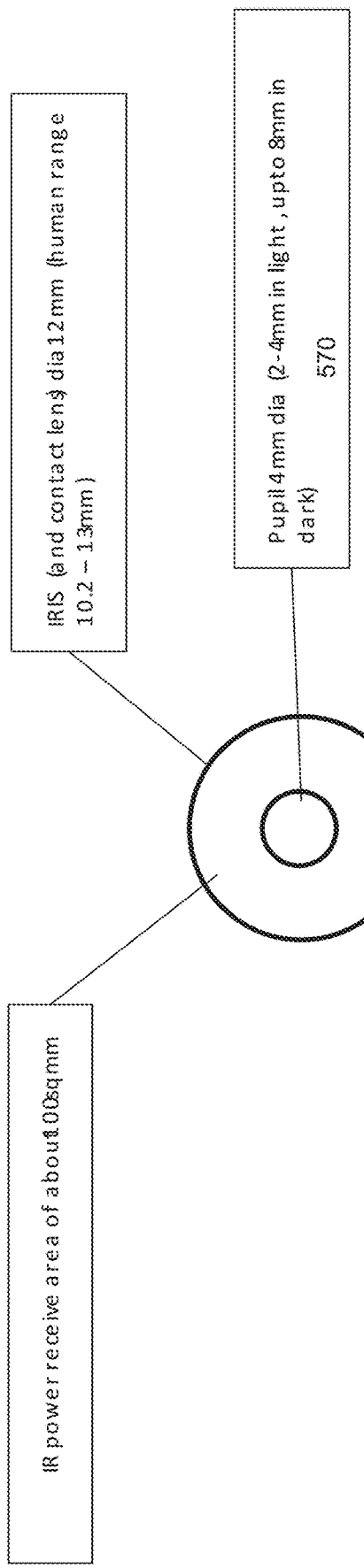
FIG. 36 is a simplified block diagram illustrating coverage area for the IR power.

FIG. 35 is a simplified block diagram illustrating the use of IR light for the dynamic contact lens 552. The transmitter of the IR beam includes a camera 560 to detect the contact lens worn on the eyes. The markers provided on the contact lens facilitates this detection. Once the contact lens from both left and right eye are detected, the power transmission circuit is triggered. The IR beam is directed to the contact lens using adjustable Microelectromechanical systems (MEMS) mirror beam steering devices 562 individually for left and right eye. The camera continues to monitor and track the eye position. The beam steering is adjusted and directed to reach the contact lens on both eyes. FIG. 36 is a simplified block diagram illustrating coverage area for the IR power. The contact lens has an average diameter of 12 mm (human eye IRIS area range between 10-13 mm). The center pupil area opening 570 is about 4 mm (human eye pupil diameter is in 2-4 mm range in bright viewing and up to 8 mm in dark viewing). The 12 mm with 4 mm pupil hole provides about 100 sqmm of surface area for photovoltaic power generation. Using high efficiency cells, greater than 5 mW of power can be generated in available surface area. This is sufficient to drive the actuator and electronics to activate the dynamic focus.

The power transmitter acts both as a beacon (to trigger the contact lens activation) and power transmitter. Without this power transmitted to the contact lens, the contact lens becomes a passive device with no add power. Once the power is transmitted to contact lens, it acts as an active device to activate the add power with dynamic focus. The amount of power transmitted can determine full or partial activation of the lens.

Figure 37:
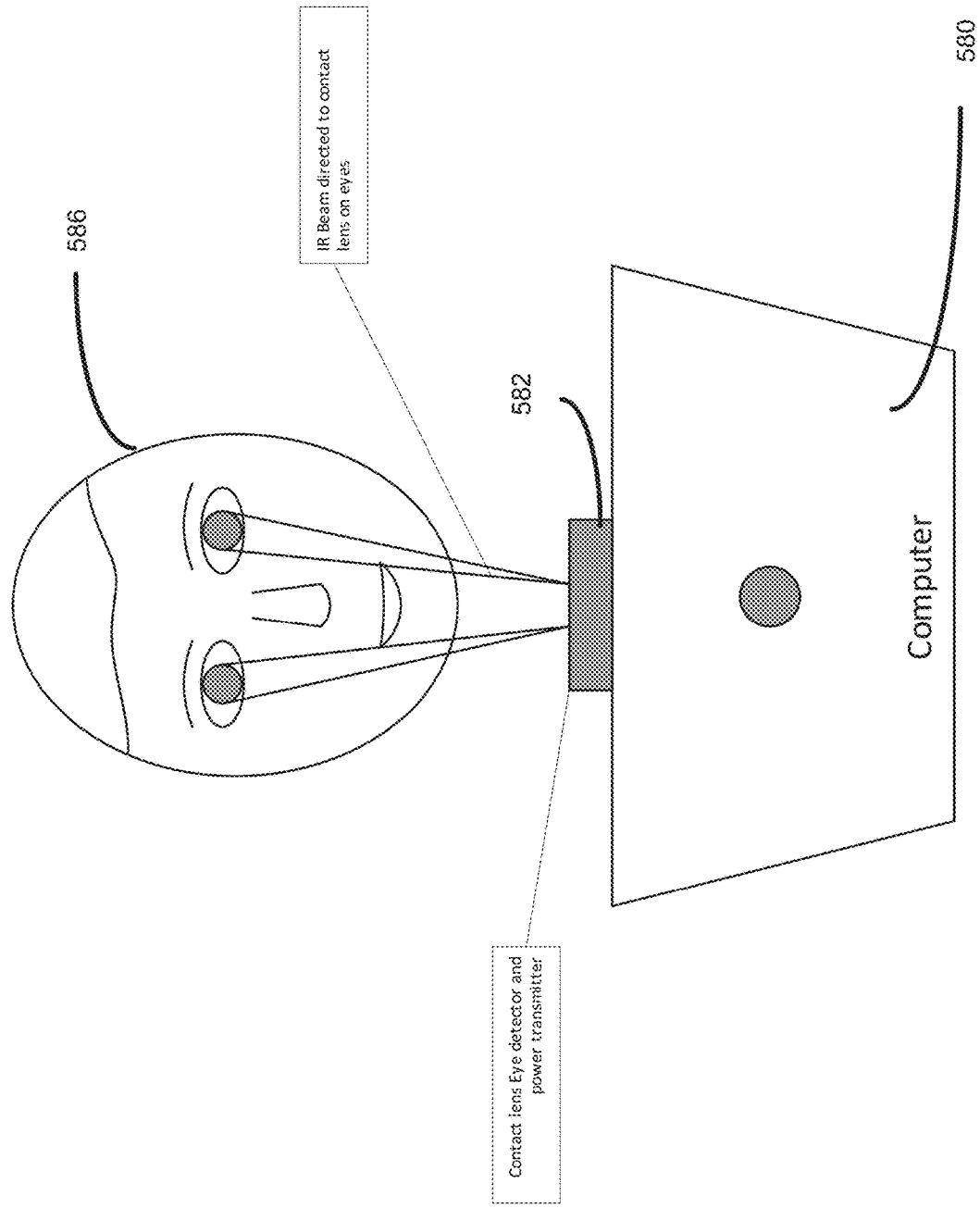
FIG. 37 is a diagram illustrating activation of power to the contact lens by a computer.

FIG. 37 is a diagram illustrating activation of power to the contact lens by a computer 580. The transmitter (IR beams) can be located on the monitor of the computer 580 facing the user 586. When the user is looking at the monitor, the transmitter 582 detects the presence of the user by looking at the left and right contact lens. Once it confirms that the user is viewing the monitor, it activates the power transmission. This further activates the dynamic focus in the contact lens and user will see the monitor with near focus. If the user turns away from the monitor, this view change is detected by the transmitter by change of two eye positions. The transmitter stops the power to the contact lens. This deactivates the contact lens which changes to no add power and the user sees far objects clearly. The transmitter may also be located in the user's mobile phone (built into case of the mobile phone). When the user is viewing the mobile phone, the user sees it clearly with add power activated on the contact lens.

Figure 38:
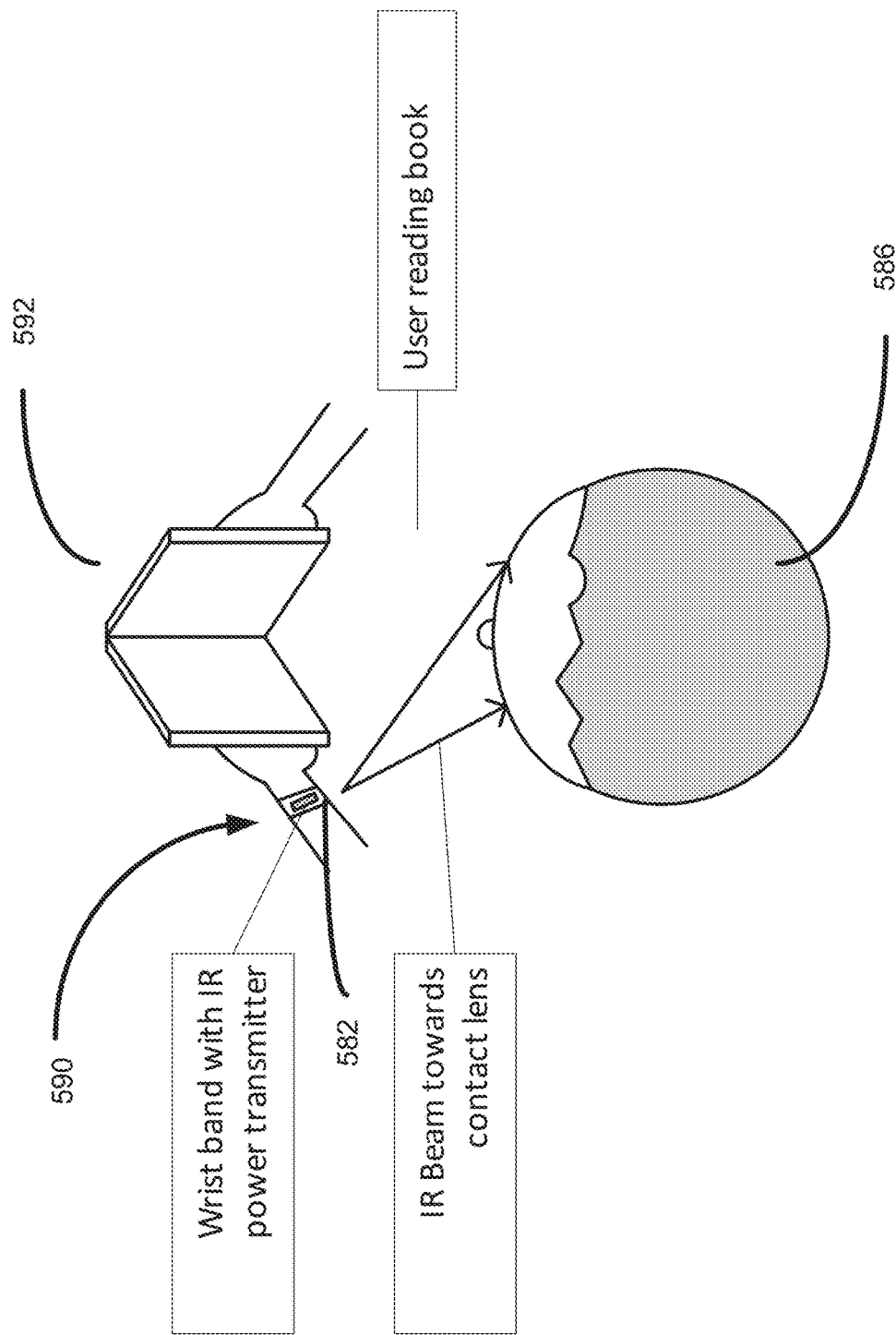
FIG. 38 illustrates the fitness band being utilized by the user.

In another embodiment the transmitter may be located in a fitness band 590. FIG. 38 illustrates the fitness band 590 being utilized by the user 586. The transmitter 582 may also be located in the fitness band or watch strap of the user. The power transmitter may be located on the bottom of the wrist of the band. When the user wishes to activate the contact lens, the user may turn the bottom of the wrist towards the eyes as shown in the picture below. This would be natural position in which user would read a book 592 or fine print. The contact lens sees the IR beam from the transmitter and activates the add power for the user to see the viewed object clearly. When the user turns the user's wrist away, the user would see far objects clearly without add power.

Figure 39:
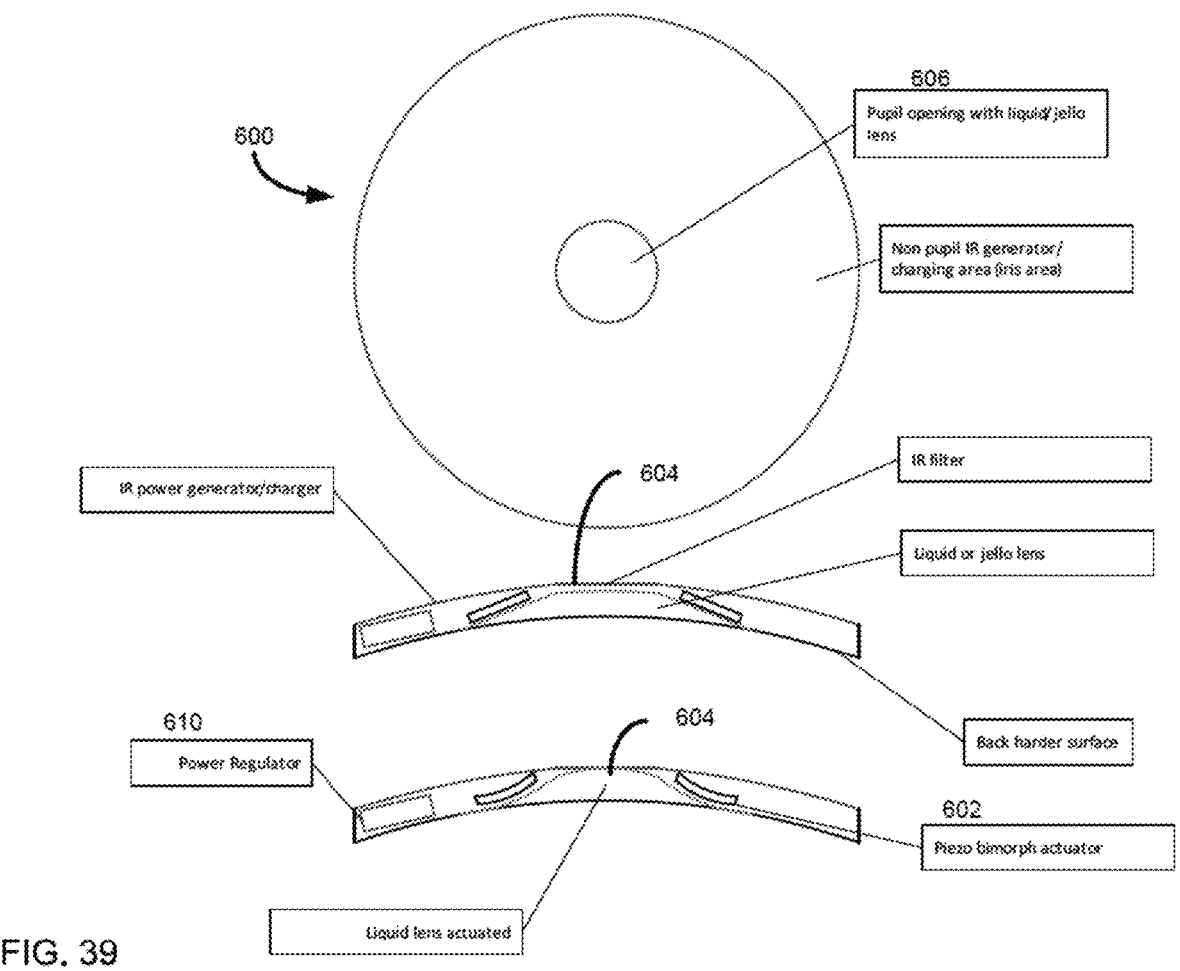
FIG. 39 illustrates a front and side view of a contact lens with a piezo bimorph actuator in another embodiment of the present invention

In one embodiment of the present invention, the contact lens may have a liquid/gel core that can be activated with power using a MEMS piezo or magnetic mechanism. FIG. 39 illustrates a front and side view of a contact lens 600 with a piezo bimorph actuator 602 in another embodiment of the present invention. It takes minimum electronics to achieve this activation. Once the transmitter shines an IR beam on the surface of the contact lens, the photovoltaic cells on the surface generate power. This power is further regulated to required voltage by a power regulator 610. The output of the regulator activates the MEMS mechanism to activate the liquid lens. The liquid lens bulges in the center around the pupil area to provide near view focus to the user. In one embodiment, the piezo bimorph actuator 602 is attached to the liquid lens 600. When powered, this actuator bends and presses the outer surface of the liquid lens radially downward. The radial pressure in the liquid lens pushes the silicone membrane 604 in the pupil area 606 outward with a convex arc. Due to high refractive index of the liquid material this area, user sees near focus add power.

Figure 40:
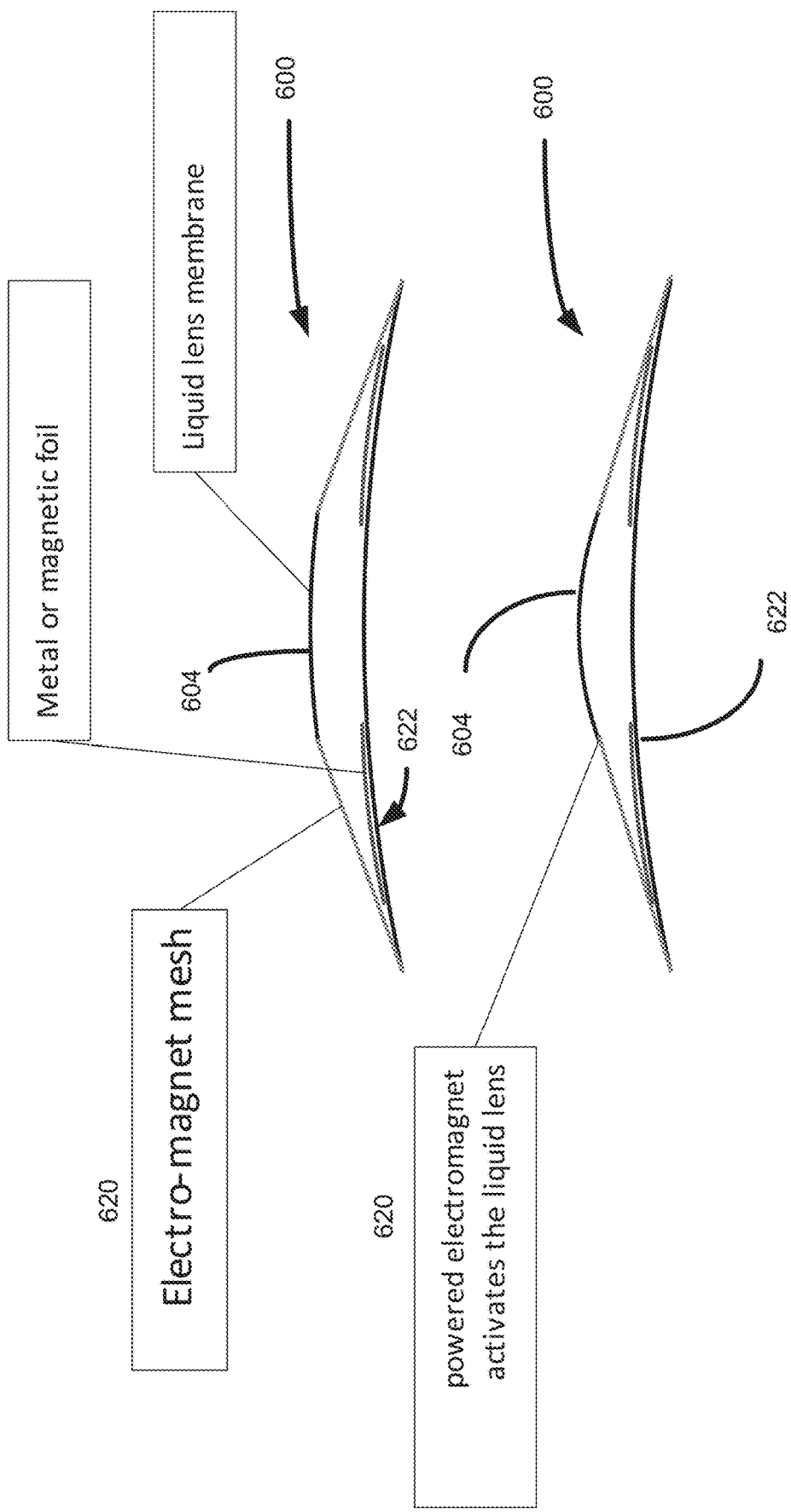
FIG. 40 illustrates the lens activated by an electromagnetic mesh.

The liquid lens 600 may be activated with MEMS electromagnetic actuation. FIG. 40 illustrates the lens 600 activated by an electromagnetic mesh 620. The peripheral electromagnetic mesh gets magnetized and attracted to base 622 having a metal or metallic surface of the lens with passing of electric current. This squeezes the gel/liquid in the core of the lens to create near-focus lensing in the pupil area.

In a similar fashion as described for the eyeglasses, liquid crystal layers may also be utilized for contact lens. When electrically activated by remote power, these LC layers provided near-focus to the user. The dynamic transmitter provides power to activate the LC layers.

The present invention of dynamic focus contact lens may utilize environmentally responsive hydrogels. In this embodiment, the contact lens work without any power or power transmission but rather utilizing remote responsive hydrogels. Hydrogels that are environmentally responsive are known and used in drug delivery and other fields. They are typically responsive to temperature or pH value or light change. The Canadian patent CA2439925C discloses the porous hydrogels that change volume in response to temperature and pH values. Hydrogels such as N-isopropylacrylamide with gold nanoparticles shown to be light responsive. U.S. Pat. No. 9,193,816 also discloses hydrogels that are responsive to infrared radiation. In one embodiment, light responsive hydrogels are used for dynamic focus contact lens. In response to certain frequency of light (such as infrared), the hydrogels may be designed to change shape. They change shape by absorbing or releasing water content. They must be placed in a water contained chamber for correct operation. This change in shape is used to change focus of the contact lens. This is achieved by directly changing the shape of the hydrogel into lensing or by making the changed shape of the hydrogel activate a liquid lens. When a user looks towards the beacon light emitter, the hydrogel contact lens changes its focus.

Figures 41A, 41B:
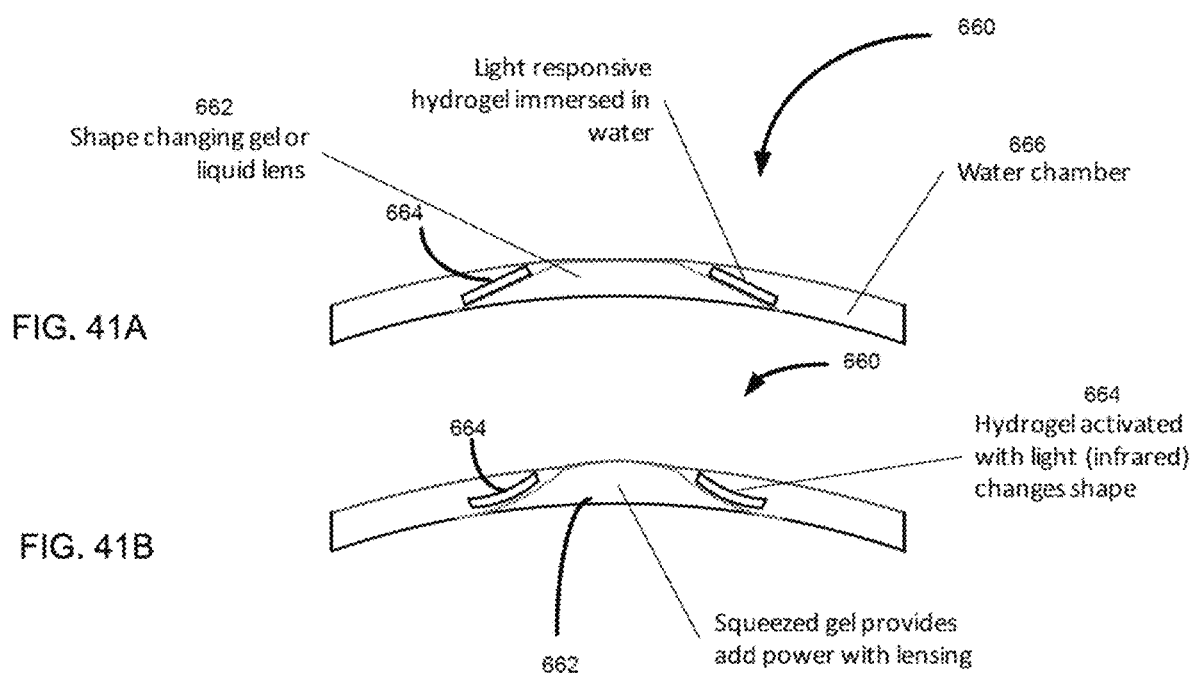
FIG. 41A illustrates a side view of a contact lens using hydrogel in an inactive state.
FIG. 41B illustrates a side view of the contact lens using hydrogel in an active state.

FIG. 41A illustrates a side view of a contact lens 660 using hydrogel in an inactive state. FIG. 41B illustrates a side view of the contact lens 660 using hydrogel in an active state. The contact lens 660 includes a gel 662 or liquid lens in the center. An infrared responsive hydrogel 664 is placed on top of the gel. The hydrogel is soaked in water in a water chamber 666. When activated with infrared light, the hydrogel releases water and changes shape. The change in shape of the hydrogel squeezes the center gel to provide add focus power with lensing. When the infrared light is switched off, the hydrogel absorbs water to go back to its original shape. This releases pressure on the gel for it to go back to its zero-focus state. Either gel or a liquid lens can be used for lensing. If using liquid lens, an eye safe material such as water is used for lensing.

In addition to distance sensing and eye convergence, various combinations of distance sensing, accelerometer, beacon finder and eye tracking to detect when the user is looking at a near object efficiently with more reliability. In one embodiment, distance sensing technology such as TOF which emits a light beam and measures the time it takes to reflect from object may be utilized. TOF can be located in the center of the glass rim or near edge of the glass rim facing the user's forward view. When an object is detected within the near view range of less than 36", object detection can be triggered. An Accelerometer (accel) may measure the acceleration, motion and tilt with gravity. Using tilt, it can be determined if the user is looking down or up. Using the motion and acceleration data, user activity, such as walking or driving, can be detected. Since accel uses much lower power, its data can be used with distance sensing only when needed. A normal computer or other reading activity involves the user looking in front without too much down tilt or up tilt. It also does not involve motion of the head, such as when occurs during walking or other activity. The reading/computer activity is detected (for near focus) only when no or little motion/walking-steps is detected on the frames, head position is close to horizontal and an object is detected within 36" from the user (normal computer mid-range distance). False calls from activity such as user walking towards a door or the user looking close towards a floor are eliminated with these conditions. To detect change from reading or computer activity to far view activity, a combination of head not tilted too much down (user could be looking at desk objects) and no object is detected within 36" in front of the user is used.

Furthermore, the present invention may utilize a novel Eye tracking process using a micro camera and a low power/cost microcontroller without the use of additional lighting. The purpose of this eye tracking is to detect eye convergence, which happens when the user is seeing a near object. Eye tracking uses optical methods which have been in existence for more than 50 years. Most of these applications either use complex hardware or custom lighting to detect the eye position. U.S. Pat. No. 6,120,461 uses a head mounted display with a beam splitter to view eye from direct front positioning. U.S. Pat. No. 9,185,352 uses a camera directly in front of the eye and utilizes pixel brightness changes to detect the eye position. In the present invention, in one embodiment, an eye tracking mechanism without complexities of additional lighting, beam splitter and complicated hardware to detect the eye position is utilized. The eye tracking mechanism is configured for use inside eyewear frame. It works by detecting geometrical features of the eye. These features can be sharp contrast round geometries between iris and sclera (white layer of eyeball). This information is further combined with information obtained during calibration to detect the user's eyeball position.

Figures 42A, 42B:
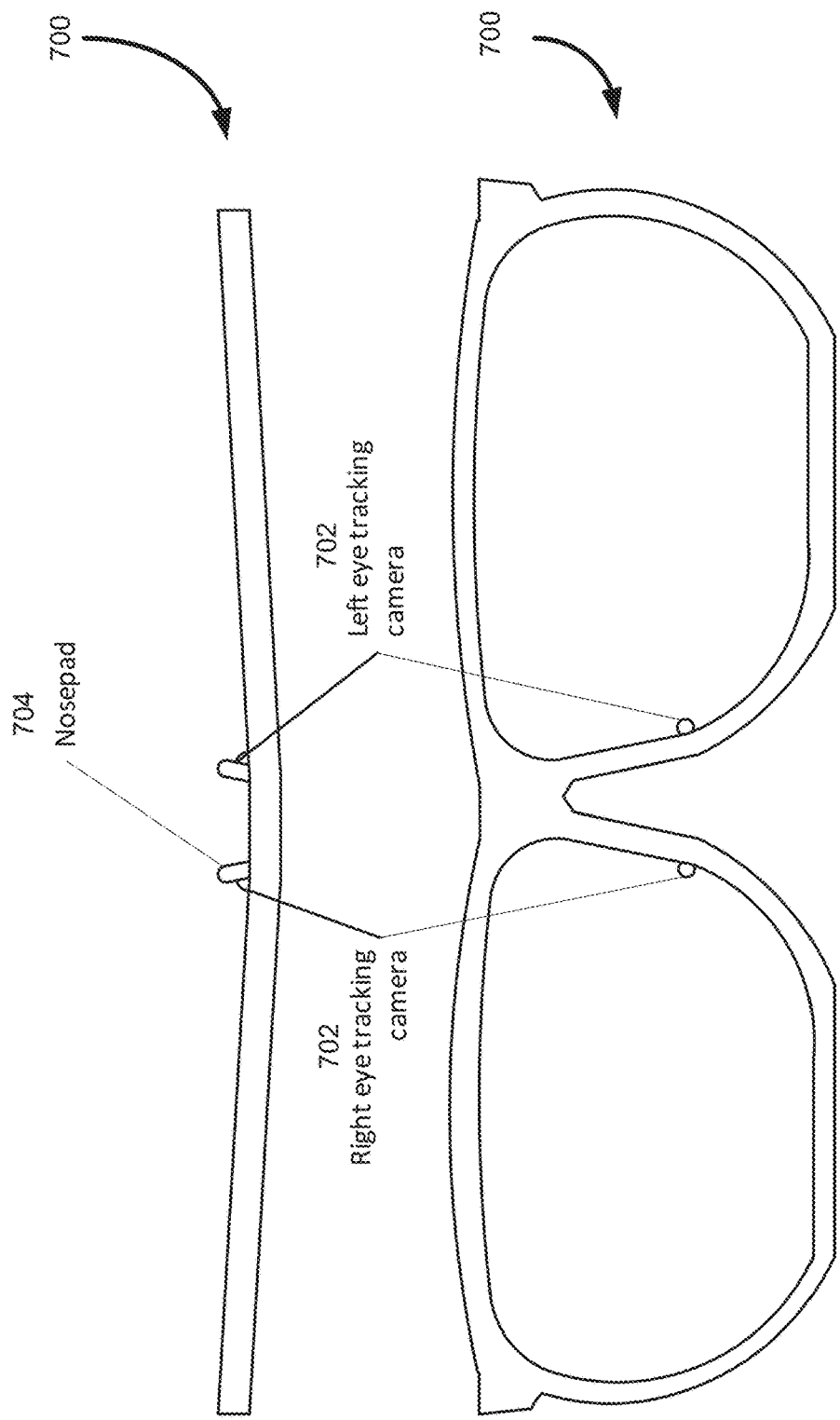
FIG. 42A a top view of eyeglasses using two separate cameras.
FIG. 42B is a front view of the eyeglasses of FIG. 42A.

FIG. 42A a top view of eyeglasses 700 using two separate cameras 702. FIG. 42B is a front view of the eyeglasses 700 of FIG. 42A. The two separate cameras are positioned on a nose pad 704 of the eyeglasses looking at the left and right eye of the user. This position is ideal for eyeglasses as it gives proper angle of the eyes even if the eyes are looking down for reading. It is also the most suitable position for the concealed positioning of the cameras inside the frames.

In another embodiment the cameras are positioned on the front edge of the temple to provide a good frontal-side view of the eyes. FIG. 43A is a top view of eyeglasses 720 having cameras 722. FIG. 43B is a front view of the eyeglasses 720 of FIG. 43A. FIG. 43C is a temple 718 side view of the camera placement of eyeglasses 720. The cameras are placed at the bottom of the wide temple close to the rim.

Each camera gets side views of the eyes. This embodiment helps to reduce the complexity of the wiring from camera to PCB located in the temple.

Figure 44:
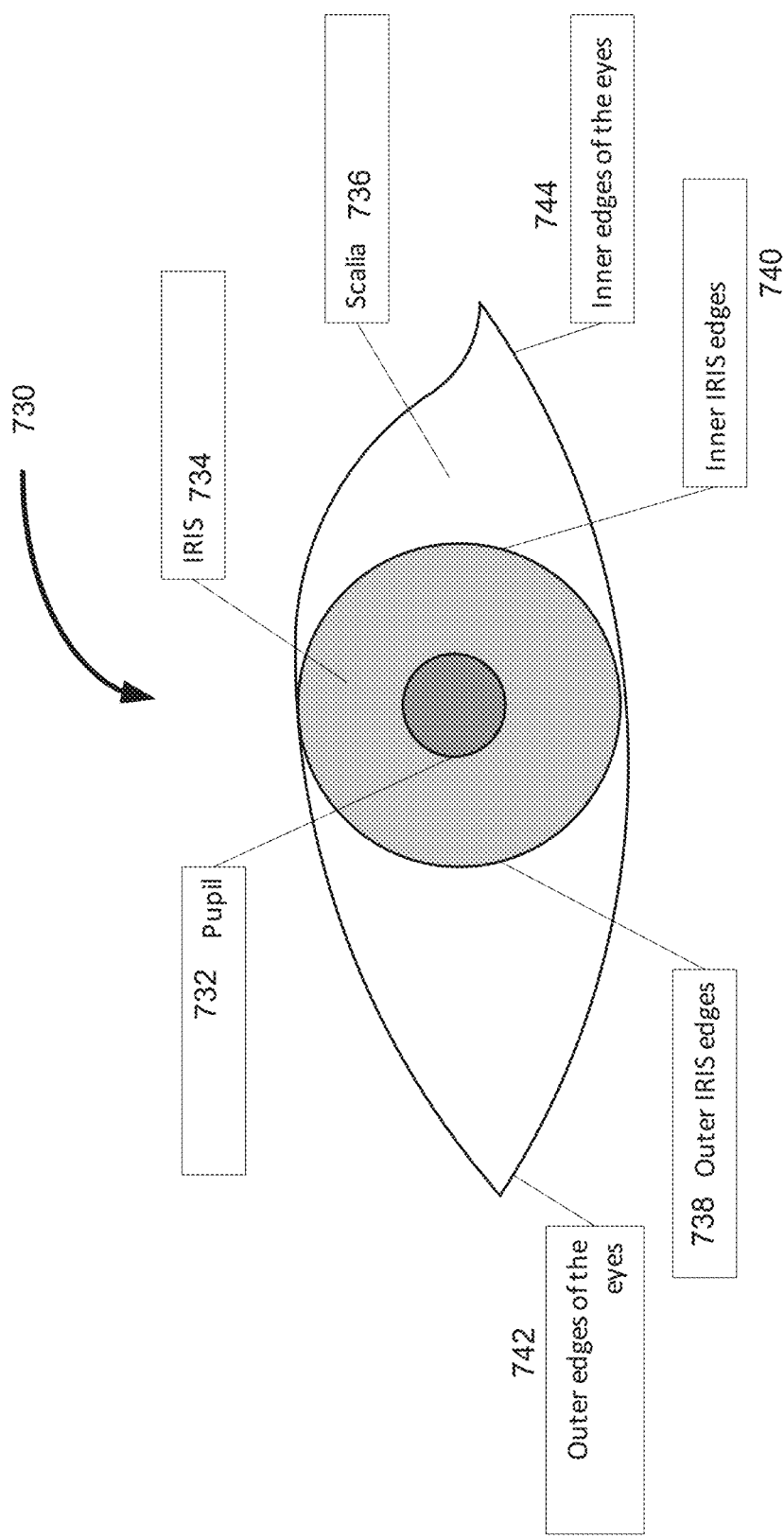
FIG. 44 illustrates the various features of a user's eye.

FIG. 44 illustrates the various features of a user's eye 730. The eye includes the pupil 732, iris, 734, scalia 736, outer iris edge 738, inner iris edge 740, outer edge 742, and inner edge 744 of the eye. During calibration, features such as the curvature of the iris, size of the iris, shape of the eyes and contract level of iris is detected. These features are used to generate shape grammar that will be used for alignment and magnification during eye tracking. During eye tracking, parts of the grammar may be used for eye alignment and magnification detection. Furthermore, the eye grammar information is adjusted for found magnification. Finally, the iris portion of the grammar is used to find the position of the iris and further interpolated to detect the eye position. Iris edges are chosen instead of pupil as they provide the highest contrast grammar irrespective of light or dark eyes. During calibration, the user looks towards the camera, once for the left eye and once for the right eye, so that camera gets a full view of the iris. The iris is detected by searching circular geometries. The inner iris edges are separated and used for alignment and position detection during eye tracking. The inner eye edges are separated to detect eye alignment and magnification during eye tracking. During actual eye tracking, the iris (and thus the pupil position) is detected with a periodic frequency that is optimized for power and performance. Typical frequency of detection may be twice in a second. During each of these inspections, eye image is captured, and position and magnification of the eye is detected by aligning inner edges of the eye's geometry grammar. Next, the iris geometry grammar is aligned, and eye position is interpreted with the aligned values.

In another implementation, a simple iris circle detection is used without any calibration. The circle shape of the iris is the only round feature in the eye. A circle edge grammar is generated and transformed to an elliptical shape as seen by an angled view of the camera. This edge is aligned with the iris of the acquired eye image. From this alignment the pupil position is calculated for the left and right eye. The position of the right eye and left eye is detected independently from both cameras. The pupil position of each eye is used to measure the distance between pupils. This distance varies as the user is looking at the far objects versus near objects. From the measured positions of pupils, the distance between the both eye pupils are calculated. Based on the user's pupillary distance (PD) and this measured distance, near object viewing is detected. This information may be further used to trigger near focus on the dynamic eyewear lens.

While the distance based and eye-tracking based methods to detect user's near view is suitable, it may have false positives in certain real-world cases. In another embodiment, another process is presented for detecting user looking at near object using beacons near the user's near view. In the current digital world, the requirement for reading glasses are mostly for computer or mobile phone use. These objects that the user is looking at are made as beacons. When the dynamic eyewear detect that it is near and looking towards the beacon, it activates the near focus. The beacon can be a line of sight device such as an IR (Infrared) beam or a RF device such as a Bluetooth transmitter. For devices such as computer or mobile phone, the beacon may be built into the device or clipped on to the device. For books or other fine print reading, the beacon may be placed on user's wrist band (fitness band or Smartwatch). When the user is reading the book or fine print, the beacon on the user's wrist activates the dynamic focus in the eyewear. In situations where the beacon is not available to automatically change near focus, a manual option is provided to the user to activate the near focus with a touch or buttons on the eyewear.

In one embodiment, an IR beacon may be used. An IR beam is placed on the object viewed by the user (computer/monitor, mobile phone, wrist band). The IR light which is visible to the dynamic eyewear and invisible to the user triggers the activation of the near focus. The distance to the object also can be measured by brightness or size of IR beam. Once the dynamic eyewear sees the IR beacon in close proximity, the near focus is activated in the lens. In another embodiment, a radio frequency (RF) beacon, such as Bluetooth transmitter is used as a trigger to the dynamic focus. Devices such as computers or mobile phones already have Bluetooth RF built into them. RF radio packets are sent from these beacons and received and recognized by the RF receiver on the dynamic eyewear. The RF beacon has a disadvantage in that it is omnidirectional. This can be overcome with using two beacons with triangulation to calculate the RF signal strengths from the two beacons. The Rx and Tx antennas of the Beacons also can be made semi directional so that eyewear can detect the direction of the signal.

Figure 45:
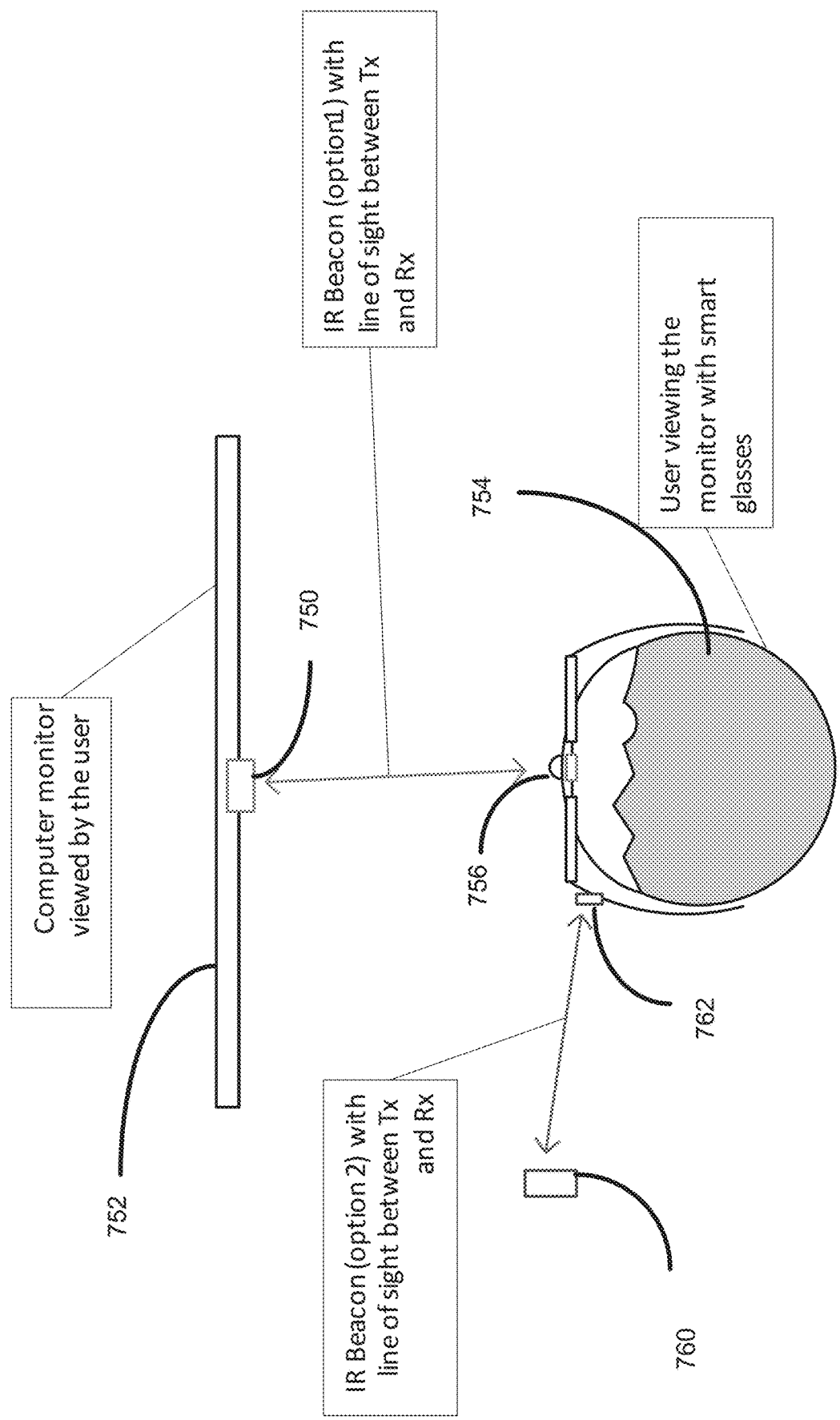
FIG. 45 illustrates a top view of an IR beacon utilized on a computer monitor in one embodiment of the present invention.

FIG. 45 illustrates a top view of an IR beacon 750 utilized on a computer monitor 752 in one embodiment of the present invention. While working on the computer monitor 752, a user 754 needs near focus while viewing at the monitor. This view of the user is detected by placing beacon 750 on the monitor and a detector 756 on the eyewear. While using IR beacons with the computer, an IR transmitter (beacon) 750 is placed on the monitor facing towards the user. The eyeglass frames have an IR receiver (detector) 756 in front of the frame. When the eyewear detects the IR light on the computer monitor, near focus is activated. When the user looks away from the monitor, the IR will not be in line of sight and the near focus is deactivated. Alternately the IR transmitter 760 and receivers 762 are placed orthogonally.

Figure 46:
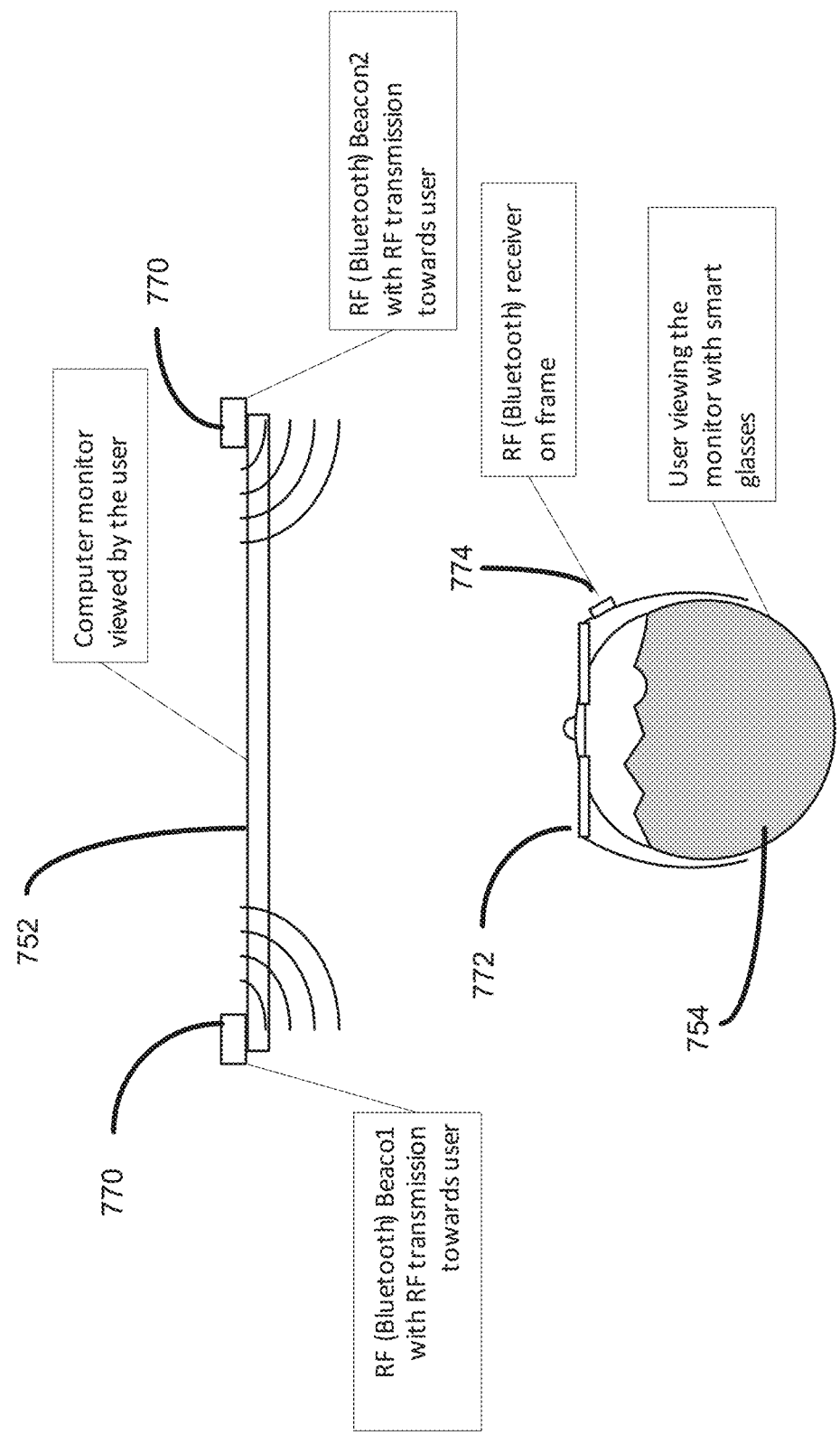
FIG. 46 is a top view of a plurality of RF beacons for use on the computer monitor in another embodiment of the present invention.

FIG. 46 is a top view of a plurality of RF beacons 770 for use on the computer monitor 752 in another embodiment of the present invention. While using the RF beacons 770 with the computer, two beacons are placed on the two ends of the monitor 752. The eyewear frames 772 have an RF receiver 774 which may have directivity sensing. The receiver can detect the signals coming from the beacons and their signal strength. Based on the signal strength from the two recognized beacons, the eyewear frame detects if user is looking towards the computer monitor and activates the near focus lens. When the user moves away from the monitor or turns his head from monitor, it is detected by the changes in the signal strengths of two beacons and near focus lens is deactivated. The RF beacon may be Bluetooth, which is mostly available in digital devices.

Figure 47:
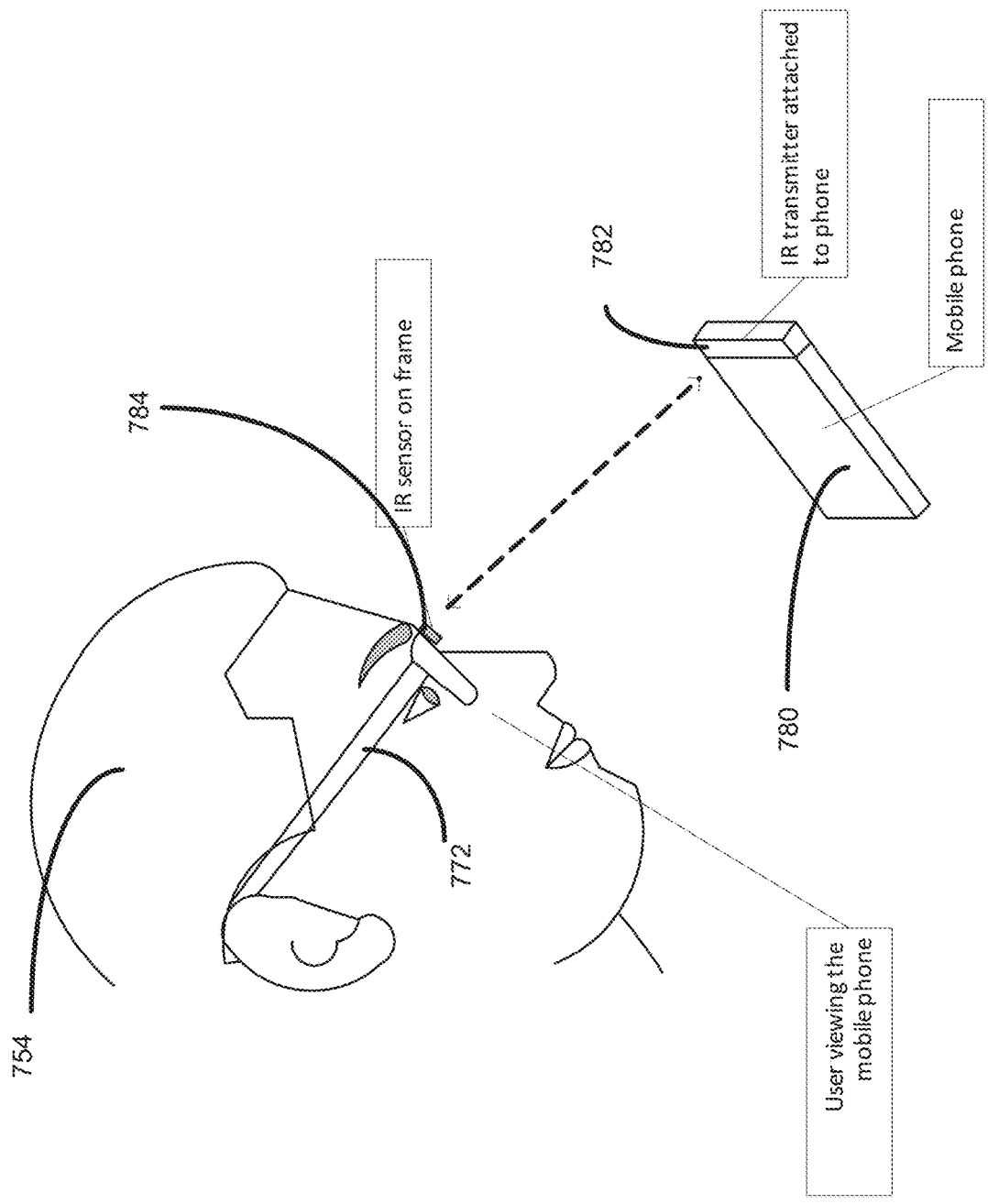
FIG. 47 illustrates a side view of a mobile phone having an IR transmitter in another embodiment of the present invention.

FIG. 47 illustrates a side view of a mobile phone 780 having an IR transmitter 782 in another embodiment of the present invention. While using the IR beacons on the mobile phone, the IR transmitter 782 is placed as an add-on to the mobile phone. This can be placed as part of the phone case. The transmitter faces towards the user viewing the phone. When a receiver 784 on the eyewear frame 772 sees this transmitted IR signal, it activates the near focus lens.

Figure 48:
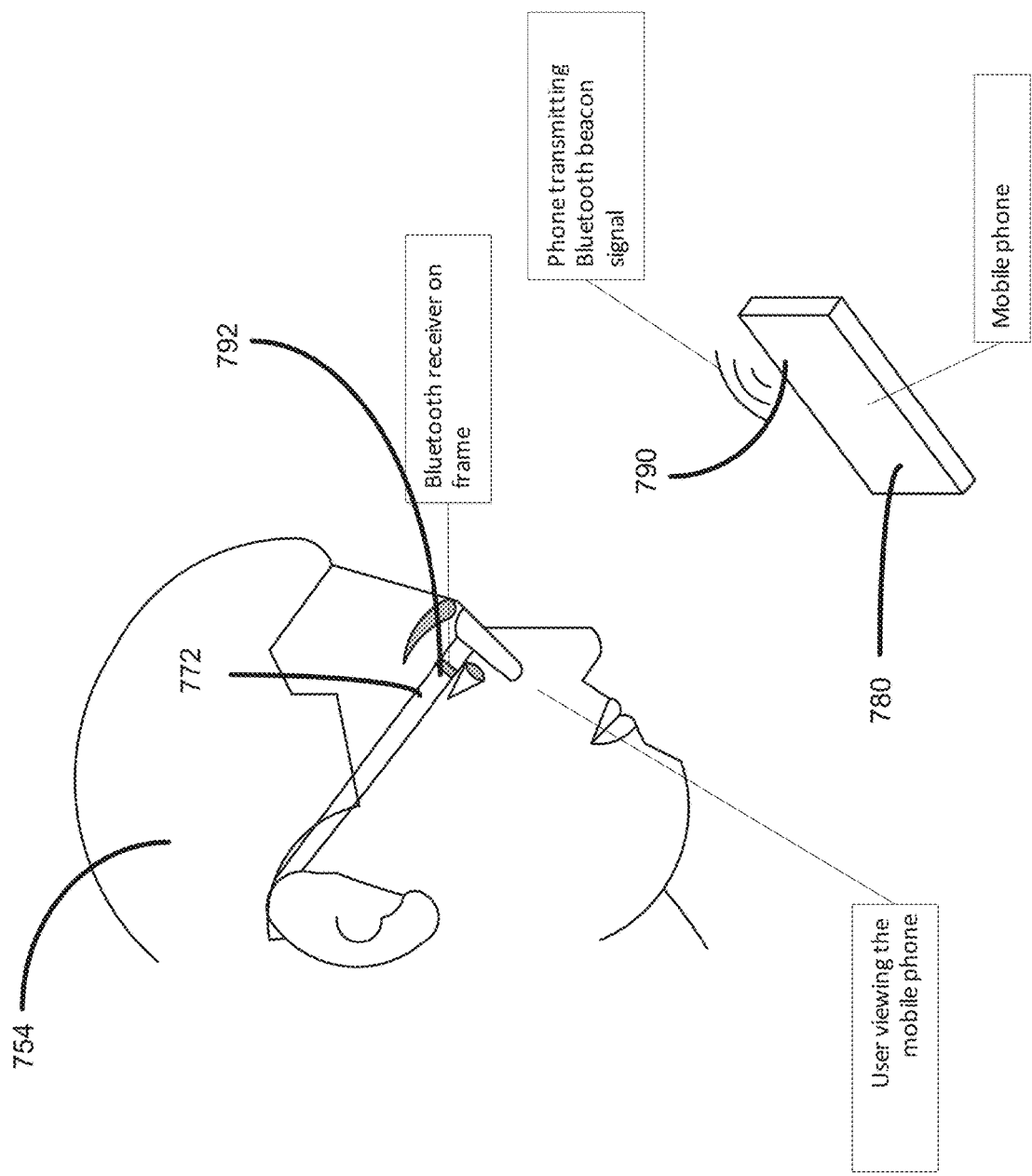
FIG. 48 illustrates a side view of a mobile phone having a Bluetooth transmitter in another embodiment of the present invention.

FIG. 48 illustrates a side view of a mobile phone 780 having a Bluetooth transmitter 790 in another embodiment of the present invention. In this embodiment, the Bluetooth transmitter integrated in the mobile phone 780 may be utilized as a beacon. The software app installed on the phone may transmit the Bluetooth beacon signal with a specific signature to the eyewear frame. The eyewear frame 772 having a Bluetooth receiver 792 detects this signal and further checks the signal strength to confirm that the user is close to it. As an additional check the tilt of the eyewear frame and corresponding orthogonal tilt of the phone is used to confirm that they both are facing each other. The software on the phone confirms the tilt and transmits this tilt to eyewear frame. The eyewear frame confirms its tilt and phone tilt to be orthogonal before activating the near focus lens.

Figure 49:
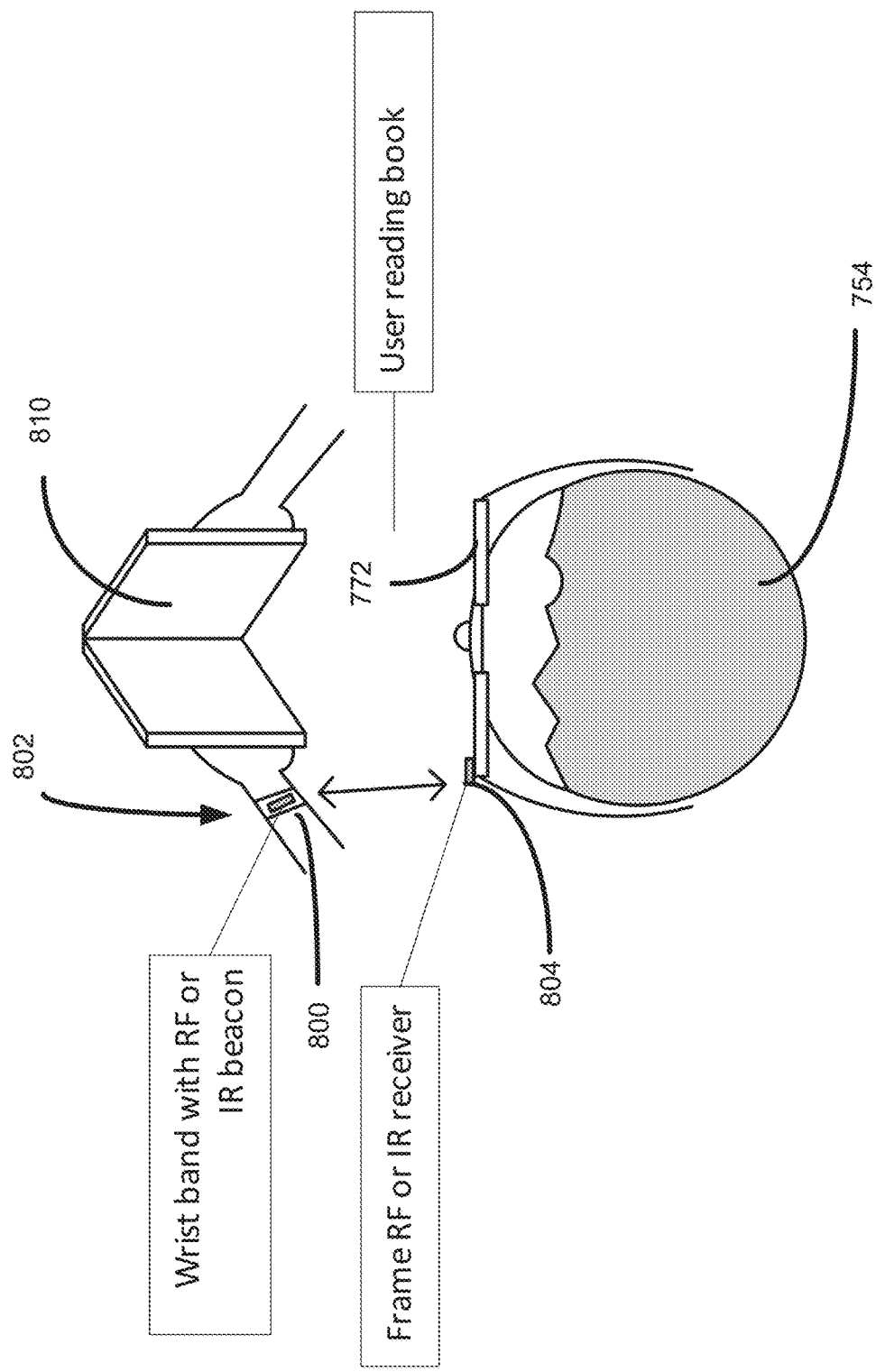
FIG. 49 is a top view of a wrist band with a beacon in another embodiment of the present invention.

FIG. 49 is a top view of a wrist band with a beacon 800 in another embodiment of the present invention. When the user 754 is viewing a book 810 or a fine print such as one on a receipt, these passive objects cannot transmit beacon signals. In such cases an IR or RF beacon 800 is provided to the user in the form of a wrist band 802 (such as fitness band or Smartwatch). When the user views the book or object, the user is also viewing the bottom of the user's wrist holding the object. The eyewear frame 772, through an IR or RF receiver 804, detects the beacon on the user's wrist and activates the near focus lens. Tilt of the wrist and tilt of the eyewear frame can further confirm that they are viewing at each other before activating the lens.

Figure 50:
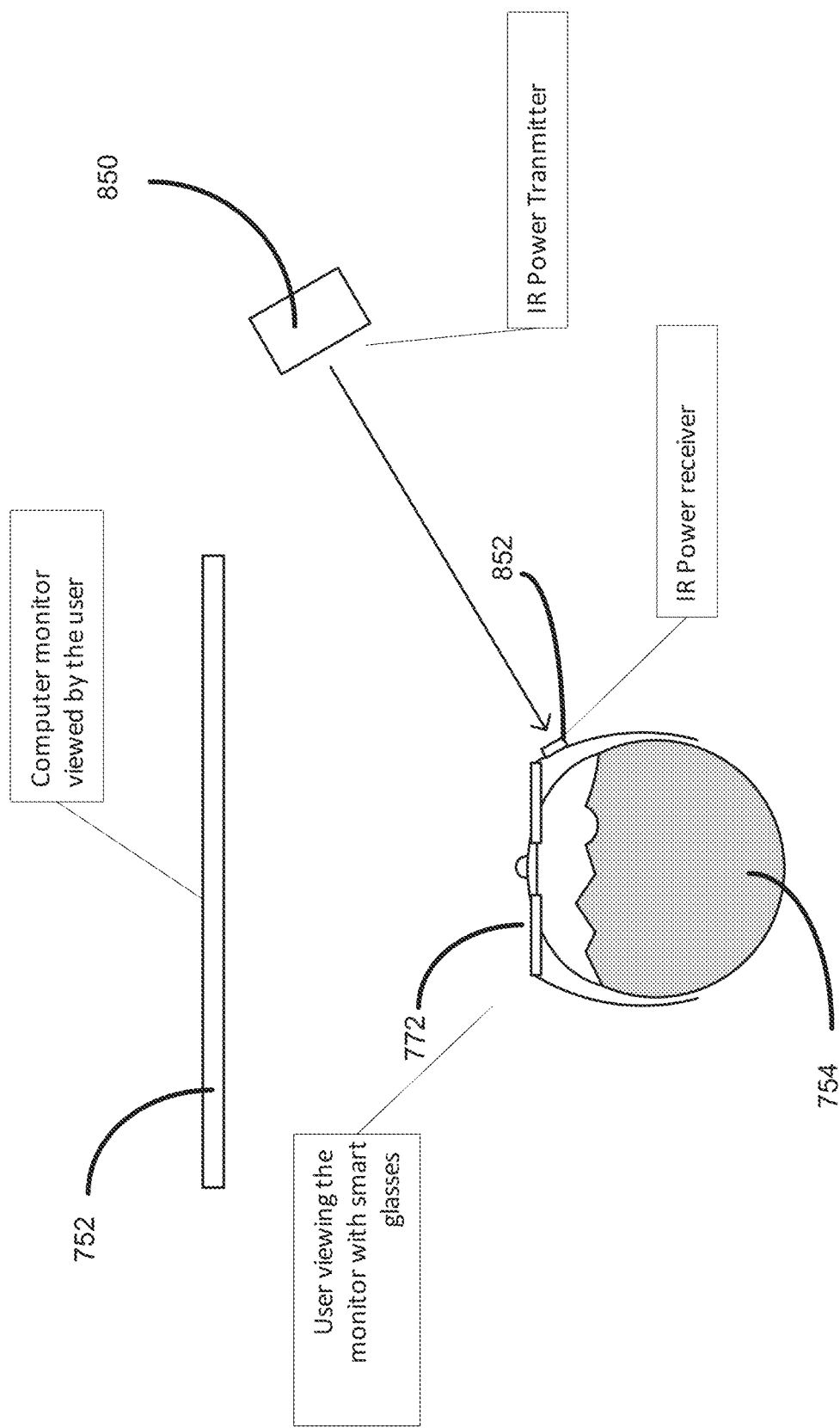
FIG. 50 is a top view of an IR power transmitter in another embodiment of the present invention.

In an alternate embodiment of the present invention, the dynamic focus eyewear may receive its power from a wireless power source. This may be based on an omnidirectional power transfer, such as RF based power or IR based line of sight power transfer. FIG. 50 is a top view of an IR power transmitter 850 in another embodiment of the present invention. The IR power transmitter 850 may be placed next to the user's computer monitor 752. The eyewear frame 772 of user may have an IR power receiver (IR photovoltaic charger) 852. When the user faces the monitor, the eyewear frame gets its power and activates the near focus lens. When the user turns the user's head away from the monitor or moves from the IR power transmitter, the near focus lens is deactivated. The IR based power transfer may provide power in excess of 1 watt, which is sufficient for electronics in the eyewear. The transmitter tracks the head movement of the user and directs the IR beam to the IR power receiver on the eyeglass frames. A manual mechanical activation may be provided to the user to activate the near focus lens when the user is not facing an IR transmitter and needs near focus. A small battery is provided to achieve this while the eyewear is not getting active power. A slim eyewear frame without any batteries may be created using this embodiment.

In another embodiment of the present invention, an open speaker hearing aid may be integrated into the eyewear frame. The present invention may incorporate an open ear speaker to fire audio towards the ear and audio enhancement to improve the listeners audio quality and thus act as a hearing aid with the dynamic focus eyewear. By combining the dynamic focus with audio enhancement, a single device can solve a users vision and hearing problems.

Transparent photovoltaic cells are disclosed in several patents. U.S. Pat. No. 4,663,495 discloses that photovoltaic cells can be transparent in selective spectral wavelengths, such as the visible spectrum. U.S. Patent Publication No. 2014/0130864 discloses the use of nanocrystal clusters embedded in a polymeric matrix to create a transparent photocell. They typically work by passing visible light and converting power from ultra-violet and infrared spectrum. In another embodiment of the present invention, the eyewear utilizes transparent and normal photovoltaic cells to charge the eyewear with ambient light. Using the transparent photocells, most of the surface of the eyewear can be covered to generate power from ambient light. Each temple area can provide 8 square centimeter surface area and each eye lens area can provide 13 square centimeter surface area. In total, area in excess of 40 square centimeter is available in the eyewear frame to produce power from ambient light. A high efficiency photocell can generate about 100 uWatt power (100 uA at 1V or 30 uA at 3V). With about 40 square centimeter surface area, the eyewear can generate about 3.6 mWatt (about 1 mA at 3.3V). At this rate of power generation, a battery of 100 mAh capacity can be charged in about 100 hours or 6 days (without night charging). In a typical design, the eyewear has a battery capacity of 100 mAh and lasts for about 7 days in normal usage. With ambient light charging, the device can be designed to run forever without a user manually charging. With solar charge efficiencies improving, this can further improve the eyewear function. An optional, a lighted eyewear case charger can be provided to charge the device faster. This can charge more than 10 times faster, charging the eyewear in several hours.

The present invention provides may features currently unavailable in existing glasses. The present invention enables the changing of lenses automatically or manually to allow near and far focus lenses to be positioned in front of the user's eyes. The present invention may accomplish this in a wide variety of ways to enable a dynamic focus in both eyeglasses and contacts.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. Eyewear comprising:
   a first lens;
   a second lens;
   wherein the first and second lenses are liquid membrane lenses;
   wherein the first and second lenses are non-round in shape and expand to a substantially spherical shape upon activation to provide optical focus change;
   a mechanism for detecting a near object viewed by a user of the eyewear; and
   a mechanism for dynamically changing a focus of the first lens and the second lens;
   wherein the mechanism for dynamically changing a focus activates to a near focus upon the mechanism for detecting a near object detecting a near object viewed by the user.

2. The eyewear according to claim 1 wherein the first and second lenses are liquid membrane lenses which change focus from a zero or negative focus power to an add focus power.

3. The eyewear according to claim 2 wherein the mechanism for dynamically changing a focus of the first lens and the second lens includes a closed loop motor having a shaft used for changing the focus of the first and second lenses.

4. The eyewear according to claim 3 wherein calibration is used for changing the focus of each lens.

5. The eyewear according to claim 4 wherein focus is continually changed for each lens based on a determined distance of an object viewed by the user.

6. The eyewear according to claim 1 wherein the first and second lenses each have an internal round cavity and an elastic membrane covering a front and back of the cavity and wherein the membrane expands to a desired focus power based on liquid pressure.

7. The eyewear according to claim 6 wherein the elastic membrane provides a long view focal length of the first and second lenses when in an inactive state.

8. The eyewear according to claim 6 wherein:
the first and second lenses each have a storage chamber for storing liquid flowing between the storage chamber and the cavity; and
the first and second lenses includes a mechanical actuation mechanism for moving the store liquid.

9. The eyewear according to claim 8 wherein the mechanical actuation mechanism activates by automatically using a motor or manually control by the user.

10. The eyewear according to claim 6 wherein the first and second lenses are manufactured using a three-dimensional printer to create an elastic material having a customized focus power.

11. The eyewear according to claim 1 wherein the first and second lenses only expand in a spherical shape in a specified round portion of each lens and includes a hard transparent material in non-round portion of each lens.

12. The eyewear according to claim 11 wherein the first and second lenses each is an integrated lens having a sealed liquid and the movement of the hard transparent material of each lens changes the focal power of each lens by moving the liquid.

13. The eyewear according to claim 1 wherein the first and second lenses each include a front transparent hard material having vent holes for guiding the liquid membrane into a spherical shape.

14. The eyewear according to claim 1 wherein the first and second lenses include a silicone membrane having varying thickness around a periphery of each lens and a consistent thickness in a center position to allow spherical expansion of each lens.

15. The eyewear according to claim 14 wherein the periphery of each lens is construct of a rigid non-stretch material.

16. The eyewear according to claim 14 wherein a Nitinol material provides expansion around the periphery of each lens, thereby allowing the lens to expand with a spherical focus.

17. The eyewear according to claim 1 wherein each lens includes a first dynamic focus for straight view and a second dynamic focus for low angle view.

18. The eyewear according to claim 1 wherein:
each lens includes at two orthogonal layer fixed focus liquid crystal layers and activation of the liquid crystal layers changes the focus of each lens.

19. The eyewear according to claim 18 wherein each liquid crystal layer is independently controlled to provide a multiple focus lens.

20. The eyewear according to claim 1 wherein the first and second lenses are contact lenses configured to be worn in eyes of the user.

21. The eyewear according to claim 20 wherein a Nitinol material is applied to the first and second lenses and is heat activated by user's eyelids of the user or by an external source to provide near focus activation.

22. The eyewear according to claim 20 wherein power is transmitted to each lens wirelessly via a power transmitter.

23. The eyewear according to claim 22 wherein each contact lens changes focus upon receiving power from the power transmitter using a Microelectromechanical systems (MEMS) piezo or magnetic actuator.

24. The eyewear according to claim 22 wherein:
the power transmitter is located at a computer monitor, mobile phone or wrist band; and
the power transmitter is a beacon for activating a near focus of each lens.

25. The eyewear according to claim 20 wherein a liquid crystal layer is used to change focus to near focus when activated.

26. The eyewear according to claim 20 wherein light sensitive hydrogel is used to activate a near focus of each lens.

27. The eyewear according to claim 1 wherein the mechanism for detecting a near object viewed by a user of the eyewear includes a sensor for sensing distance and an accelerometer for sensing a user's head tilt and activity.

28. The eyewear according to claim 1 wherein the mechanism for detecting a near object viewed by a user of the eyewear includes tracking a user's eye and pupil convergence.

29. The eyewear according to claim 28 wherein the mechanism for detecting a near object includes using eye edge grammar of the features of the user's eye to track a user's eye pupil.

30. The eyewear according to claim 1 further comprising eyeglass frames having a temple area and a plurality of transparent photovoltaic cells for charging the eyewear, the photovoltaic cells being located with the first and second lenses and the temple area of the eyeglass frames.

31. An apparatus for detecting a near object viewed by eyewear worn by a user, the apparatus comprising:
a beacon positioned on a computer monitor, mobile phone or wrist band for providing a proximity of the eyewear to the beacon; and
a mechanism for informing eyewear having dynamic focus of a near object distance, wherein the mechanism is positioned with the beacon on the computer monitor, mobile phone or wrist band and configured to trigger the dynamic focus upon receiving a specified proximity from the beacon.

32. The apparatus for detecting a near object according to claim 31 wherein the beacon uses infrared light to detect a distance from the user.

33. The apparatus for detecting a near object according to claim 31 wherein the beacon uses a radio frequency signal for detecting the near distance of the user from the beacon.

34. Eyewear comprising:
a frame;
a first lens;
a second lens;
a mechanism for detecting a near object viewed by a user of the eyewear; and
a mechanism for dynamically changing a focus of the first lens and the second lens;
wherein the mechanism for dynamically changing a focus activates to a near focus upon the mechanism for detecting a near object detecting a near object viewed by the user;
wherein the first and second lenses are progressive lenses;

wherein the first lens affixed to the frame and the second lens affixed to the frame, the second lens positioned adjacent the first lens;

wherein the mechanism for dynamically changing a focus of the first lens and the second lens is a movement mechanism for lifting a nose-pad of the frame, wherein the movement mechanism uses Nitinol to move the nose-pad; wherein movement of the nose-pad changes the focus of the first lens and the second lens.

* * * * *